US011131418B2

(12) United States Patent
Rasmussen et al.

(10) Patent No.: US 11,131,418 B2
(45) Date of Patent: Sep. 28, 2021

(54) ASSEMBLY FOR RELINING A JUNCTION BETWEEN A BRANCH PIPELINE AND A MAIN PIPELINE, AND FOR RELINING A PART OF OR THE WHOLE BRANCH PIPELINE

(71) Applicant: Earth Tool Company LLC, Lake Mills, WI (US)

(72) Inventors: Mogens Pagter Rasmussen, Engesvang (DK); Bent Sloth Rasmussen, Kolding (DK); Anna Amalie Larsen, Farvang (DK)

(73) Assignee: The Charles Machine Works, Inc., Perry, OK (US)

( * ) Notice: Subject to any disclaimer, the term of this patent is extended or adjusted under 35 U.S.C. 154(b) by 168 days.

(21) Appl. No.: 16/476,418

(22) PCT Filed: Jan. 8, 2018

(86) PCT No.: PCT/EP2018/050338
§ 371 (c)(1),
(2) Date: Jul. 8, 2019

(87) PCT Pub. No.: WO2018/127583
PCT Pub. Date: Jul. 12, 2018

(65) Prior Publication Data
US 2020/0049301 A1 Feb. 13, 2020

(30) Foreign Application Priority Data

Jan. 6, 2017 (EP) .................................. 17150535
Dec. 1, 2017 (EP) .................................. 17205047

(51) Int. Cl.
| | | |
|---|---|---|
| *F16L 55/179* | (2006.01) | |
| *F16L 55/165* | (2006.01) | |
| *B29C 63/34* | (2006.01) | |
| *B29C 35/08* | (2006.01) | |
| *F16L 55/26* | (2006.01) | |
| *F16L 55/40* | (2006.01) | |

(52) U.S. Cl.
CPC ......... *F16L 55/1654* (2013.01); *F16L 55/179* (2013.01); *B29C 63/34* (2013.01);
(Continued)

(58) Field of Classification Search
CPC . F16L 55/1652; F16L 55/1653; F16L 55/265; F16L 55/179; F16L 55/18;
(Continued)

(56) References Cited

U.S. PATENT DOCUMENTS 4,135,958 A * 1/1979 Wood .................. B29C 63/0021
118/408
4,581,247 A * 4/1986 Wood ..................... B29C 35/08
427/508
(Continued)

FOREIGN PATENT DOCUMENTS

AU 200324457 B1 2/2004
WO 2004104469 A1 12/2004

OTHER PUBLICATIONS

European Patent Office, "International Search Report", dated Apr. 11, 2018, 5 pages.

*Primary Examiner* — Patrick F Brinson
(74) *Attorney, Agent, or Firm* — Tomlinson McKinstry, P.C.

(57) ABSTRACT

An assembly for relining a junction between a branch pipeline and a main pipeline comprises a seal installation device capable of moving within the main pipeline to the junction. The seal installation device includes a curable seal for being placed and pressed onto the junction and optionally for extending into the branch pipeline. The assembly further comprises a light curing device for being introduced into the seal installation device within the main pipeline and the branch pipeline for curing the seal.

31 Claims, 24 Drawing Sheets

(52) U.S. Cl.
CPC ..... *B29C 2035/0833* (2013.01); *F16L 55/265* (2013.01); *F16L 55/40* (2013.01)

(58) Field of Classification Search
CPC ............. F16L 55/26; B29C 2035/0833; B29C 2035/0827; B29C 2035/0822
USPC ..... 138/97, 98, 93; 156/287, 64, 379.6, 378; 264/269, 516
See application file for complete search history.

(56) References Cited

U.S. PATENT DOCUMENTS

| | | | | |
|---|---|---|---|---|
| 4,680,066 | A * | 7/1987 | Wood | B29C 63/0069 156/156 |
| 5,915,419 | A | 6/1999 | Tweedie et al. | |
| 5,927,341 | A | 7/1999 | Taylor | |
| 6,039,079 | A * | 3/2000 | Kiest, Jr. | F16L 55/179 138/98 |
| 6,068,725 | A * | 5/2000 | Tweedie | F16L 55/179 138/97 |
| 6,520,719 | B1 * | 2/2003 | Tweedie | B29C 63/28 138/97 |
| 7,073,536 | B2 * | 7/2006 | Blackmore | B29C 63/0069 138/97 |
| 8,561,662 | B2 | 10/2013 | Moeskjaer et al. | |
| 8,869,839 | B1 * | 10/2014 | D'Hulster | F16L 55/179 138/98 |
| 9,453,607 | B2 | 9/2016 | Moeskjaer et al. | |
| 2010/0051168 | A1 * | 3/2010 | Moeskjaer | F16L 55/165 156/64 |
| 2018/0106413 | A1 | 4/2018 | Kuzniar | |
| 2018/0162017 | A1 | 6/2018 | Kusniar | |
| 2018/0229424 | A1 * | 8/2018 | Bichler | B29C 67/247 |

* cited by examiner

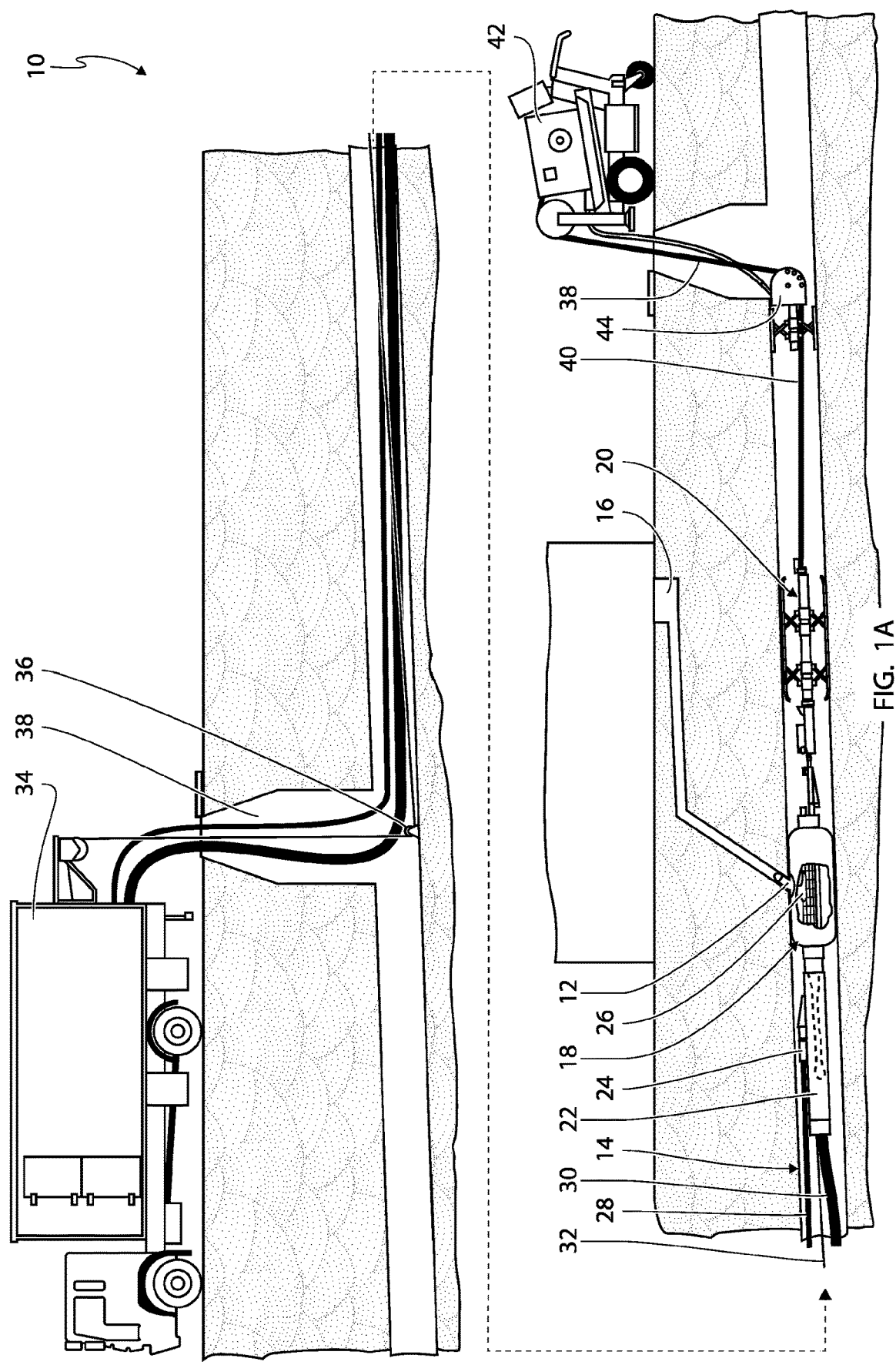

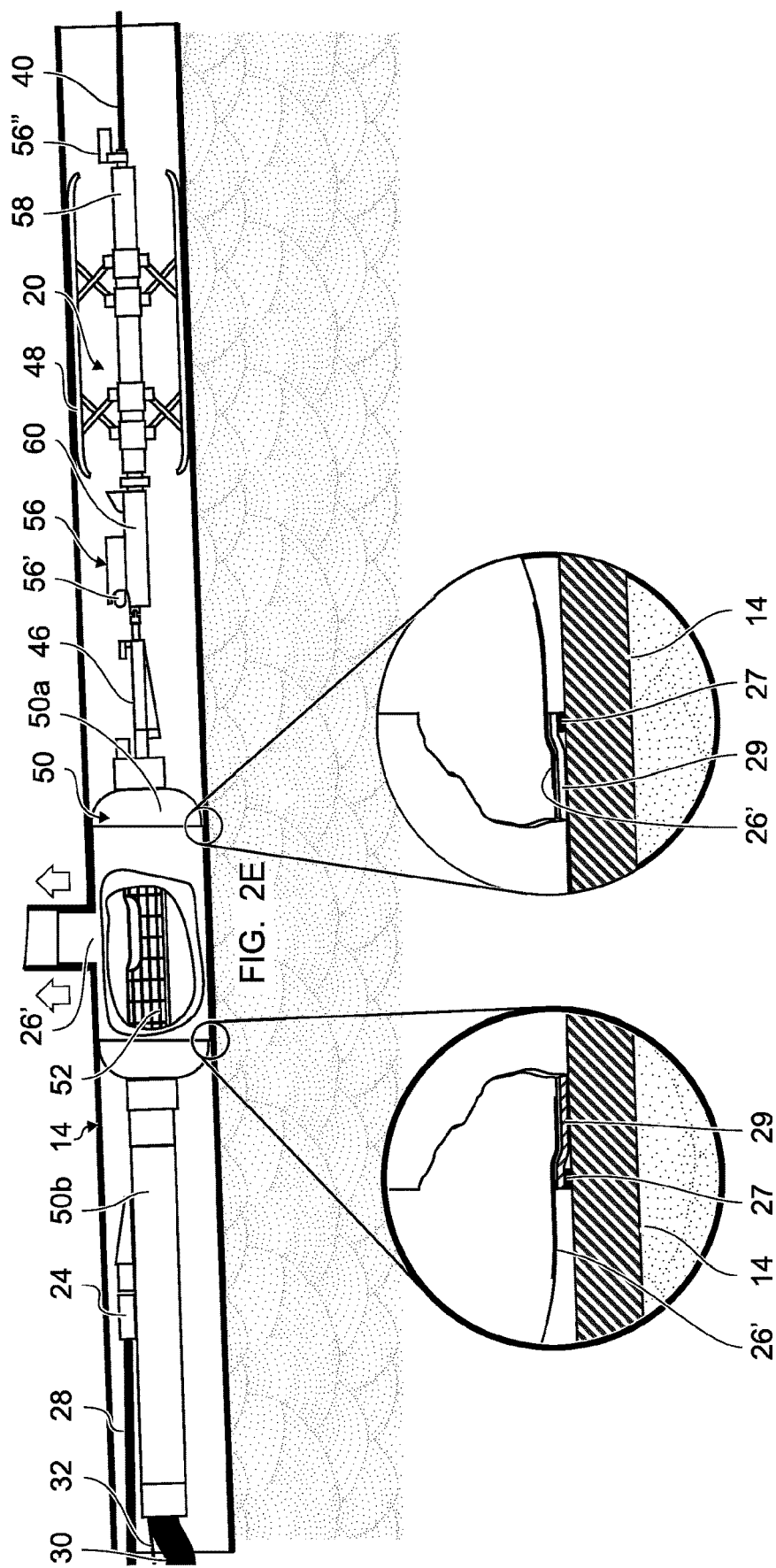

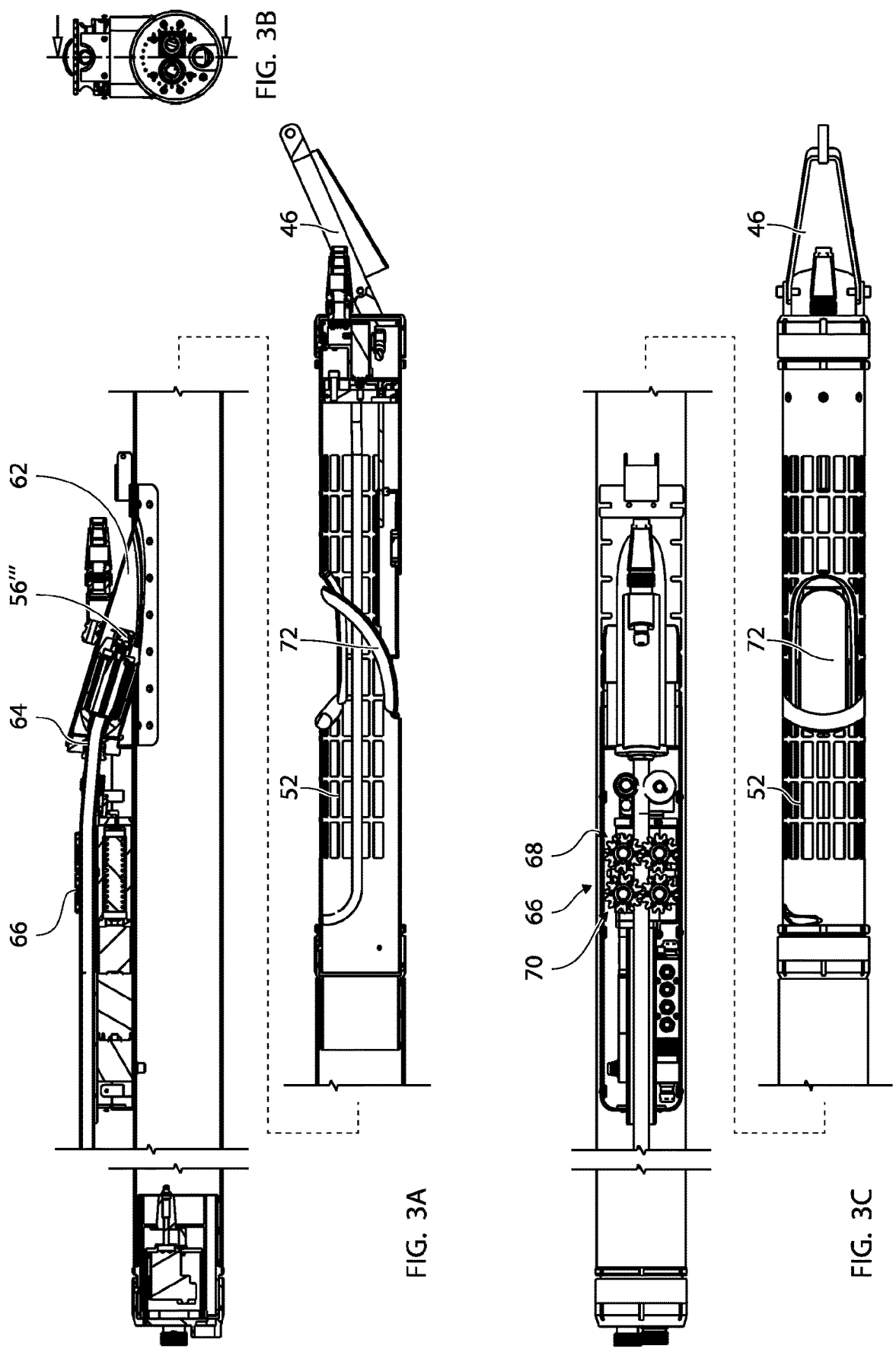

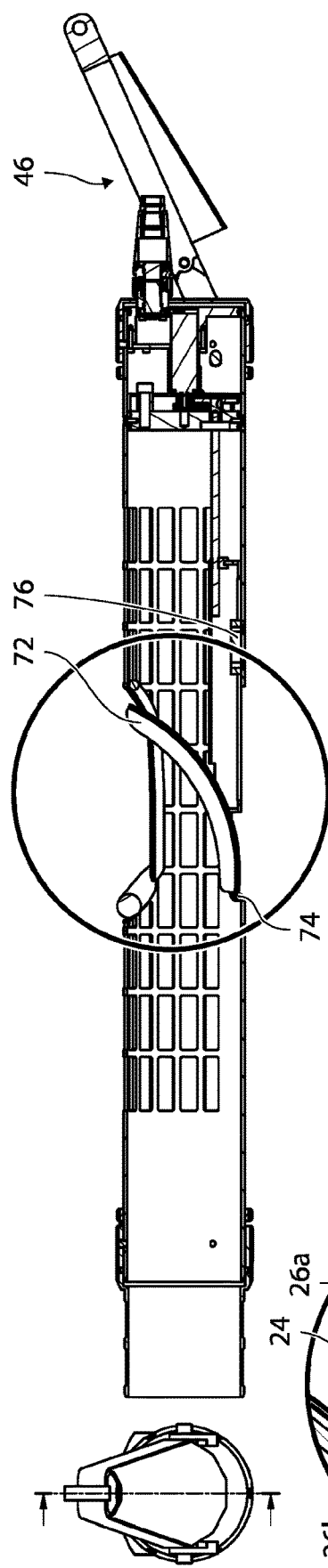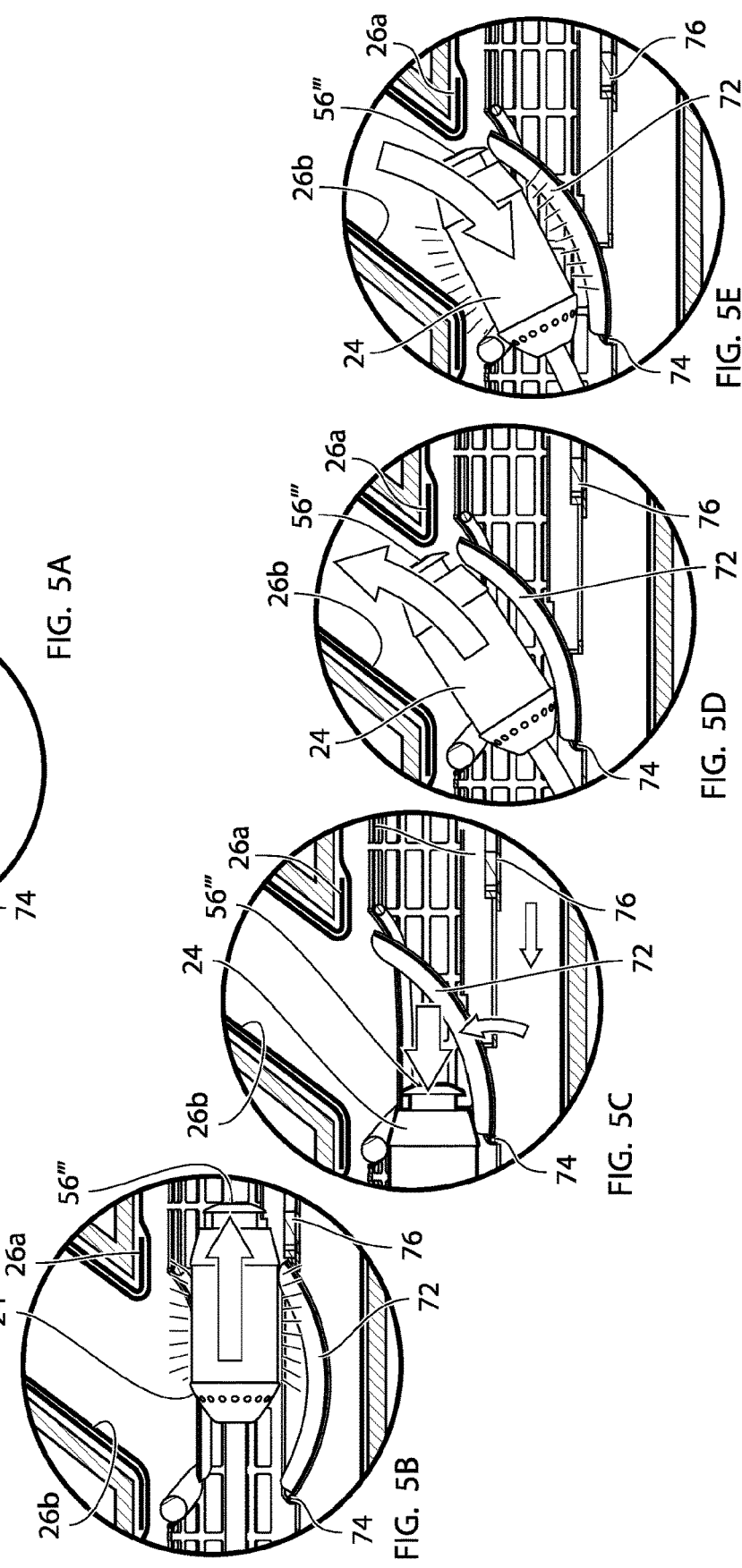

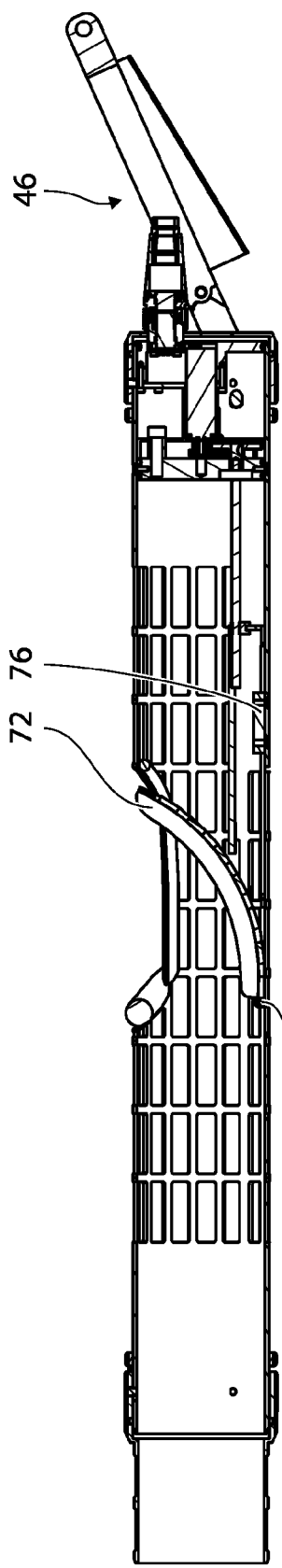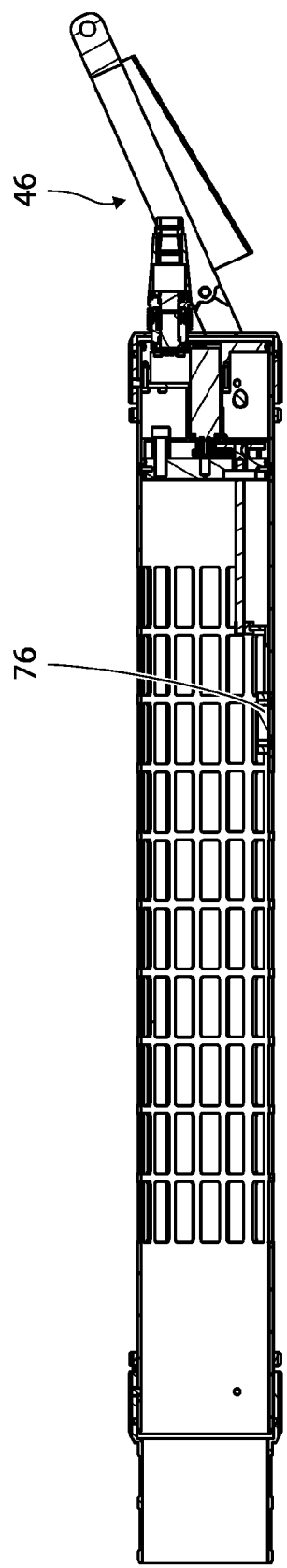

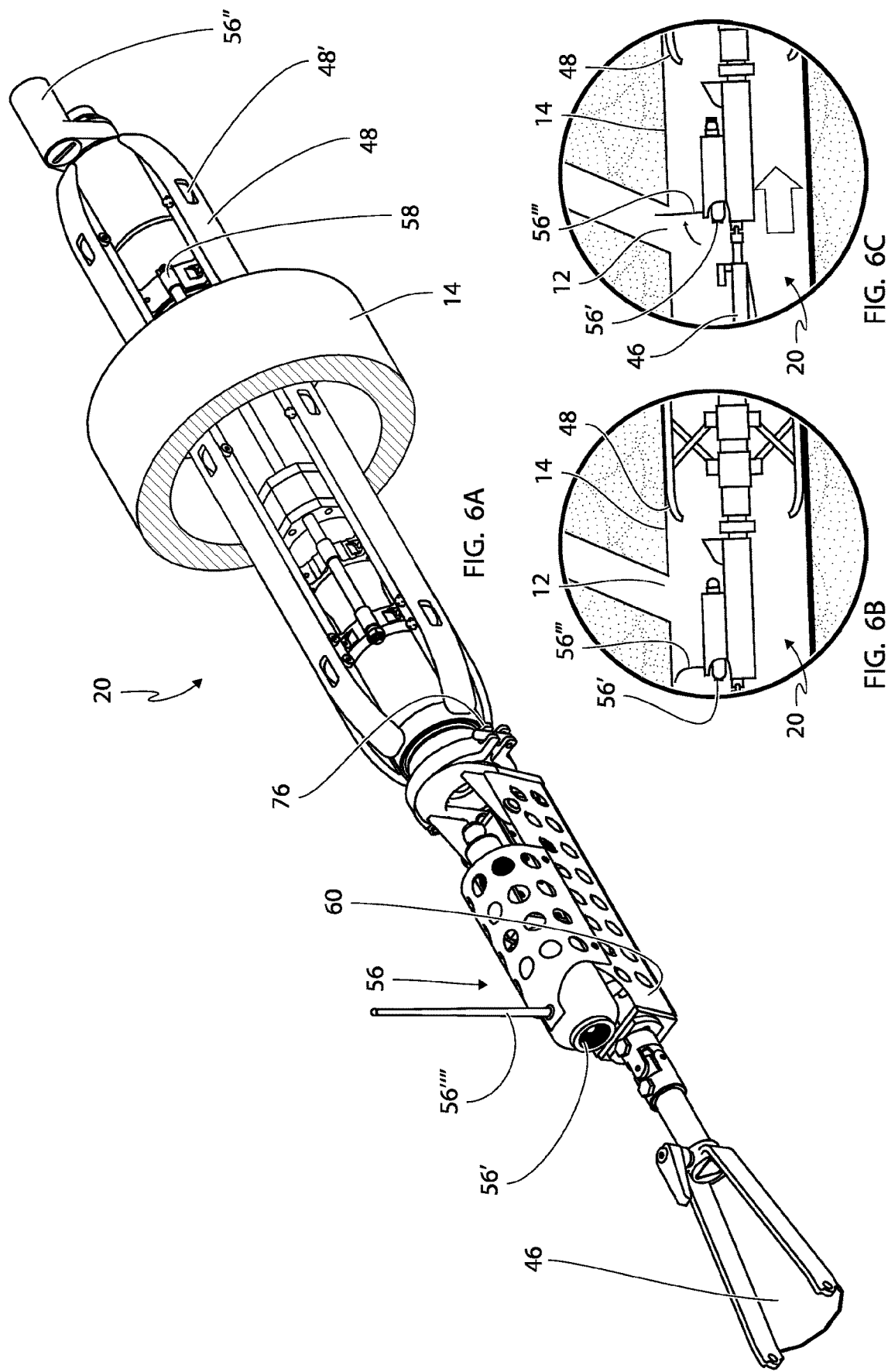

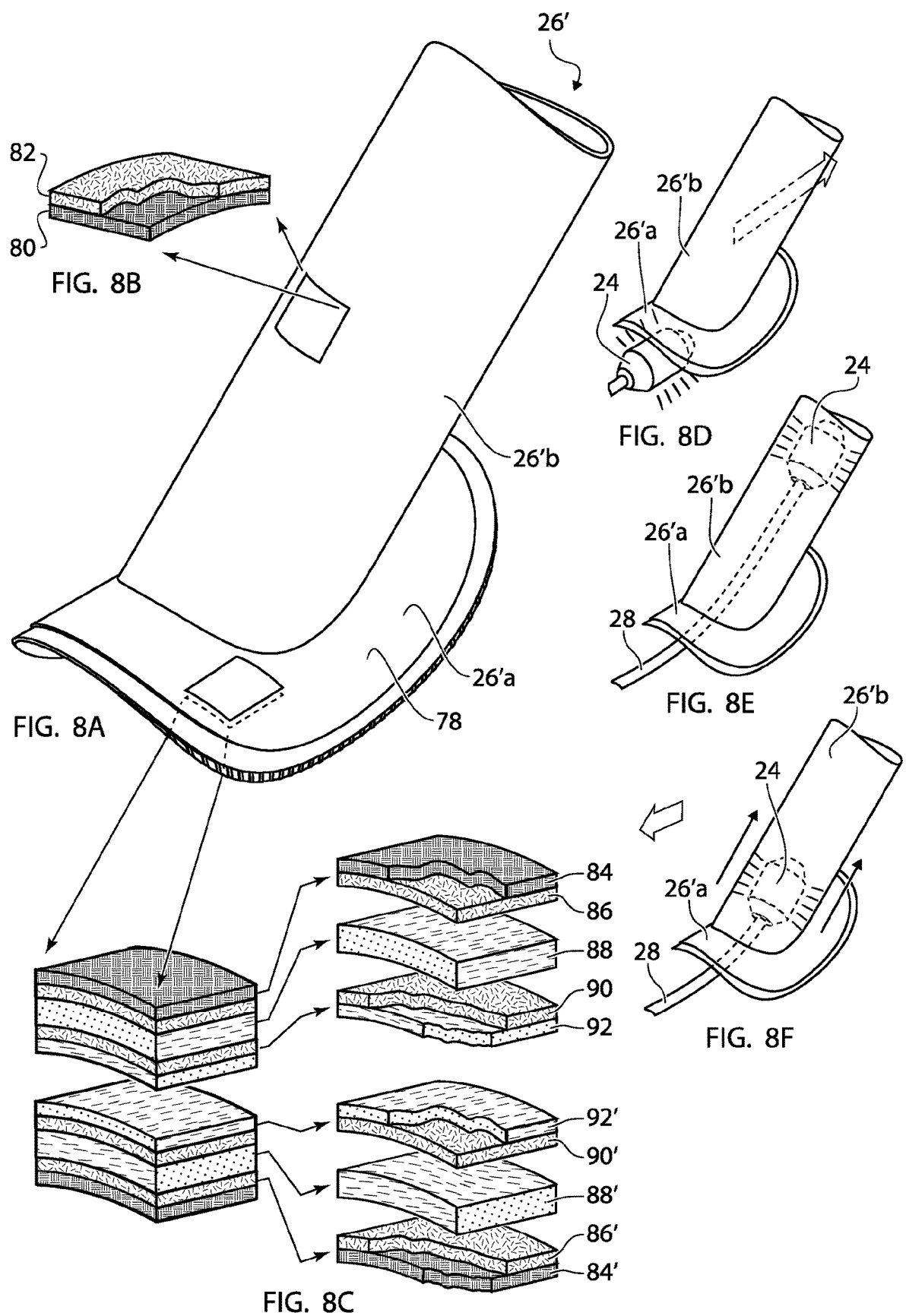

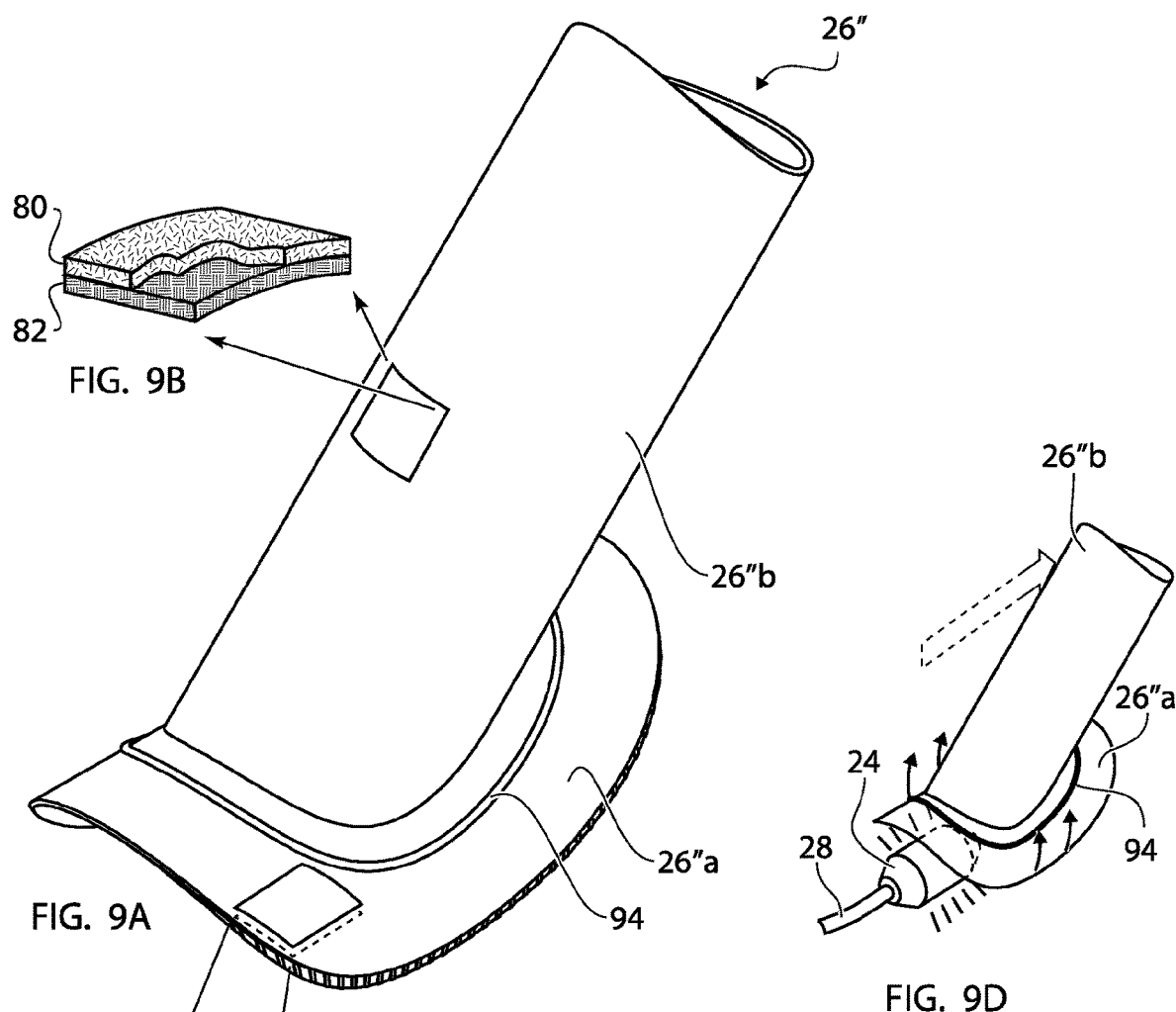
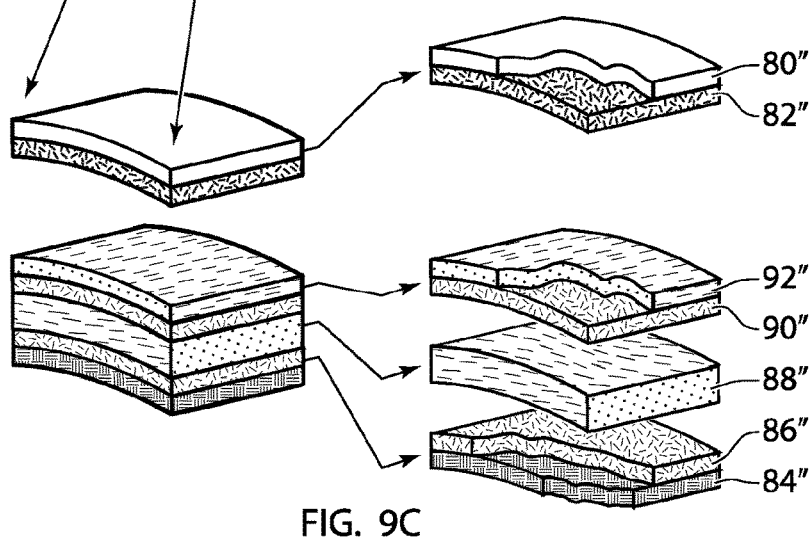
FIG. 9B
FIG. 9A
FIG. 9D
FIG. 9C

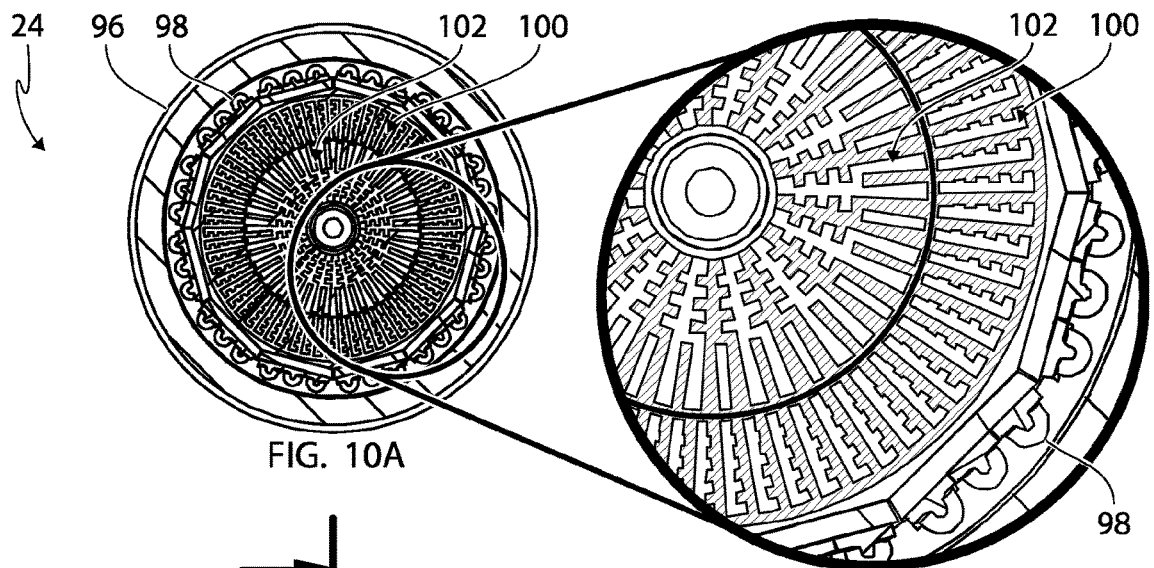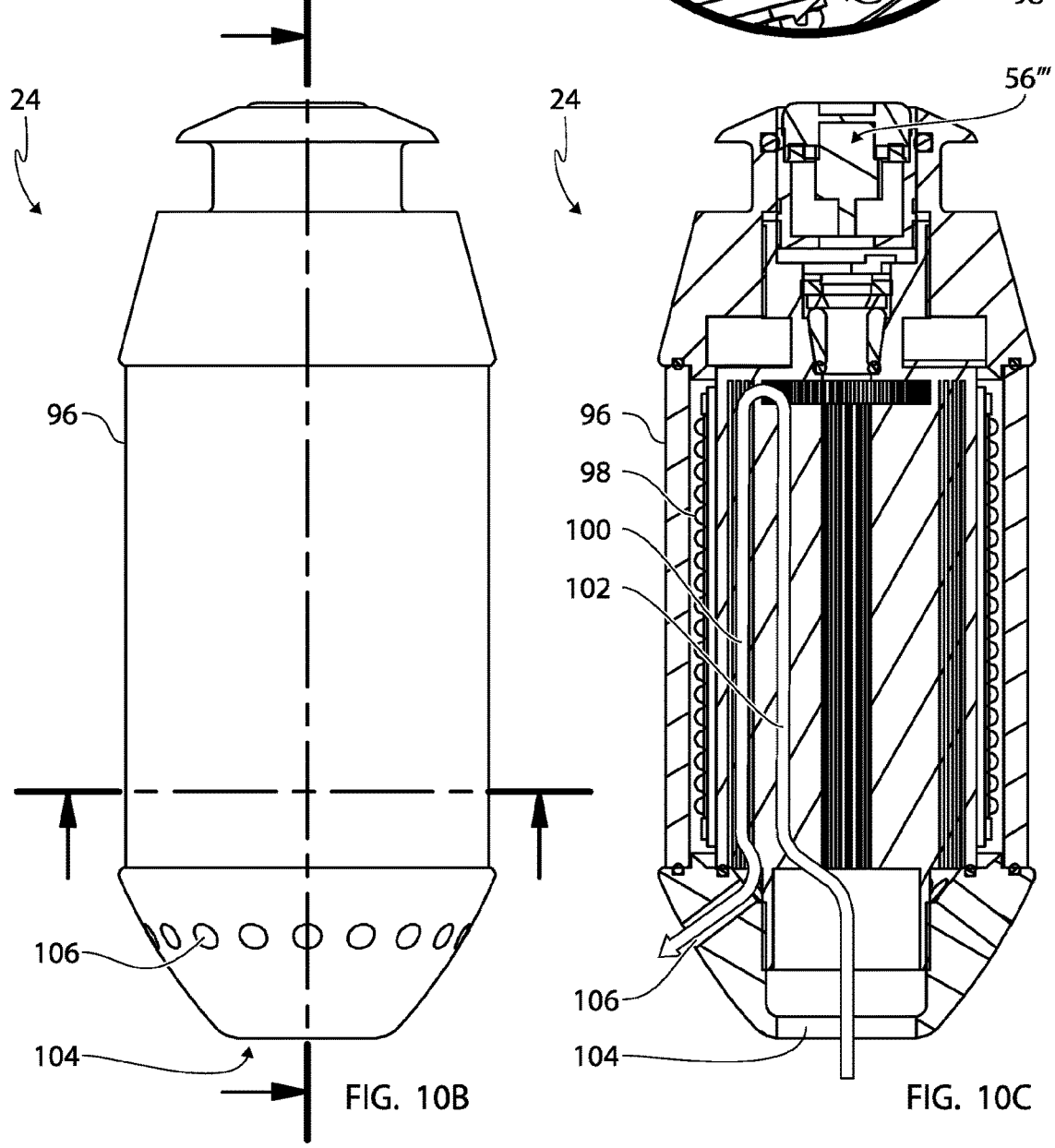

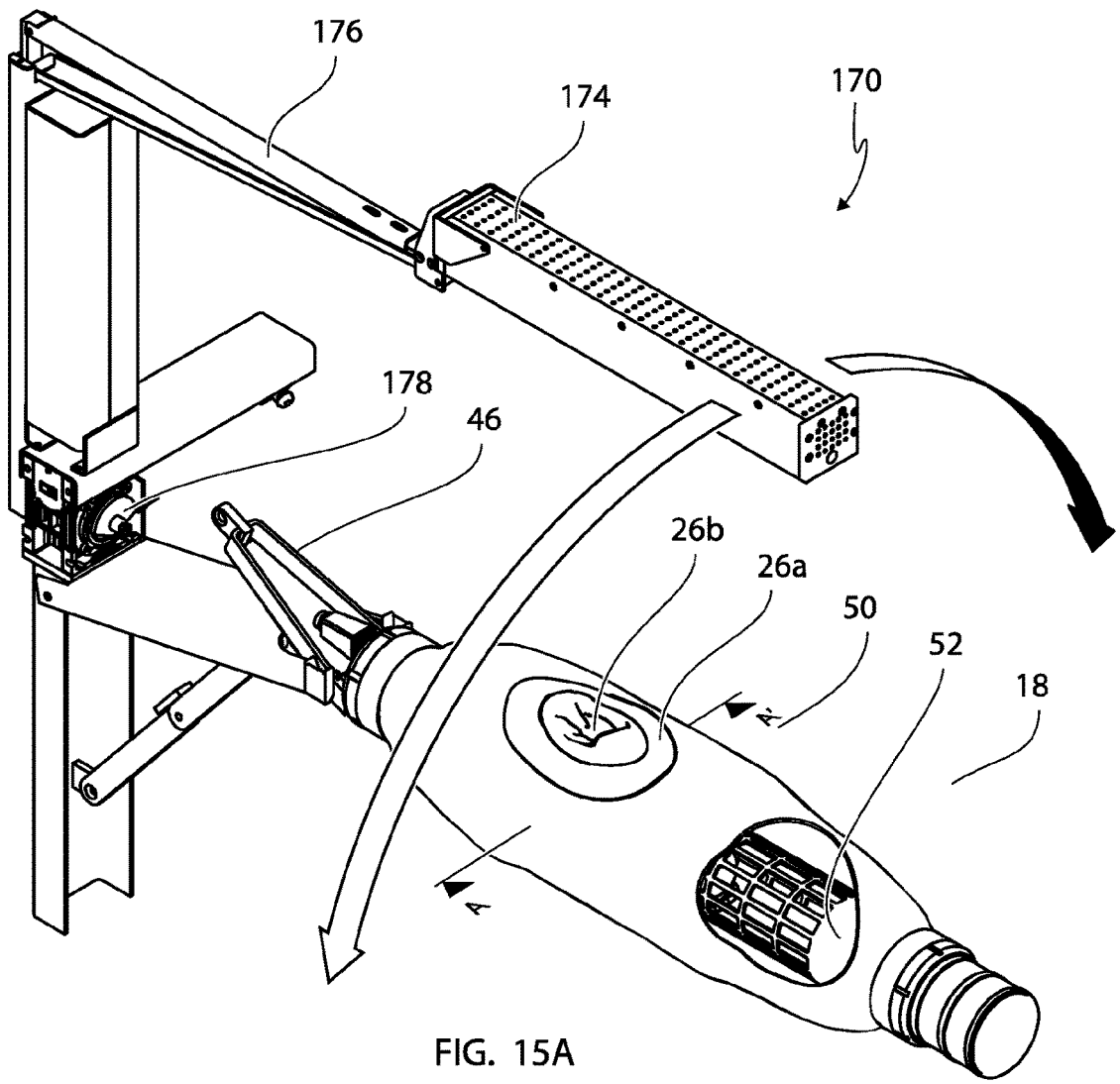
FIG. 15A
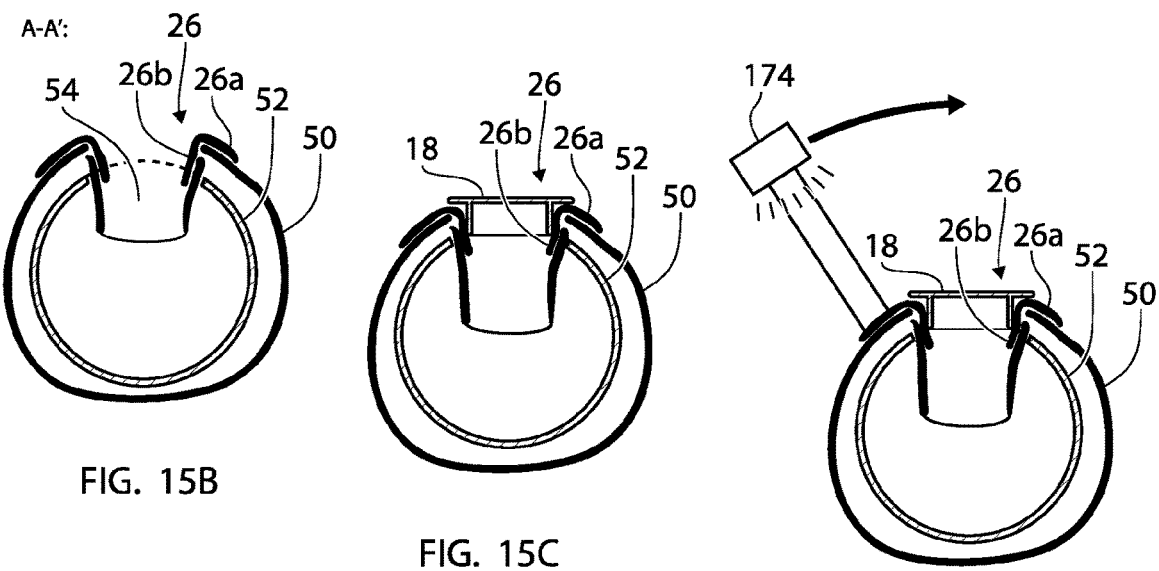
FIG. 15B
FIG. 15C
FIG. 15D

ASSEMBLY FOR RELINING A JUNCTION BETWEEN A BRANCH PIPELINE AND A MAIN PIPELINE, AND FOR RELINING A PART OF OR THE WHOLE BRANCH PIPELINE

The present invention relates to an assembly for relining a junction between a branch pipeline and a main pipeline, and for relining a part of or the whole branch pipeline.

BACKGROUND

Pipelines are typically made of robust and heavy materials such as steel, concrete, clay or very rigid plastic. Exchanging existing pipelines is usually a costly process, especially when the pipeline is located underground, such as sewage pipelines. It is therefore preferable to renovate the defective pipeline instead of replacing it. Typically, a process called relining is used to renovate a defect pipeline, such as a leaking sewage pipeline, in which process an elongated liner is inserted into the existing pipeline. The liner is made of a flexible and resin-impregnated fiber material and shaped like a tube having approximately the same diameter as the pipeline.

The liner is allowed to cure after being inserted into the pipeline. When cured, the liner will be robust, solid and fluid-tight.

The inner surface of the liner will be very smooth, i.e. have a low surface roughness. Due to the decreased roughness, the flow rate with the liner installed will typically be improved compared to the flow rate without liner, even if the liner reduces the effective flow area of the pipeline.

Eversion is the most common technology used for lining and relining existing pipelines. Eversion is made by fastening one end of the liner onto a turning head and subsequently inverting the liner into the pipeline by the use of water, steam or high-pressurized gas. UV light, visual light or hot water/steam is typically used to perform the subsequent curing of the liner in order to form a rigid and fluid tight composite wall structure on the inner surface of the pipeline.

An advantageous technology for curing a liner has been described in the international patent application DK2008/000073, published as WO 2008/101499. The above mentioned patent application relates to an apparatus for curing a liner. The apparatus has a mobile and flexible "light train" having a set of LEDs (light emitting diodes), which are used to cure the liner.

A pipeline system typically comprises several pipeline intersections, forming main pipelines and branch pipelines extending from the main pipelines. Branch pipelines joining the main pipeline constitute a major problem in connection with the above technology. A branch pipelines may e.g. be used to connect a building to the pipeline system. A main pipeline often has a plurality of branch pipes along its elongation. When lining the main pipeline, the liner will block access to the branch pipe. Access to the branch pipe has to be re-established after curing the liner by cutting a hole in the liner at the position of the junction between the main pipeline and the branch pipeline. Such a hole constitutes a void in the liner at the position of the branch pipe junction, and such a void in the liner may cause problems at a later time since the fluid-tight properties of the liner are compromised at the location of the hole. There is thus a significant risk of leakage at the location of the hole.

Further, the branch pipeline often requires relining as well, i.e. the full length or a part of the length between the main pipeline and the user location, e.g. a building. It would thus be an advantage to be able to both apply a seal at the junction between the relined main pipeline and the branch pipeline, and simultaneously to reline the complete branch pipeline, or a part of the branch pipeline.

Several attempts have been made to reduce the risk of leakage. One such attempt has been described in the U.S. Pat. No. 6,029,726, which proposes a separate installation of a seal comprising a hat-shaped liner at the transition between the main pipe and the branch pipe. The seal is put in the correct place by an inflatable bladder, and a centrally located light source is used for curing.

Further prior art is listed below:

WO 98/57789 relates to a light curing device which uses compressed air for propelling the light curing device.

WO 95/25002 relates to a lining method which utilizes a pressurized fluid and a light curing device.

WO 2009/103398 relates to a flexible "light train" using LEDs on a carrier for curing liners.

WO 2009/021645 relates to a method of renovating pipeline junctions by LEDs curable impregnated liners.

WO 2009/021644 relates to the curing of liners by using a carrier having multiple UV emitting diodes.

WO 2009/029516 related to a liner tube including a gasket or bank positioned about the junction.

WO 2007/057082 A1 relates to a light curing device having pivotable arms.

WO 2004/104469 relates to a lining device comprising a tubular inserting member and a "light train".

WO 00/03863 relates to a light curing device having UV lamps and spring supported legs.

WO 2012/048089 relates to a seal installation device using a main bladder and a lateral bladder.

WO 2012/016247 relates to a seal installation device using a series of independently controlled bladders.

WO 95/08737 relates to a seal installation device driven by a tractor having a rotatable coupling.

WO 91/14127 relates to an apparatus for projecting a TV camera or similar into a lateral pipeline.

WO 01/61236 relates to a seal installation device having a self heating bladder including conducive fibers.

U.S. Pat. No. 8,316,892 B2 relates to a line having a seal comprising a hydrophobic gasket.

U.S. Pat. No. 6,337,114 relates to a liner having a lumen and a collar.

EP 1998099 B1 relates to a seal installation device having positioning means for positioning the liner correctly.

EP 0650006 relates to a method of lining a branch pipe using a liner bag.

The applicant company has a granted European patent publication number EP 2208920 B1, which discloses a method and a system for applying a resin-impregnated seal onto a junction between a branch pipe and a main pipe. The method and system involves applying a resin impregnated seal having a brim portion and a tubular portion using an inflatable ring structure having an integral radiant energy source for generating and irradiating radiant energy outwardly from the ring structure towards the brim. Further, a flexible guiding tube is used for placing the tubular part which is cured by using a separate radiation source.

The applicant company has further developed the above system and method into a general junction relining concept, which may be used in conjunction with the above patented relining system and method. The concept covers a plurality of objects, advantages and aspects which will be discussed below.

The general object according to the present invention is to provide efficient technologies for the relining of junctions between a main pipeline and a branch pipeline. It has been experienced that the seal using a brim portion and a tubular portion in some cases does not attach completely at the junction between the brim portion and the tubular portion, and that there is a risk that a void could appear there. A first object thus relates to the advantage of being able to ensure a tight fit at the junction at all times.

Using UV radiation for curing the liner constitutes a safety risk and thus the radiation sources must be handled very carefully to avoid the risk of accidental exposure to UV light. A further object relates to the possibility of avoiding having to use several radiation sources and instead being able to provide technologies for using a single light curing device for the curing of the main pipeline, the branch pipeline and the junction there between.

In connection with the "light trains" used in the prior art for moving the light sources in and out of the pipelines, the drive system, cooling system and electrical system require separate cables and wires which may be difficult to install and overview. A further object according to the present invention is to provide simple but yet effective drive system for the light curing device.

When a seal installation device is positioned at the junction between a branch pipeline and a main pipeline, it may be the case that the seal installation device is not entirely in registration with the branch pipeline. In such cases the seal will be placed somewhat off center. It is thus a further object according to the present invention to provide technologies for placing the seal at the junction with higher accuracy than previously possible.

In many cases, the relining takes place using a single access point, such as a manhole, for accessing the pipeline. In other cases a second manhole, is used for relining the main pipeline between these manholes, however, there does not exist equipment dedicated for placement of a seal onto a junction by accessing from two manholes using two winching vehicle communicating with each other. It is thus an object according to the present invention to provide technologies for relining by using two communicating vehicles positioned at opposite manholes.

It has been experienced that the cables for driving and powering the seal installation device may be quickly worn out by repeatedly rubbing against the access point, such as a manhole, of the main pipeline. Thus, a further object according to the present invention is to provide technologies for reducing the wear and tear of cables within the pipeline and at the access point.

The seals are typically put in place by the use of bladders and pressurized air. In case the distance is far between the supply of pressurized air and the bladder, it may occur that the bladder is overpressurised. It is thus a further object to provide technologies for avoiding overpressurization of the bladders of a seal installation device.

Traditionally, separate cables are used for positioning the seal installation device in the main pipeline, and for powering and controlling the seal installation device. It would be an advantage to be able to use a single cable for both purposes thus reducing the number of cables in the pipeline. Thus, it is a further object according to the present invention to provide technologies for reducing the number of cables used.

The light curing device is typically cooled by the use of compressed air as it is readily available since it is used for the other above mentioned purposes. In the prior art devices, the compressed air is led through heat sinks running straight through the light curing device. A further object according to the present invention is to provide technologies which allow for an even more efficient use of the compressed air as cooling fluid.

The seal installation device is typically coupled to a protective tube for avoiding that the bladder and/or seal is damaged. The tube should preferably be coupled easily to the seal installation device by using a coupling device. Thus, it is a further object according to the present invention to provide an easy to use but still safe coupling between the protective tube and the seal installation device.

The seal installation device and the bladder preferably have a design such that when the bladder has put the seal in place in the main pipeline and in the branch pipeline, it is possible for the light curing device to enter the seal installation device and enter both the main pipeline in the vicinity of the junction and then enter the branch pipeline in order to be able to cure the complete seal while it is held in place by the bladder. It is therefore a further object according to the present invention to provide technologies for the above purposes.

The seal is typically adhered onto the main pipeline using an adhesive which for obvious reasons is applied onto the part of the seal facing the main pipeline before the seal is cured. In order for the adhesive to adhere appropriately against the seal, it is advantageous that the seal prior to the application of the adhesive has been gelled, i.e cured to a state in which the resin is not liquid anymore, but still soft and flexible. In this way the adhesive, typically epoxy, has a stable surface for support and may create a more uniform layer between seal and pipeline for an optimal adherence. A further advantage is that the brim is kept tight against the seal installation device which eliminates the need for an additional fastening of the brim to the seal installation device. It is thus a further object to provide methods and systems for performing the gelling of the relevant parts of the seal, i.e. the brim part.

SUMMARY OF THE INVENTION

According to a first aspect of the present invention, the above mentioned objects and more are achieved by an assembly for relining a junction between a branch pipeline and a main pipeline, the assembly comprising a seal installation device capable of moving within the main pipeline to the junction, the seal installation device including a curable seal for being placed and pressed onto the junction, the assembly further comprising a light curing device for being introduced into the seal installation device within the main pipeline and the branch pipeline for curing the seal.

The main pipeline constitutes the pipeline, such as the sewage pipeline, which normally runs below the street and on which lateral or branch pipelines are connected, which lateral and branch pipelines connect to individual users, such as houses or the like. The main pipeline typically comprises access points such as manholes which are used for accessing the main pipeline for inspection and renovation purposes. The renovation of the junction between the main pipeline and the branch pipeline involves using a curable seal covering the parts of the main pipeline and the branch pipeline which are closest to the junction. The placement of the seal is made by a seal installation device which is capable of carrying a seal and moving into the main pipeline to the exact location of the junction. At the junction, the seal installation device optionally rotating such that the seal is pointing towards the junction and then presses the seal against the junction. Subsequently, the light curing device is moved into the seal installation device and cures the seal, thereby permanently fixating the seal to the junction in a fluid tight manner. It is a further feature to be able to reline the complete branch pipeline by using an appropriate custom made seal having a length of its cylindrical part corresponding to the complete branch pipeline.

According to a second aspect, the above mentioned objects and more are achieved by the seal comprising a tubular portion defining a longitudinal direction between a first opening and a second opening, and a brim portion attached to the tubular portion at the first opening and extending radially outwardly from the tubular portion defining a straight axial direction and a curved peripheral direction and comprising an outer layer for facing the main pipeline and an inner layer attached to the outer layer for facing away from the main pipeline, the seal being made to minimize contraction of the brim portion in the axial direction and of the first and second openings of the tubular portion during curing whereas allowing contraction of the outer layer of the brim portion in the peripheral direction and/or the tubular portion in the longitudinal direction during curing.

All composite materials will during curing experience a contraction which is depending on the material properties of the composite material. In case the contraction is not taken into account, it may lead to the establishment of voids or gaps between the seal and the junction. In order to ensure that the seal attached properly to the junction and that no void is established between the seal and the junction the contraction properties of the seal may be adapted for minimizing the contraction and, where applicable, allow contraction in the directions towards the junction. In this way any gaps or voids between the pipe surfaces of the junction and the corresponding parts of the seal may be avoided. Especially, in order to avoid gaps between the inner surface of the main pipeline and the brim portion of the seal, the brim portion may be made in two layers and the layer facing the surface of the junction may be adapted to contract in the circumferential direction.

In particular, the brim portion should be manufactured to correspond to the inner surface of the main pipeline and thus it will define a straight axial direction for facing the inner surface of the main pipeline in its longitudinal direction and a curved peripheral direction perpendicular to said axial direction for facing the inner surface of the main pipeline in its peripheral direction. During curing, the brim will tend to contract and as such it is more desirable that the contraction takes place non uniformly and primarily at the outer layer of the brim in the peripheral direction since it would cause the brim to extend or widen itself towards the inner surface of the main pipeline, i.e. decrease the curvature of the brim portion and thus establish a sealing force between the brim portion and the inner surface of the main pipeline. In comparison, a uniform contraction would cause the brim to establish a gap between the brim portion and the inner surface of the main pipeline.

Alternatively or in addition to the above, the tubular part may contract in the longitudinal direction of the branch pipeline during curing which would establish a stretching force between the brim part and the tubular part. Such stretching force will allow the seal to attach properly to the junction and prevent any gap at the location of the junction.

According to a further embodiment, the outer layer and the inner layer of the brim portion have fibers which are oriented in different directions, preferably random directions and/or perpendicular directions. In this way the contraction of the inner layer may differ from the outer layer.

According to a further embodiment, the outer layer of the brim portion comprises a resin impregnated layer for facing the main pipeline, and/or, the inner layer comprises a resin impregnated layer for facing away from the main pipeline, the resin impregnated layer preferably being made of fleece, such as PET, PP, PE, glass or most preferably PAN. The resin impregnated layer is used in order to prevent any damage on the seal caused by protrusions of the pipeline and bladder, or vice versa. The resin impregnated layer is applied to the surface of the outer and/or inner layer, respectively. A coating may be used instead of fleece. Further, the tubular portion may optionally have a layer of fleece or a coating of felt on the outer and/or inner surface.

According to a further embodiment, the outer layer and/or the inner layer comprises one or more sublayers of CSM. The CSM is preferably used as a filling material.

According to a further embodiment, the tubular portion comprises a felt material. This material allows for a small contraction in the longitudinal direction of the tubular part.

According to a further embodiment, the brim portion and the tubular portion are impregnated by a light curable resin. Light curable resins are preferably used in order to achieve a quick and energy efficient curing of the seal.

According to a further embodiment, the outer layer of the brim portion is stitched and/or adhered onto the inner layer of the brim portion, and/or, the brim portion and the tubular portion are stitched and/or adhered together. Stitching provides a durable and secure fastening of the different parts and layers. The layers are preferably stitched at the edges, or the layers may alternatively be adhered together. Alternatively, the layers may be thickened or gelled together. Gelling is made by exposing the layers to a small amount of radiation, whereas thickening is made by including a thickening agent in the resin.

Both techniques will cause partial curing which will hold the layers together while they remain flexible.

According to a further embodiment, the brim portion is provided with a sealing ring for facing the main pipeline, the sealing ring preferably comprising one or more rubber rings, more preferably a hollow rubber ring, and optionally including a metal wire or rigid plastic filament and optionally being hydrophilic, and/or a paste, optionally being hydrophilic. In this way an increased sealing is achieved which will prevent leakage.

According to a further embodiment, the outer layer comprises fibers predominantly directed in random direction and the inner layer comprises fibers predominantly directed in the circumferential direction. When using a sealing ring, it is desired that the brim portion is pressing towards the inner surface of the main pipeline in order to maintain the sealing properties of the seal.

According to a further embodiment, the brim portion is provided with a sealant layer, preferably an adhesive such as epoxy, for facing the main pipeline. Thereby the brim portion may be adhered to the main pipeline thus increasing the sealing properties of the seal. Alternatively, other cross linking two component adhesives may be used, such as polyurethane, vinylester or polyester adhesive.

According to a further embodiment, the epoxy layer extends on the brim portion outwardly from the first opening covering only a part of the brim portion between the first opening and an outer periphery of the brim portion, such as between 50% and 90% of the axial and peripheral direction between the first opening and the outer periphery of the brim portion. These numbers provide a suitable amount of adhesive without risking any spillage of adhesive when the seal is pressed against the main pipeline.

According to a further embodiment, wherein the outer layer and the inner layer comprise fibers predominantly directed and substantially equally distributed in the axial direction and the peripheral direction, respectively. When adhering the brim portion to the inner surface of the main pipeline, it is desired that the contraction of the brim is minimal in all directions, or at least only a very small outwardly oriented contraction in order to avoid delamination of the adhesive.

According to a third aspect, the above mentioned objects and more are achieved by a method of installing a seal onto a junction between a branch pipeline and a main pipeline, the method comprising the following steps:

providing the seal comprising a tubular portion defining a longitudinal direction between a first opening and a second opening, and a brim portion attached to the tubular portion at the first opening and extending radially outwardly from the tubular portion defining a straight axial direction and a curved peripheral direction and comprising an outer layer for facing the main pipeline and an inner layer attached to the outer layer for facing away from the main pipeline, the seal being made to minimize contraction of the brim portion in the axial direction and of the first and second openings of the tubular portion during curing whereas allowing contraction of the outer layer of the brim portion in the peripheral direction and/or the tubular portion in the longitudinal direction during curing, positioning the seal onto the junction between the branch pipeline and the main pipeline such that the brim part is located in and contacting the main pipeline about the junction and the tubular part extends into and contacting the branch pipeline, and curing the brim portion and subsequently curing the tubular part, thereby introducing a contraction force between the first and second openings of the tubular part and/or between the brim portion and the main pipeline According to a further embodiment, the tubular part is cured in a direction from the second opening towards the first opening. In this way a stretching force may be introduced which will pull the brim towards the junction.

According to a further embodiment, the method further comprising the step of gelling outer layer of the brim portion of the seal preferably by exposing the outer layer of the brim portion to radiation and thereafter applying an adhesive to the outer layer of the brim portion before the seal is positioned onto the junction. By gelling the outer layer, the adhesive, preferably epoxy, will adhere better to the main pipeline.

Further, the method according to the third aspect may preferably be used together with the seal according to the second aspect, According to a fourth aspect, the above mentioned objects and more are achieved by a gelling station comprising a holder for holding a seal installation device including a seal, the gelling station comprising a light source rotationally mounted to the holder via an arm and a motor for allowing the light source to rotate partially about the seal installation device at constant distance to a brim portion of the seal when mounted to the holder.

According to a fifth aspect, the above mentioned objects and more are achieved by a method of gelling a brim portion of a seal on a seal installation device, the gelling station comprising a holder for holding the seal installation device and a light source mounted to the holder via an arm and a motor, the method comprising the step of rotating the light source partially about the seal installation device at constant distance to the brim portion of the seal while irradiating the brim portion of the seal.

The gelling is preferably automatic in order to ensure that a proper amount of light reaches the brim portion of the seal such that a suitable gelling is obtained, i.e. a semi-solid surface but not a complete hardening.

According to a sixth aspect, the above mentioned objects and more are achieved by an assembly wherein the seal installation device comprising:

an elongated housing having a cylindrical wall extending between a first end and a second end of the housing, the cylindrical wall defining a grid structure and an opening located between the first end and the second end, a pivotable plate having a curved shape being located within the housing adjacent the opening, the pivotable plate defining a first edge which is hingedly attached to the cylindrical wall opposite the opening and a second edge opposite the first edge, the pivotable plate being pivotable between a first position in which the second edge is located at the cylindrical wall opposite the opening and a second position in which the second edge is located at the opening, and an inflatable, expandable and flexible bladder enclosing the grid structure of the cylindrical wall, the flexible bladder defining an inflated position and a deflated position, the flexible bladder having a first cylindrical part extending between the first end of the cylindrical wall and the second end of the cylindrical wall and being capable of, when the flexible bladder defining the inflated position, to apply a pressure force onto the main pipeline, and a second cylindrical part extending from the first cylindrical part at the opening and being capable of, when the flexible bladder defining the inflated position, to apply a pressure force onto the branch pipeline and, when the flexible bladder defining the deflated position, to be stored in an inverted shape within the grid structure.

In this way a self contained seal installation device is provided which may be used together with a standard curing device and thus as such does not require any onboard sources for curing of the seal. The seal installation device is positioned within the main pipeline juxtaposing the junction between the main pipeline and the branch pipeline. The seal which is to be placed at the junction may e.g. be stored on the bladder, i.e. the brim portion of the seal is stored adjacent the first cylindrical part of the bladder and the tubular portion of the seal is stored adjacent the second cylindrical part of the bladder in an inverted shape.

The flexible bladder is typically pressurized by introducing pressurized air via the first end and/or second end for expanding the first cylindrical part of the bladder. By doing this the first cylindrical part of the bladder expands towards the inner surface of the main pipeline and causes the brim portion of the seal to be pressed against the inner surface of the main pipeline adjacent the junction. Subsequently, when sufficient pressure is built up, the second cylindrical part will invert into the branch pipeline and cause the tubular portion of the seal to be pressed against the inner surface of the branch pipeline.

The pivotable plate together with the open grid structure of the housing allows the curing device to be moved within the seal installation device and by varying the pitch of the pivotable plate, the curing device may in the first position of the pivotable plate be lead through the housing within the main pipeline from the first end to the second end in order to cure the entire brim portion of the seal, and in the second position of the pivotable plate, the curing device may the lead through the opening in order to cure the entire tubular portion of the seal. Thus, a single curing device may be used which is anyway readily available for curing the other parts of the pipeline system. The curing device is typically a light curing device such as a LED curing device.

According to a further embodiment, the flexible bladder is light/electromagnetic radiation transparent or light translucent, preferably for UV light and/or visible light. In order to be able to use a light curing device efficiently, the flexible bladder should be light transparent or light translucent for transmitting the light from the light curing device through the bladder for curing the seal.

According to a further embodiment, the cylindrical wall of the elongated housing defines a circumferential direction and a longitudinal direction, the cylindrical wall comprises a first circumferential protrusion, the first circumferential protrusion defining a pin, the seal installation device further comprising a coupling part comprising a second circumferential protrusion, for being fitted adjacent the first circumferential protrusion, and an arc shaped slot extending from a start point on the first end and/or at the second end along the radial direction and along the longitudinal direction to an extreme point adjacent the second circumferential protrusion, and further to an end point being located between the start point and the extreme point in the longitudinal direction, the pin being capable of being guided by the arc shaped slot from the start point via the extreme point to the end point, the seal installation device further comprising a locking ring capable of being inserted between the first circumferential protrusion and the second circumferential protrusion for securing the coupling part and the elongated housing in a fixed position relative to each other when the pin is located at the end point.

In this way, the elongated housing may be easily coupled to other parts of the relining system, such as protective tubings or pressurization tubings, as will be explained in more detail below.

According to a further embodiment, the flexible bladder is made of silicone. Silicone has a high temperature stability, is fluid tight, UV resistant and does not support microbiological growth and is thus a very suitable material for the bladder. Alternatively, the bladder may be made of other suitable plastic materials, such as PVC, PE, PP and PU.

According to a further embodiment, the first end of the elongated housing is provided with a protective tubing for protecting the second cylindrical part when in the deflated position. In order to provide protection for the second cylindrical part and the tubular portion of the seal when the second cylindrical part is deflated and extends through the elongated housing, a protective tubing may be used which is advantageously attached using the above mentioned coupling.

According to a further embodiment, the pivotable plate is connected to a sliding profile extending in and slidable in a longitudinal direction of the housing. In this way the pitch of the pivotable plate may be easily changed.

According to a further embodiment, the sliding profile is driven by a mandrel in turn driven by a motor, optionally via a gear. This will allow a fast and accurate modification of the pitch of the pivotable plate.

According to a further embodiment, a seal is stored on the bladder. As already described above, in one preferred embodiment, the seal may be stored on the bladder.

According to a further embodiment, the first end and/or the second end comprises a connector, the connector comprising a gas supply vent for supplying pressurization gas to the bladder, a motorized controllable pressure relief valve for relieving the flexible bladder of excessive pressurized gas and a data cable for allowing data communication through the connector.

The connector is used for the main purpose of relieving the bladder from the additional pressure which is a result of the additional pressurized gas which is injected into the light curing device for cooling the light curing device. The amount of cooling gas is dependent on the need of cooling and this gas must escape from the otherwise closed bladder. Another purpose is to provide pressurized gas from a compressor for inflating the bladder and press the seal towards the junction.

Yet another purpose is to allow a data cable to pass through.

The motorized pressure relief valve uses a pressure sensor inside the seal installation device for monitoring the pressure at the bladder and adjust the effective flow opening in the valve so that sufficient pressure is maintained for keeping the bladder pressurized for applying a pressure onto the seal, whereas the pressure is not allowed to rise to levels which would prevent a proper cooling of the light curing device and/or cause a rupture of the bladder. Another purpose is for providing data communication. The data is typically data from the pressure sensor which is communicated to the motorized valve for regulating the pressure. Further, data may be allowed to be passed through in order to control other parts of the seal installation device.

According to a further embodiment, the seal installation device comprises an extension at the first end in form of a flexible hose, the hose optionally being adapted for accommodating a light curing device. In this way, the second part of the bladder may extend out through the hose acting as a flexible extension of the seal installation device at the first end when the bladder is in the deflated position, whereas when the bladder is in the inflated position, the first end will allow the light curing device to enter the elongated housing. The first end may be made pressure tight, whereas pressurized gas may be introduces via the second end, or vice versa.

According to a special embodiment, a hose, which may also act as protective tubing and pressure tubing, may accommodate the light curing device. During transport, when the bladder is in the deflated position, the light curing device may be accommodated in or on the hose and when the bladder is inflated and the seal put in place, the light curing device is readily available and may enter the elongated housing through the first end.

According to a seventh aspect, the above mentioned objects and more are achieved by a method of installing a seal onto a junction between a branch pipeline and a main pipeline, the method comprising providing a seal installation device comprising:

an elongated housing having a cylindrical wall and extending between a first end and a second end of the housing, the cylindrical wall defining a grid structure and defining an opening through the cylindrical wall located between the first end and the second end, a pivotable plate having a curved shape and being located within the housing adjacent the opening, the pivotable plate defining a first edge which is hingedly attached to the cylindrical wall opposite the opening and a second edge opposite the first edge, and an inflatable, expandable and flexible bladder enclosing the grid structure of the cylindrical wall, the flexible bladder having a first cylindrical part extending between the first end of the cylindrical wall and the second end of the cylindrical wall, and a second cylindrical part extending from the first cylindrical part at the opening, the flexible bladder defining a deflated position and the second cylindrical part is stored in an inverted shape within the grid structure, the method further comprising the steps of:

causing the flexible bladder to assume an inflated position in which the first cylindrical part applies a pressure force onto the main pipeline and the second cylindrical part applies a pressure force onto the branch pipeline, pivoting the movable plate to assume a first position in which the second edge is located at the cylindrical wall opposite the opening, inserting a light curing device into the seal installation device and light curing the main pipeline, pivoting the pivotable plate to assume a second position in which the second edge is located at the opening, and inserting a light curing device into the seal installation device and light curing the branch pipeline.

The above method is preferably used in connection with the above seal installation device in order to cure both the brim portion and the tubular portion of the seal using a single light curing device without requiring any light curing sources on the light curing device.

According to a further embodiment, the flexible bladder is expanded by using pressurized gas, preferably air or steam. Air is preferred as it may be easily provided using a compressor. Alternatively, water may be used or any similar fluid.

According to a further embodiment, the method further comprises the initial step of positioning the seal installation device adjacent the junction such that the opening of the housing is facing the branch pipeline. This constitutes the starting position for the inflation of the bladder and allows the second part of the bladder to enter the branch pipeline.

According to a further embodiment, the branch pipeline is cured in a direction from a position distant from the junction towards the junction. In this way the tubular part of the seal is first adhered to the distant position and due to the (small) contraction in the longitudinal direction of the tubular part of the seal, a force in the direction away from the junction is introduced into the seal. Consequently, the brim portion will be drawn somewhat into the branch pipeline resulting in a snug fit at the junction between the main pipeline and the branch pipeline.

According to an eighth aspect, the above mentioned objects and more are achieved by a connector for use in a seal installation device including a flexible bladder, the connector comprising a gas supply vent for supplying pressurization gas to the bladder, a motorized controllable pressure relief valve for relieving the flexible bladder of excessive pressurized gas and a data cable for allowing data communication through the connector. The connector has already been described above, and is of course usable in other seal installation devices.

According to a ninth aspect, the above mentioned objects and more are achieved by a method of supplying compressed gas to a flexible bladder of a seal installation device by using a connector comprising a gas supply vent for supplying pressurization gas to the bladder, a motorized controllable pressure relief valve for relieving the flexible bladder of excessive pressurized gas and a data cable for allowing data communication with and through the connector, the method comprising the steps of:

receiving pressurized gas by the gas supply vent for causing the flexible bladder to inflate, and relieving the flexible bladder of excessive pressurized gas by using the motorized controllable pressure relief valve controlled by the data cable.

The above mentioned method is preferably used in conjunction with the above mentioned connector.

According to a tenth aspect, the above mentioned objects and more are achieved by a light curing assembly including a light curing device and a drive mechanism for driving the light curing device through a pipeline, said drive mechanism being coupled to a seal installation device or to a tubing connected to a seal installation device, the drive mechanism comprising:

a flexible polymeric sheathing tube connected at one end to the light curing device and defining a curved outer surface, the polymeric sheathing tube being capable of pushing and pulling the light curing device, a first pair of rollers located on opposite sides of the sheathing tube, each roller of the first pair of rollers defining a concave peripheral surface contacting the curved outer surface of the sheathing tube and defining a curvature corresponding to the curved outer surface of the sheathing tube, the first pair of rollers being mutually interconnected, and a second pair of rollers located on opposite sides of the sheathing tube and adjacent the first pair of rollers, each roller of the second pair of rollers defining a concave peripheral surface contacting the curved outer surface of the sheathing tube and defining a curvature corresponding to the outer surface of the sheathing tube, the second pair of rollers being mutually interconnected.

Previously, a so called "light train" has been used for curing. The "light train" was pulled into the pipeline using a rope and pulley system. Wiring/tubing for providing power and cooling for the light train had to be provided separately. Instead, the above assembly uses a flexible polymeric sheathing tube, preferably made of a suitable plastics material being sufficiently flexible for allowing the light curing device to be pushed and pulled into and out of both the main pipeline as well as the branch pipeline. The flexible polymeric sheathing tube is preferably hollow in order to be able to convey cooling gas as well as power wires in its interior.

The rollers are used for achieving a friction surface against the flexible polymeric sheathing tube allowing it and thereby the light curing device to be both pulled and pushed. The provision of two pairs or rollers will ensure that a sufficient contact surface exists also when the light curing device is moved through a bend in the pipeline such as in the junction between the main pipeline and the branch pipeline.

According to a further embodiment, the first pair of rollers being mutually interconnected by means of a cog wheel and/or the second pair of rollers being mutually interconnected by means of a cog wheel. In this way it is ensured that the rollers will move with the same speed.

According to a further embodiment, the first pair of rollers being divided into one driving roller and one idle roller. In this way only one of the rollers of each pair must be driven and the opposite roller may simply be used for applying a counter pressure on the flexible polymeric sheathing tube.

According to a further embodiment, the idle roller of the first pair of rollers being spring loaded towards the driving roller of the first pair of rollers. By spring loading the idle roller, it may adapt to the movements of the flexible polymeric sheathing tube when e.g. the light curing device is pushed through a bend. The spring loaded roller will ensure that a suitable pressure is applied onto the flexible polymeric sheathing tube at all times.

According to a further embodiment, the second pair of rollers being divided into one driving roller and one idle roller. For the same reasons as above.

According to a further embodiment, the idle roller of the second pair of rollers being spring loaded towards the driving roller of the second pair of rollers. For the same reasons as above.

According to a further embodiment, the flexible and substantially non-elastic polymeric sheathing tube is made of PVC, PP, PE, or preferably PEX or any combinations of the above. The above list of plastic materials is suitable choices providing the required flexibility and durability.

According to a further embodiment, the flexible and substantially non-elastic polymeric sheathing tube includes electrical wiring for providing power to the light curing device and/or for providing data communication with the light curing device.

The electrical wiring is preferably located within the hollow polymeric sheathing tube in which it is protected. The wiring may be used for power and/or communication.

According to a further embodiment, the flexible polymeric sheathing tube is capable of supplying compressed gas, preferably air, to the light curing device. Since the polymeric sheathing tube is understood to be pressure tight, it may advantageously be used for conveying cooling gas from the outside into the light curing device.

According to a further embodiment, the first pair of rollers and the second pair of rollers are mutually interconnected by a cog wheel for ensuring a synchronized rotation of the rollers. Typically, the first pair of rollers and the second pair of rollers are driven independently, however, optionally, they may be interconnected and in this way all four rollers may be made to rotate synchronously.

According to a further embodiment, the first pair of rollers and/or the second pair of rollers being driven by an electrical motor, optionally via a gear box. Electrical motors may be used for achieving an accurate movement of the rollers.

According to a further embodiment, the concave peripheral surfaces of the first pair of rollers and/or the second pair of rollers being provided with a high friction surface, such as a roughened raw metal surface, optionally coated by rubber. In this way any slippage between the roller and the polymeric sheathing tube may be reduced, and the influence of any presence of water, fat or dirt inbetween the rollers is reduced.

According to a further embodiment, the first pair of rollers and/or the second pair of rollers being driven by a dual direction drive. In this way the light curing device may easily be moved back and forth.

According to an eleventh aspect, the above mentioned objects and more are achieved by a method of curing a pipeline by using a light curing assembly, the light curing assembly including a light curing device and a drive mechanism, the drive mechanism being coupled to a seal installation device or to a tubing connected to a seal installation device the drive mechanism comprising:
  a flexible polymeric sheathing tube connected at one end to the light curing device and defining a curved outer surface,
  a first pair of rollers located on opposite sides of the sheathing tube, each roller of the first pair of rollers defining a concave peripheral surface contacting the curved outer surface of the sheathing tube and defining a curvature corresponding to the curved outer surface of the sheathing tube, the first pair of rollers being mutually interconnected, and
  a second pair of rollers located on opposite sides of the sheathing tube and adjacent the first pair of rollers, each roller of the second pair of rollers defining a concave peripheral surface contacting the curved outer surface of the sheathing tube and defining a curvature corresponding to the outer surface of the sheathing tube, the second pair of rollers being mutually interconnected,
  the method further comprising the step of pushing the light curing device into the pipeline by rotating the rollers in a first direction and pulling the light curing device back from the pipeline by rotating the rollers in a second direction being opposite the first direction.

The above method is preferably carried out using any of the above mentioned assemblies.

According to a twelfth aspect, the above mentioned objects and more are achieved by the assembly further comprising a manipulator for positioning and rotating the seal installation device within the main pipeline for aligning the seal installation device with the branch pipeline, the manipulator comprising:
  a outer elongated frame defining a longitudinal direction and extending between a first end and an opposite second end, the outer elongated frame comprising wheels circumferentially disposed about the outer elongated frame for contacting the main pipeline and defining a rotational axis being perpendicular to the longitudinal direction for allowing the manipulator to move in the longitudinal direction within the pipeline, and
  an inner elongated frame defining a front end and an opposite rear end, said front end comprising a gripping mechanism for gripping said seal installation device, the inner elongated frame defines a smaller diameter than the outer elongated frame and the inner elongated frame and the outer elongated frame defining a mutually overlapping section.

When the seal installation device is pulled through the main pipeline, it is not always possible to ensure that it has the right angle in relation to the branch pipe. The manipulator is used for rotating the seal installation device such that it is correctly aligned with the branch pipeline. The inner elongated frame of manipulator is gripping the seal installation device at one end and the whole manipulator may as such be introduced into the main pipeline at the same time as the seal installation device.

Typically, in a first step the seal installation device together with the manipulator is pulled to a predetermined and verifiable location, such as the location of a camera, spring or detector for determining the location of the branch pipeline. When this location is reached, the outer elongated frame is expanded. The outer elongated frame comprises wheels and is clamped to the inner surface of the main pipe such that it is movable in the longitudinal direction while not rotatable. The inner elongated frame is rotated relative to the non-rotatable outer elongated frame, causing the seal installation device to be rotated as well since it is gripped by the inner elongated frame. In this way the correct angular position of the seal installation device may be established and maintained. Thereafter, the sealing installation device and manipulator is pulled to the correct longitudinal position which is the known distance between the predetermined and verifiable location and the seal carried by the seal installation device. The winching units are preferably driven by servo motors in order to allow an accurate positioning of the seal installation device.

According to a further embodiment, the outer elongated frame is capable of defining a contracted position in which the wheels define a first periphery about the outer elongated frame, and an expanded position in which the wheels defines a second periphery about the outer elongated frame, the first periphery being smaller than the second periphery. In this way the manipulator may be adapted to different pipeline diameters, and it will be easier to introduce the manipulator into the pipeline by allowing it to assume a smaller periphery.

According to a further embodiment, the outer elongated frame comprises a plurality of skids, the skids comprising the wheels, the plurality of skids preferably being between 3 and 5 skids, such as 4, the skids being capable of assuming the contracted position and the expanded position. In this way the manipulator will contact the inner surface of the main pipeline at precise locations and the movement of the manipulator will be easier to control. The skids ensure that the manipulator moves substantially straight within the main pipeline.

According to a further embodiment, the outer elongated frame comprises a camera at the second end and/or the inner elongated frame comprises a camera at the rear end. In this way the location of the branch pipeline may be visually identified during transport to location, and the longitudinal and angular position of the seal installation device may be changed by using the manipulator.

According to a further embodiment, the manipulator further comprises a first wire connected to the rear end of the inner elongated frame for moving the manipulator within the main pipeline. In this way the manipulator and the seal installation device may be pulled into the main pipeline.

According to a further embodiment, a second wire is connected to the seal installation device for moving the manipulator within the main pipeline. In order to be able to pull the manipulator and the seal installation device in the opposite direction a second wire may be connected to the seal installation device opposite the manipulator.

According to a further embodiment, the inner elongated frame comprises a camera at the front end. In this way the location of the branch pipeline may be visually identified and the longitudinal and angular position of the seal installation device may be changed by using the manipulator.

According to a further embodiment, the camera being pivotable. In this way, the camera may be directed along the main pipeline and subsequently pivoted for viewing the branch pipeline.

According to a further embodiment, the camera being pivotable along two axles being perpendicular to the longitudinal direction. More beneficially, the camera is movable along two axles for being able to inspect the branch pipeline more easily.

According to a further embodiment, the camera comprises a spring for detecting the branch pipeline. The spring may be used for detecting the presence of a branch pipeline when moving the manipulator through the main pipeline. When the manipulator is introduced into the main pipeline the spring will be bending within the main pipeline until the location of a branch pipeline at which location the spring will assume a straight position as it will partially enter the branch pipeline. The position of the camera is directly below the spring this is useful for detecting the precis angular and longitudinal position of a branch pipeline, since the position of the spring in the branch pipeline opening is increasingly difficult to determine using only visual aids as the distance between the spring and the camera increase.

According to a further embodiment, the inner elongated frame being located within the outer elongated frame, the front end extending beyond the first end and the rear end extending beyond the second end.

According to a further embodiment, the manipulator is driven by an electrical motor. Normally, the manipulator is not driven by a motor but only pulled by the winching units in both directions. It is however contemplated that an electrical motor may be used for driving the manipulator and the seal installation device within the pipeline thereby omitting the use of pulling wires.

According to a further embodiment, the outer and the inner elongated frame preferably being interconnected by a set of cogwheels within the mutual overlapping section of the frames. The cogwheels may be driven by electrical motors for allowing an accurate rotation.

According to a further embodiment, the inner elongated frame comprises a flexible antenna extending in a radial direction for accurately detecting the position of the branch pipeline, the flexible antenna preferably constituting a spring. The antenna preferably being visible by the camera. The antenna may be used for physically detecting the location of the branch pipeline, such that the seal installation device may be positioned correctly by moving the setup the known distance between the antenna and the seal on the seal installation device, by using the servo motors of the winching units in order for an accurate positioning.

According to a thirteenth aspect, the above mentioned objects and more are achieved by the method of positioning and rotating a seal installation device, the method comprising providing a manipulator comprising:

a outer elongated frame defining a longitudinal direction and extending between a first end and an opposite second end, the outer elongated frame comprising wheels circumferentially disposed about the cylindrical housing and defining a rotational axis being perpendicular to the longitudinal direction, and an inner elongated frame defining a front end and an opposite rear end, the rear end being rotationally connected to the first end of the outer elongated frame, the front end comprising a gripping mechanism for gripping the seal installation device, the inner elongated frame defines a smaller diameter than the outer elongated frame and the inner elongated frame and the outer elongated frame defining a mutually overlapping section, the method comprising the steps of:

gripping the seal installation device using the gripping mechanism, causing the wheels to contact the main pipeline, rotating the inner elongated frame relative to the outer elongated frame and moving the manipulator in the longitudinal direction within the pipeline causing the seal installation device to be aligned with a branch pipeline.

The above method is preferably used with any of the above manipulators. The contact of the wheels with the main pipeline prevents any rotational movement of the outer elongated frame as it will be clamped in the rotational direction. Movement in the longitudinal direction is possibly due to the wheels. The inner elongated frame may by the cogwheel connection to the outer elongated frame be rotated infinitely without any limitations, i.e. a 360° turn and more is possible.

According to a fourteenth aspect, the above mentioned objects and more are achieved by the main pipeline extending between a first end and a second end and the assembly further comprising:

a first motorized winching vehicle for being positioned at the first end of the pipeline and comprising a first control unit and a first winching unit controlled by the first control unit, the first winching unit including a first cable connectable to a first end of the seal installation device, and a second motorized winching vehicle for being positioned at the second end of the pipeline and comprising a second control unit and a second winching unit controlled by the second control unit, the second winching unit including a second cable connectable to a second end of the seal installation device, the first control unit and the second control unit establishing mutual communication for synchronizing the first winching unit and the second winching unit.

The first and second ends of the pipeline may in the present context refer to manholes between which a main pipeline extends, however, it may also refer to a manhole of a main pipeline and an opposite end located in a branch pipeline e.g. in a house. Initially, the first cable is introduced through the pipeline at the first end and received at the second end, or vice versa. This cable is used for pulling the seal installation device into the pipeline to the location that should be renovated. For this purpose the first winching vehicle is used, however, the two winching vehicles must still be operated in a synchronous mode in order to be able to move the seal installation device in both directions and position it correctly below the junction between the main pipeline and the branch pipeline.

It is desirable to be able to control the pipeline renovation process from a single user interface, e.g. at the second end, at the second motorized winching vehicle, as the seal installation device is introduced at this end. Thus, the first motorized vehicle which is remotely controlled from the second motorized winching vehicle. In this way the first winching unit and the second winching unit are synchronized. Of course, it would be equally feasible to control the winching units from any other location than the second motorized winching vehicle, such as the first motorized winching vehicle. The communication is preferably made via the first cable and/or the second cable. The communication may preferably be made using electrical signals, however, fiber optics may also be used.

Whereas both motorized winching vehicles typically are mobile and flexible, one of the motorized winching vehicles, typically the first, is preferably a small and flexible unit capable of maneuvering to a distant location and at such location to be remotely operated from the other winching vehicle (or to remotely operate the other winching vehicle) causing the winching units to be synchronized and allowing the seal installation device to be moved in both directions by synchronously operating the winching unit in one direction or in the other direction.

According to a further embodiment, the first cable is communicating with and powering the seal installation device, whereas the second cable constituting a pulling cable such as a steel wire, and the first control unit and the second control unit establishing mutual communication via wireless communication or via a separate communication wire.

According to a special embodiment, only the first cable is used for pulling the seal installation device and providing power and communication with the seal installation device, whereas the second cable is a dedicated pulling cable such as a steel cable without any communication or power capabilities. In this way, communication between the first winching unit and the second winching unit for synchronization purposes is made via a secondary cable, i.e. a communication cable, or alternatively by wireless means such as radio. Communication and power to the seal installation device is thus provided only by the first cable.

According to a further embodiment, both the first cable and the second cable being capable of communicating with and powering the seal installation device, the first control unit and the second control unit establishing mutual communication via the first cable, the seal installation device and the second cable. In case both the first and second cables are providing power and communication to the seal installation device, the system is made redundant and in case of a power failure in one of the seal installation devices, the other may be used for powering the complete system. Further, communication between the first winching vehicle, the second winching vehicle and the seal installation device may be made via the first and second cables allowing the seal installation device to be controlled from any of the first and second winching vehicle. Yet further, the second winching vehicle may be controlled and powered from the first winching vehicle, and vice versa.

According to a further embodiment, the first cable and/or the second cable comprises a pair of data communication wires for establishing data communication between the first control unit and the second control unit using a digital communication protocol, and wherein the first cable and/or the second cable comprises at least two and preferably three power transmission wires.

In order to reduce the number of communication wires needed and still be able to send and receive data to multiple receiving units, such as motors and sensors, a digital communication protocol may be used. For this purpose two wires are used for data communication, allowing a communication line substantially free of noise. Each motor and sensor communicating with the user interface may have an individual digital address which enables it to be contacted by the user and send/receive data packets. Also the first and second winching units communicate using the digital communication protocol.

Further, two separate wires may be used for powering the motors of the seal installation device by e.g. DC power, preferably low voltage, i.e. under 50V. Both the winching vehicles may act as power sources, however, one of the winching vehicles may also provide power to the other for several purposes such as a backup in case of power failure in one of the winching vehicles or as a continuous power supply to the other winching unit. As one or even both of the winching vehicles may be battery powered, the wires may be used for charging batteries in one of the winching units. A third power wire may be used for the purpose of powering the other winching unit using a common ground.

According to a further embodiment, the first cable and/or the second cable comprises an outer polymeric sheath and at least one sheath of a load transmitting material, such as Kevlar sheath, and wherein the sheath preferably is fixated to a plug housing by a cross-linked adhesive joint, such as an epoxy joint.

In order to be able to use one cable for both pulling the seal installation device through the main pipeline and to provide power and communication to the seal installation device, the cable should include a load transmitting material. The expression load transmitting material should be understood to be a material which due to its properties is capable of withstanding the stress produced by pulling the seal installation device through a pipeline and allow the cable to have similar properties as e.g. a wire made of steel. Such materials may be e.g. Kevlar, but other tough materials such as steel or nylon would be equally feasible. Also the plug housing of the cable, which is connecting the cables to the first and second winching units and to the seal installation device, should be capable of withstanding the force involved in pulling the seal installation device. Preferably, the sheath is fixated to the plug housing by an epoxy joint. An outer polymeric sheath may be used for providing protection and electrical insulation.

According to a further embodiment, the first motorized winching vehicle constitutes an electrically powered vehicle, preferably a battery powered vehicle, and/or the second motorized winching vehicle constitutes a truck and/or the winching units being driven by servo motors. Typically, one of the winching vehicles constitutes the truck which is used for transportation of all components to the installation site, and the other winching vehicle constitutes a small electrical vehicle, having the size of a motorized wheelbarrow which may be transported to the installation site inside the truck or on a trailer.

The electrically powered vehicle may be advantageous to use in confined locations and at indoor locations where it is not possible to use a truck. The winching units are preferably driven by servo motors in order to allow an accurate positioning of the seal installation device.

According to a further embodiment, the first cable and/or the second cable establishes data communication with and/or provide power to the seal installation device, such as a pressure relief valve, a pressure sensor, a driving motor for a light curing device, a position sensor, a velocity sensor, an operating motor for the seal installation device, a rotation motor for the seal installation device or a clamping motor for clamping the seal installation device.

The above data communication to and from all relevant parts of the seal installation device and associated devices such as the winching devices is provided via the cable which thus operates as a communication bus. The above mentioned devices are examples of devices which are connectable as nodes in the communication bus. The master node may be located in one or both of the first and second winching vehicles, however, operation without a specific master node is equally feasible. The bus may be e.g. a CAN bus.

According to a further embodiment, the first motorized winching vehicle and/or the second motorized winching vehicle comprises a user interface. One or both of the winching vehicles typically include a user interface. Providing a user interface on both the first and second winching vehicle allows for redundancy and flexibility of using the interface which is more convenient, however, the user may also change location, such that the user interface on the second winching vehicle is used i.e. for monitoring the insertion of the seal installation device into the main pipeline at the location of the second winching vehicle, whereas otherwise the user interface of the first winching vehicle is used.

According to a further embodiment, further comprising a pulley assembly for protecting and redirecting the first cable and/or the second cable within the main pipeline, the pulley assembly comprising:
  a rod shaped housing defining a first end and an opposite second end, the rod shaped housing including an actuator and a plurality of expanders, the expanders being operable by using the actuator between a contracted position in which the rod shaped housing defines a first outer periphery for allowing the pulley assembly to move within the main pipeline, and an expanded position in which the rod shaped housing defines a second outer periphery being larger than the first outer periphery for allowing the pulley assembly to be clamped within the main pipeline, and
  a pulley for accommodating the first cable and/or the second cable, the pulley being mounted at the first end of the housing, the pulley defining a circumferential groove for receiving the first cable and/or the second cable, the pulley further including locking pins for securing the first cable and/or the second cable to the pulley.

The first and second cables including power and communication wires and being used for pulling the seal installation device are naturally more fragile and at the same time more expensive than steel cables. Further, the first and second cables including power and communication wires should not be bent excessively since the wire insulation layer may be damaged which would cause the cable to malfunction. In order to allow the first and/or second cables to be gently conveyed into the main pipeline from e.g. a manhole, typically involving a right angle bend, a pulley assembly may be used.

The pulley assembly is clamped inside the main pipeline and include a pulley having an appropriate radius for allowing the cable to be lead from the manhole to the main pipeline without risking any damage from the right angle bend between the manhole and the main pipeline. The pulley is fastened at the junction between the manhole and the main pipeline by using the actuator and expanders. A circumferential groove and locking pins are used for arresting the cable to the pulley.

According to a fifteenth aspect, the above mentioned objects and more are achieved by a method of installing a lining tube in a pipeline using a seal installation device, the pipeline extending between a first end and a second end, the assembly comprising:
  a first motorized winching vehicle comprising a first control unit and a first winching unit controlled by the first control unit, the first winching unit including a first cable connectable to a first end of the seal installation device, and
  a second motorized winching vehicle comprising a second control unit and a second winching unit controlled by the second control unit, the second winching unit including a second cable connectable to a second end of the seal installation device,
  the method comprising the steps of:
  positioning the first motorized winching vehicle at the first end of the pipeline,
  positioning the second motorized winching vehicle at the second end of the pipeline,
  connecting the first cable to the first end of the seal installation device,
  connecting the second cable to the second end of the seal installation device, and
  establishing mutual communication between the first control unit and the second control unit for synchronizing the first winching unit and the second winching unit.

The above method may preferably be used in conjunction with the above assembly.

According to a sixteenth aspect, the above mentioned objects and more are achieved by a cable comprising an outer polymeric sheath encapsulating at least one Kevlar sheath, which in turn circumferentially encloses a bundle comprising at least one power line and at least one communication line, the cable defining an end comprising a plug housing, wherein the Kevlar sheath is fixated to the plug housing by a cross-linked adhesive joint, such as an epoxy joint.

The cable, which has been described above, has a polymeric sheath as an outer encapsulation which provides protection and insulation. Below is a Kevlar sheath which is capable of enduring high loads and which will allow the cable to act as a pulling cable for the seal installation device. The power line and the communication line are preferably protected within the Kevlar sheath. In order to be able to transmit the pulling force through the plug, the plug housing is joined to the Kevlar sheet by an epoxy joint which forms a cross linked adhesive bond with the Kevlar and thus provides a very strong fixation.

According to a seventeenth aspect, the above mentioned objects and more are achieved by a method of producing a cable by:
- providing a bundle comprising at least one power line and at least one communication line,
- circumferentially enclosing the bundle with at least one Kevlar sheath,
- encapsulating the Kevlar sheath with an outer polymeric sheath, and
- fixate the Kevlar sheath to a plug housing by an cross-linked adhesive joint, such as an epoxy joint, at a cable end.

The above method is preferably used for manufacturing the above cable.

According to an eighteenth aspect, the above mentioned objects and more are achieved by a pulley assembly for protecting and redirecting a cable within a pipeline, the pulley assembly comprising:
- a rod shaped housing defining a first end and an opposite second end, the rod shaped housing including an actuator and a plurality of expanders, the expanders being operable by using the actuator between a contracted position in which the rod shaped housing defines a first outer periphery for allowing the pulley assembly to move within the pipeline, and an expanded position in which the rod shaped housing defines a second outer periphery being larger than the first outer periphery for allowing the pulley assembly to be clamped within the pipeline, and
- a pulley for accommodating the cable, the pulley being mounted at the first end of the housing, the pulley defining a circumferential groove for receiving the cable, the pulley further including locking pins for securing the cable to the pulley.

The pulley assembly has already been described above and may be used for protecting cables. The actuator of the pulley assembly may be controlled by the cable, however, more conveniently a separate cable is used for controlling the actuator.

According to a further embodiment, the actuator comprises a scissor mechanism and/or the circumferential groove defines a circumferential indentation being deeper than the diameter of the cable. The scissor mechanism provides an efficient clamping of the pulley assembly to the main pipeline whereas a deep circumferential indentation will protect the cable, provide a well defined space for the cable and prevent the cable from falling out of the pulley, i.e. "derailing".

According to a nineteenth aspect, the above mentioned objects and more are achieved by a method of protecting and redirecting a cable within a pipeline by using a pulley assembly, the pulley assembly comprising:
- a rod shaped housing defining a first end and an opposite second end, the rod shaped housing including an actuator and a plurality of expanders, and
- a pulley for accommodating the cable, the pulley being mounted at the first end of the housing, the pulley defining a circumferential groove and locking pins, the method comprising the steps of:
- receiving the cable in the circumferential groove,
- securing the cable to the pulley by using the locking pins,
- introducing the pulley assembly into the pipeline in a contracted position in which the rod shaped housing defines a first outer periphery for allowing the pulley assembly to move within the pipeline, and
- clamping the rod shaped housing within the pipeline by operating the actuator for causing the expanders to assume the expanded position in which the rod shaped housing defines a second outer periphery being larger than the first outer periphery.

The above method is preferably used in conjunction with the above pulley assembly.

According to a twentieth aspect, the above mentioned objects and more are achieved by an assembly further comprising a compressed gas supply for use in the seal installation device including a flexible bladder, the compressed gas supply comprising an inlet adapted to receive pressurized gas for causing the flexible bladder to inflate, and an overpressure valve for relieving the flexible bladder of excessive pressurized gas.

According to a twenty-first aspect, the above mentioned objects and more are achieved by a light curing device for use in curing of pipelines, the light curing device comprising a housing defining:
- a transparent cylindrical outer cover defining a first end and an opposite second end,
- a first end piece covering the first end of the transparent cylindrical cover, the first end piece defining a cooling fluid inlet and a cooling fluid outlet,
- a second end piece covering the second end of the transparent cylindrical cover, the second end piece defining a fluid reversing chamber,
- an inner heat sink defining a central fluid passage extending from the cooling fluid inlet to the fluid reversing chamber,
- an outer heat sink coaxially enclosing the inner heat sink and defining an outer passage between the outer heat sink and the inner heat sink, the outer passage being separated from the inner passage and extending from the fluid reversing chamber to the cooling fluid inlet, and,
- a plurality of light sources located between the outer heat sink and the transparent outer cover.

The light curing device should have an overall dimension suitable for being introduced into the main pipeline and as well into the branch pipeline. It is used in conjunction with a seal installation device and introduced into the light curing device after the bladder has pressed the seal onto the junction. When curing the seal, the housing is moved within the seal installation device and bladder to locations adjacent the seal as the seal is pressed against the junction between the main pipeline and the branch pipeline. The seal is impregnated by a light curable resin which will harden upon exposure of light having a wavelength range adapted to the type of resin used. The cylindrical outer cover should be transparent to the wavelengths used in the curing process while protecting the light sources. The end pieces should close off the circular ends of the cylindrical outer cover.

The light sources typically produce significant amounts of heat which would cause the housing to overheat within the confined space of the seal installation device and bladder. This would not only damage the light curing device but potentially also the bladder and other parts of the seal installation device. The light sources are consequently to be cooled by a cooling fluid which cools the light sources via the inner heat sink and the outer heat sink. The chilled cooling fluid first being heated by the inner heat sink which is thermally connected to the outer heat sink but fluidly separated from the outer passage. The fluid revising chamber at the opposite end of the housing relative to the inlet allows the fluid to flow outwardly and turn back towards the first end piece and released out through the fluid outlet while being heated by the outer heat sink.

The release of the cooling fluid is thus made in essentially the same direction as the incoming cooling fluid. This is very advantageous since it avoids any release of cooling fluid into the branch pipeline which would typically be closed off by the bladder of the seal installation device. The released cooling fluid will contribute to maintaining the bladder inflated and thus limit the need of any supplementary pressurization gas during the curing of the seal. The excessive cooling fluid may e.g. be released into the main pipeline via the above mentioned overpressure valve. Further, as the cooling fluid flows in both directions along the lengths of the housing, it may be ensured that the cooling is substantially uniform along the length of the housing.

According to a further embodiment, the cooling fluid inlet is connected to a flexible polymeric sheathing tube defining a curved outer surface and being capable of supplying cooling fluid to the cooling fluid inlet. The sheathing tube should be understood as being a fluid tight hose capable of supplying the cooling fluid to the centrally located fluid inlet of the housing. The flexibility should be sufficient for the housing to be able to be maneuvered into the main pipeline and branch pipeline within the seal installation device and bladder. The tube should preferably be sufficiently robust to be able to pull the housing.

According to a further embodiment, the polymeric sheathing tube has a sufficient rigidity for being capable of pushing and pulling the light curing device. Preferably, the polymeric sheathing tube is sufficiently non-elastic and rigid to be able to push the housing into the main pipeline and branch pipeline, as this would dispense with pulley systems for moving the housing inside the pipeline system.

According to a further embodiment, the light curing device further includes a drive mechanism for driving the housing through a pipeline, the drive mechanism being coupled to a seal installation device or to a tubing connected to the seal installation device, the drive mechanism comprising:
  a first pair of rollers located on opposite sides of the sheathing tube, each roller of the first pair of rollers defining a concave peripheral surface contacting the curved outer surface of the sheathing tube and defining a curvature corresponding to the curved outer surface of the sheathing tube, the first pair of rollers being mutually interconnected, and
  a second pair of rollers located on opposite sides of the sheathing tube and adjacent the first pair of rollers, each roller of the second pair of rollers defining a concave peripheral surface contacting the curved outer surface of the sheathing tube and defining a curvature corresponding to the outer surface of the sheathing tube, the second pair of rollers being mutually interconnected.

The drive mechanism has been explained in detail above and has the advantage of being able to move the housing in both directions very accurately. It is advantageously mounted adjacent the bladder of the seal installation device in order to minimize the travel distance of the housing.

According to a further embodiment, the polymeric sheathing tube includes electrical power wirings for providing electrical power to the light sources. In this way the wirings are protected from any damage.

According to a further embodiment, the polymeric sheathing tube includes communication wirings for providing communication with the light sources or other devices associated with the light curing device such as a temperature sensor or a pressure sensor. Pressure and temperature sensors are advantageously used for controlling the flow of cooling fluid through the housing. By locating the communication wires inside the sheathing tube, they are protected as described above in connection with the power wires. The communication may be digital or analog.

According to a further embodiment, the light sources are located on the outer heat sink. In this way, they may be directly cooled by the flow of cooling fluid.

According to a further embodiment, the cooling fluid inlet is centrally located on the first end piece, whereas the cooling fluid outlet is located off centre or circumferentially about the fluid inlet on the first end piece. In this way there is no need for any complicated flow channels within the first end piece.

According to a further embodiment, the light sources emit light primarily within the visual spectrum, such as blue light.

Blue light curing is advantageous since it does not pose a potential safety hazard as does UV light.

According to a further embodiment, the light sources constituting LEDs, LECs, and/or OLEDs. LEDs, LECs, and/or OLEDs are advantageous due to their compact size and low energy consumption.

According to a further embodiment, the inner heat sink and/or the outer heat sink is manufactured using metal printing technologies. By using printing technologies, the heat sinks can be made with a much larger surface area compared to the commonly used machining techniques. By printing technologies is meant 3D printing using metal. 3D printing allows forming of very complex structures which would not be possible to form using common machining technologies.

According to a further embodiment, the inner heat sink and/or the outer heat sink is made of aluminum. Aluminum is a preferred material to be used since it has a very high thermal conductivity and usable for printing techniques since it may be laser sintered.

According to a further embodiment, the cooling fluid is compressed air. Compressed air is advantageous to use since it is typically readily available when relining for expanding the lining tube and in particular for the purpose of expanding the bladder for applying the seal.

According to a further embodiment, the inner heat sink and/or the outer heat sink comprises a heat pipe or a Peltier element. Additional cooling may be supplied from external sources, such as via a heat pipe or Peltier element, and/or the light curing device is provided with additional cooling via a stream of air between the outer cover and the light sources.

Further cooling possibilities include allowing a stream of cooling fluid to pass between the light sources and the outer cover.

The above mentioned cooling principles may also be used in order to provide cooling to the curing apparatuses described in e.g. WO 98/57789 A1 and/or WO 95/25002 A1.

According to a twenty-second aspect, the above mentioned objects and more are achieved by a method of cooling a light curing device, the light curing device comprising a housing defining:
  a transparent cylindrical outer cover defining a first end and an opposite second end,
  a first end piece covering the first end of the transparent cylindrical cover, the first end piece defining a cooling fluid inlet and a cooling fluid outlet, a second end piece covering the second end of the transparent cylindrical cover, the second end piece defining a fluid reversing chamber, an inner heat sink defining a central fluid passage extending from the cooling fluid inlet to the fluid reversing chamber, an outer heat sink coaxially enclosing the inner heat sink and defining an outer passage between the outer heat sink and the inner heat sink, the outer passage being separated from the inner passage and extending from the fluid reversing chamber to the cooling fluid inlet, and a plurality of light sources located between the outer heat sink and the transparent outer cover, the method comprising the step of causing a cooling fluid to pass through the housing from the cooling fluid inlet to the cooling fluid outlet via the central fluid passage, the fluid reversing chamber and the outer fluid passage.

The above method may be used in conjunction with the above mentioned light curing device.

According to a twenty-third aspect, the above mentioned objects and more are achieved by a seal installation device comprising an elongated housing and a coupling part defining a cylindrical wall in turn defining a circumferential direction and a longitudinal direction, the cylindrical wall comprises a first circumferential protrusion, the first circumferential protrusion defining a pin, the seal installation device further comprising a coupling part comprising a second circumferential protrusion, for being fitted adjacent the first circumferential protrusion, and an arc shaped slot extending from a start point on the first end and/or at the second end along the radial direction and along the longitudinal direction to an extreme point adjacent the second circumferential protrusion, and further to an end point being located between the start point and the extreme point in the longitudinal direction, the pin being capable of being guided by the arc shaped slot from the start point via the extreme point to the end point, the seal installation device further comprising a locking ring capable of being inserted between the first circumferential protrusion and the second circumferential protrusion for securing the coupling part and the elongated housing in a fixed position relative to each other when the pin is located at the end point.

In this way, the elongated housing may be easily coupled to other parts of the relining system, such as protective tubings or pressurization tubings. In order to couple the coupling part to the seal installation device, the pin of the coupling part is mated to the arc shaped slot at the start point, caused to follow the slot to the extreme point by rotating the coupling part relative to the elongated housing and pushing the first circumferential protrusion and the second circumferential protrusion towards each other. When reaching the extreme point, the coupling part is further rotated relative to the elongated housing following the arc shaped slot causing the first circumferential protrusion and the second circumferential protrusion to be separated again and form a gap in which the locking ring is placed, thereby effectively preventing separating the coupling part and the elongated housing by operating the above steps in reverse order.

According to a twenty-fourth aspect, the above mentioned objects and more are achieved by a method of relining a junction between a branch pipeline and a main pipeline, the method comprising providing a seal installation device including a curable seal, the method comprising the steps of:

moving the seal installation device within the main pipeline to the junction, optionally rotating the seal installation device relative to the junction, placing and pressing the seal onto the junction by using the seal installation device, and introducing a light curing device into the installation device within the main pipeline and the branch pipeline for curing the seal.

The above method may be used in conjunction with the above mentioned seal installation device.

According to a twenty-fifth aspect, the above mentioned objects and more are achieved by an apparatus for curing a liner of a pipeline, the liner including a resin which is curable by exposure to electromagnetic radiation of a specific wavelength or a specific wavelength range, the apparatus comprising:

a housing defining opposite first and second ends, an outer wall of a substantially cylindrical configuration, and an inner wall defining a substantially unobstructed through-going passage extending longitudinally through the housing between the first and second ends, a pair of power supply wires for the supply of electrical power to the apparatus and extending from the first end of the housing, a plurality of LED's irradiating electromagnetic radiation of the specific wavelength or the specific wavelength range, the plurality of LED's being positioned and substantially evenly distributed at the outer wall of the housing, the plurality of LED's being connected through an electronic circuit to the pair of power supply wires, and the plurality of LED's being connected in thermal conductive relationship to heat dissipating elements freely exposed at the inner wall of the housing in the through-going passage of the housing for allowing a stream of cooling fluid to pass through the passage for dissipating heat from the heat dissipating elements and cooling the LED's, characterized in that the housing defines an innermost wall dividing the substantially unobstructed through-going passage into an inner passage centrally located within the substantially unobstructed through-going passage and extending substantially between the first and second ends, and, an outer passage defined between the inner wall and the innermost wall and coaxially enclosing the inner passage.

The apparatus according to the twenty-fifth aspect of the present invention includes basically a housing, which defines a through-going passage for allowing a stream or cooling fluid, such as pressurized air to pass through the through-going passage for cooling the LED's, which communicate thermally with the through-going passage through the heat dissipating elements.

The through-going passage may be configured for allowing the passage of pressurized air (or another fluid as explained below), which may also in certain applications of the apparatus serve to inflate the liner, however, according to alternative embodiments the through-going passage is in a closed loop connected to a cooling source, which may e.g. supply cooled air, such as low-temperature nitrogen or simply cooled atmospheric air possibly pressurized or alternatively the closed cooling circuit communicating with the through-going passage of the housing may serve to allow the flow of a cooling liquid, such as water, or any conventionally used cooling liquid used within the cooling or refrigerator industry. The flow of cooling liquid may be generated externally by e.g. a pressurizing air compressor, a water pump or the like and/or internally by e.g. a fan or pump.

As an alternative to air or nitrogen, another inert gas may be used as fluid such as argon.

It is to be understood that the electromagnetic radiation of the specific wavelength or the specific wavelength range primarily comprises visible light such as electromagnetic radiation within the wavelength area of approx. 400 nm-approx. 800 nm, in particular, as will be describes below, blue light of a wavelength of approx. 450 nm. However, the electromagnetic radiation may additionally or alternatively comprise IR such as electromagnetic radiation within the wavelength area of 800-1000 nm, alternatively or additionally UV, i.e. electromagnetic radiation within the wavelength area of 200-400 nm. It is particularly preferred that the electromagnetic radiation comprises the wavelength area of 230-1500 nm, such as 250-1000 nm, e.g. 400-800 nm, further preferred 400-600 nm, such as 430-500 nm, or alternatively 330-350 nm, 350-400 nm, 400-500 nm, 500-600 nm, 600-700 nm, 700-1000 nm and/or 1000-1500 nm.

The apparatus according to the present aspect of the present invention constitutes a basically self-contained unit as the housing, the pair of power supply lines together with the LED's and the through-going passage of the housing allow the unit to be simply set up by connecting the power supply lines to the power supply source, such as a DC supply source or alternatively an AC or main supply source connected to the power supply liner through a rectifying circuit and in addition the through-going passage is simply connected to the cooling fluid, such as a pressurized air generator.

Provided pressurized air or cooled air is used for cooling of the heat dissipating elements and consequently cooling of the LED's, the apparatus according to a presently preferred embodiment of the apparatus according to the first aspect of the present invention advantageously comprises a blower supported by said housing and connected to said pair of power supply wires for receiving electrical power therefrom and serving to enhance or generate a stream of cooling air through said through-going passage.

The housing constituting the central part of the apparatus according to the first aspect of the present invention may be configured in any appropriate geometrical shape, such as a cylindrical shape, e.g. a circular cylindrical shape or a polygonal cylindrical shape. Irrespective of the actual geometrical configuration, however, in particular in connection with polygonal cylindrical shapes of the housing, the outer wall of the housing is advantageously and preferably composed of a set of curved or planar surface elements, each of said curved or planar surface elements extending longitudinally between said first and said second ends of said housing, said surface elements being of identical configuration.

According to the above-described presently preferred and advantageous embodiment of the apparatus according to the first aspect of the present invention comprising curved or planar surface elements, the LED's are preferably arranged at the curved or planar surface elements for allowing the LED's to be positioned at a preset and specific distance from the surface of the liner, which is to be irradiated by the LED's and consequently provide a specific and predetermined electromagnetic power input to the surface area in question in order to obtain a substantially even electromagnetic power impact to the entire surface of the liner covered by the apparatus.

The heat dissipating elements serving to allow heat generated by the LED's to be dissipated for cooling the LED's may be constituted by any appropriate heat transporting elements or components, such as elaborated heat pipe systems or alternatively and preferably simply be constituted by a finned heat dissipating element, which is positioned in the above described presently preferred embodiment of the apparatus including a set of curved or planar surface elements at the opposite side of the curved or planar surface element relative to the outer surface, at which the LED's are preferably arranged. The heat dissipation elements may additionally be provided at the end surfaces of the housing. The heat dissipating elements generally serve to limit the temperature of the LED's to a temperature well below the maximum permissible temperature of the chips of the LED's, which is specified to be 185° C.

Preferably, the temperature of the LED's should be kept well below the above maximum chip temperature of 185° C., as the flow or stream of cooling fluid in combination with the heat dissipation elements serve to keep the temperature of the individual chips of the LED's below 130° C. Some LEDs operate only up to 100° C., and for those LEDs the cooling should be greater than for those LEDs that operate up to 185° C.

The flowrate of the fluid flow for cooling the LEDs with air may be in the range 0.5-10 liter/min pr. LED depending on the LEDs, i.e. how high temperature the LEDs goes to—the lower the maximum operating temperature of an LED the higher should the flow rate be. For example with 100 LEDs the flow may be 1200 liter/min (or 1 m$^3$/min). Other rates when using pressurised air is an air flow of 1-50 m$^3$/min. such as 5-40 m$^3$/min. or 10-30 m$^3$/min. or 10-20 m$^3$/min. or 20-30 m$^3$/min. or 15-25 m$^3$/min. is used. In general, the higher the efficiency of the LEDs the lower may the flow rate be.

The heat dissipation elements are preferably and advantageously combined with a thermal shut-down system constituted by a heat detecting element detecting the temperature of the LED's or the heat dissipating elements and turning off or shutting down the LED's by disconnecting the power supply to the LED's provided a maximum safe temperature has been exceeded.

In order to maintain the apparatus according to the first aspect of the present invention in a specific distance from the inner surface of the liner, which is to be irradiated by the LED's of the apparatus, the apparatus according to the first aspect of the present invention preferably comprises distance elements located at said first and second ends of the housing and maintaining the outer wall of the housing at a specific and accurate distance from the inner surface of the liner. The distance elements may according to a further embodiment of the apparatus according to the first aspect of the present invention preferably constitute end housing components provided at said first and second ends and extending or protruding beyond said outer wall of said housing in order to prevent physical contact between the outer wall of the housing and the surface of the liner.

The innermost wall is dividing the substantially unobstructed through-going passage into an inner passage centrally located within the substantially unobstructed through-going passage and an outer passage defined between the inner wall and the innermost wall. Most advantageously, both channels may be used for providing cooling for the LED's. In this way, the cooling efficiency may be increased since two separate flows of cooling fluid may be established, thereby optimizing the cooling effect. Alternatively, only one of the passages is used for cooling and the other is closed off. For example, the inner passage may be closed off and all cooling fluid may be caused to pass though the outer passage closer to the LED's, allowing more cooling fluid to pass adjacent the heat dissipating elements closer to the LED's.

Preferably, the light sources emit light primarily within the visual spectrum, such as blue light. UV light may also be used, however, the drawbacks using UV is that it is hazardous and invisible to the human eye. Thus, blue light is overall preferred since it visible, but still contains a high amount of energy which is used for the curing.

The cooling fluid is preferably compressed air. Other fluid may be used, even water, however, compressed air is readily available at the installation site since it is used for inverting and explaining the liner. Thus, the compressed air exiting the apparatus may be used for the secondary purpose of keeping the liner expanded and pressed onto the wall of the pipeline during installation.

In the present context, the light sources are described as constituting LEDs, which in the present context is understood as also encompassing LECs, and/or OLEDs and/or any similar light sources.

Preferably, the heat dissipating elements, i.e. the heat sinks, are made of aluminum. The metal aluminum is a thermal conductor having a very high heat conductivity while having a low price in comparison with other good thermal conductors.

According to special embodiments, the heat dissipating elements, i.e. the heat sinks, may comprise a heat pipe or a Peltier element, and/or the apparatus is provided with additional cooling via a stream of air passing over the outer wall of the housing for providing direct cooling to the LEDs on the outer wall.

In particular, the heat dissipating elements, i.e. the heat sinks, may be manufactured using metal printing technologies. In this way a very complex heat sink structure may be constructed within a very short time period using very little effort, as the printing technology allows complex 3D structures to be achieved without welding etc.

Further, detectors, such as an IR detector focusing on an adjacent liner surface, may be used for detecting the temperature of the liner. The detector may be connected to a pair of measuring wires extending from the first end of the housing.

According to a further embodiment, the housing defines a centrally located inlet for receiving pressurized gas, the inlet being in fluid communication with the inner passage at the first end. The inlet is adapted for receiving the cooling fluid and leading the cooling fluid to the outer passage and/or the inner passage.

According to a further embodiment, the housing is closed at the second end and the through-going passage defines a flow reversing chamber at the second end for establishing fluid communication between the first passage and the second passage.

In a particular advantageous embodiment, the inlet is adapted to only one of the outer passages and inner passages with cooling fluid, preferably the inner passage. The cooling fluid is then reversed at the second end and flows back in the opposite direction through the other passage, preferably the outer passage, towards the first end. In this way the stream of cooling fluid is allowed to dissipate more heat from the heat dissipating elements as the total travel distance of the cooling fluid through the heat dissipating elements, i.e. heat sinks, is longer.

According to a further embodiment, the housing defines an outlet at the first end, the outlet being in fluid communication with the outer passage and is preferably located off center or circumferentially about the housing. In this way the cooling fluid is allowed to leave the apparatus at the second end. The outlet may preferably be located off center, e.g. at the periphery, in order to not interfere with the inlet.

According to a further embodiment, the housing defines an outlet at the second end, the outlet being in fluid communication with the outer passage and the inner passage at the second end, the housing preferably defining a secondary inlet located off center or circumferentially about the housing at the first end and in fluid communication with the outer passage. In this way the outlet is at the second end thereby creating two parallel and separate passages straight through the apparatus.

According to a further embodiment, wherein the innermost wall defines a nozzle adjacent the outlet or adjacent the inlet, the nozzle defining a minimum flow area of the inner passage for establishing a jet from the inner passage towards the outlet. In another particular advantageous embodiment, the inlet is connected to the inner passage. Preferably, pressurized air is connected to the inlet and the inner passage, however, any other pressurized cooling fluid may be used. The pressure of the cooling fluid should be sufficiently high for achieving a flow jet though the nozzle at the outlet. Such flow jet will cause an entrainment of air through the outer passage according to the well known ejector effect. Thus, a flow of pressurized cooling fluid will flow through the inner passage whereas a much larger amount of cooling fluid will flow through the outer passage by the ejector effect.

According to a further embodiment, the apparatus further comprising an outer cover extending between the opposite first and second end, enclosing the outer wall and establishing an outermost passage in fluid communication with the outer passage and/or forming part of the outer passage. An outermost passage is optionally used to cool the LEDs from the outside. The outermost passage may form part of the outer passage and thus entrain air from the outside. The outermost passage may be connected in series or in parallel with the outer passage. In some embodiments, the outermost passage may entirely be constituting the outer passage.

According to a further embodiment, the cooling fluid inlet is connected to a flexible polymeric sheathing tube defining a curved outer surface and being capable of supplying cooling fluid to the cooling fluid inlet, the polymeric sheathing tube preferably having a sufficient rigidity for being capable of pushing and pulling the apparatus. In this way no separate guiding means will be required for the apparatus as the same tube may be used for compressed cooling fluid as for movement of the apparatus through the pipeline.

According to a further embodiment, the apparatus further includes a drive mechanism for driving the housing through a pipeline, the drive mechanism being coupled to a seal installation device or to a tubing connected to the seal installation device, the drive mechanism comprising:

a first pair of rollers located on opposite sides of the sheathing tube, each roller of the first pair of rollers defining a concave peripheral surface contacting the curved outer surface of the sheathing tube and defining a curvature corresponding to the curved outer surface of the sheathing tube, the first pair of rollers being mutually interconnected, and a second pair of rollers located on opposite sides of the sheathing tube and adjacent the first pair of rollers, each roller of the second pair of rollers defining a concave peripheral surface contacting the curved outer surface of the sheathing tube and defining a curvature corresponding to the outer surface of the sheathing tube, the second pair of rollers being mutually interconnected.

The above roller configuration using a dual pair or opposite rollers ensures that there will be no slippage in the guiding of the apparatus through the pipeline using the sheathing tube to move the apparatus forwards and backwards.

According to a further embodiment, the polymeric sheathing tube includes communication wirings for providing communication with the LED's or other devices associated with the apparatus such as a temperature sensor or a pressure sensor. In this way the wires for providing power and communication may be protected inside the sheathing tube.

According to a further embodiment, the plurality of LED's being connected in thermal conductive relationship to further heat dissipating elements freely exposed at the innermost wall of the housing in the inner passage of the housing for allowing a stream of cooling fluid to pass through the inner passage for dissipating heat from the additional heat dissipating elements and cooling the LED's. Preferably, both the inner passage and the outer passage comprise heat dissipating elements in order to achieve the best possible heat dissipation and unitizing the streams of cooling fluid as good as possible.

According to a further embodiment, the outer wall of the housing being composed of a set of curved or planar surface elements, each of the curved or planar surface elements extending longitudinally between the first and the second ends of the housing, the surface elements being of identical configuration, preferably the plurality of LED's being arranged at the curved or planar surface elements for allowing irradiation of the electromagnetic radiation radially from the curved or planar surface elements, more preferably each of the curved or planar surface elements constituting an outer surface component of a housing element, the housing element comprising a finned heat dissipation element arranged opposite to the curved or planar surface element.

According to a further embodiment, the apparatus comprising first and second end housing components protruding beyond the outer wall of the housing and serving to prevent physical contact between the outer wall of the housing and the liner.

Alternatively, an outer transparent cover of the outer surface may be used.

According to a further embodiment, the apparatus comprising co-operating first and second connectors provided at the first and second ends, respectively, for allowing the apparatus to be connected to an identical apparatus for providing an assembly of apparatuses comprising a number of apparatuses such as 2-12, e.g. 3-8, such as 4-6 individual apparatuses, preferably, the first and second connectors when joint together providing a cardanic linking or a ball-and-socket joint between any two apparatuses of the assembly. In this way several apparatuses may be interconnected into a "light train".

According to a twenty-sixth aspect, the above mentioned objects and more are achieved by an apparatus for curing a liner of a pipeline, the apparatus comprising a housing defining:
a first end
a second end
an inner heat sink defining an inner passage extending from an inlet at the first end to an outlet at the second end, the inner passage defines a nozzle adjacent the outlet, the nozzle defining a minimum flow area of the inner passage for establishing a jet from the inner passage towards the outlet, an outer heat sink coaxially enclosing the inner heat sink and defining an outer passage separated from the inner passage and extending from an inlet at the first end to an outlet at the second end, and
a plurality of light sources located on the outer heat sink opposite the outer passage, The apparatus according to the twenty-sixth aspect is a variant of the apparatus according to the twenty-fifth aspect. It features an inner passage having a nozzle for receiving pressurized cooling fluid and achieving an ejector effect which, as described above, draws additional air from the surroundings into the outer passage, thereby improving the cooling of the light sources.

According to a twenty-seventh aspect, the above mentioned objects and more are achieved by a method of curing a liner of a pipeline, the liner including a resin, which is curable by exposure to electromagnetic radiation of a specific wavelength or a wavelength range, the method comprising:
providing an apparatus according to any of the preceding claims,
the method further comprising moving the apparatus within the liner while supplying a stream of cooling fluid through the inner passage and/or the outer passage and supplying electrical power to the LED's through the pair of power supply wires for irradiating electromagnetic radiation of the specific wavelength or the specific wavelength range onto the liner for causing the resin to cure, and
adjusting the velocity of movement of the apparatus through the liner so as to cause a complete curing of the resin.

The method according to the twenty-seventh aspect is preferably used together with any of the apparatuses according to the twenty-fifth and twenty-sixth aspect.

According to a twenty-eight aspect, the above mentioned objects and more are achieved by a light curing device for curing a liner of a pipeline, said liner including a resin which is curable by exposure to electromagnetic radiation of a specific wavelength or a specific wavelength range, said light curing device comprising:
an inlet end having a central inlet for leading a fluid flow into said light curing device, and an outlet end having a common outlet opposite said central inlet for leading said fluid flow out of said light curing device,
a pair of power supply wires for the supply of electrical power to said apparatus and extending from said inlet end of said housing,
a plurality of LEDs for irradiating electromagnetic radiation of said specific wavelength or said specific wavelength range, said plurality of LEDs being connected through an electronic circuit to said pair of power supply wires,
a transparent cylindrical outer cover for covering said plurality of LEDs for protection said plurality of LEDs against mechanical impact,
an outer passage between said plurality of LEDs and said transparent cylindrical outer cover for allowing a fluid flow to pass through said outer passage for dissipating heat from said heat dissipating elements and cooling said LEDs,
said outer passage being in fluid communication with said central inlet via a secondary passage, and said outer passage being in fluid communication with said common outlet inlet via a third passage for providing said fluid flow between said central inlet and said common outlet,
said light curing device further comprising a heat sink being in thermal conductive relationship with said plurality of LEDs such that heat dissipate from said plurality of LEDs to said heat sink,
said heat sink defining an exit heat transfer region at said third passage such that heat dissipate from said heat sink to said fluid flow after said fluid flow having passed said plurality of LEDs.

According to a twenty-ninth aspect, the above mentioned objects and more are achieved by a method of curing a liner of a pipeline, said liner including a resin which is curable by exposure to electromagnetic radiation of a specific wavelength or a specific wavelength range, said method comprising:

provided an assembly of a plurality of light curing devices including a first light curing device with a plurality of LEDs for irradiating electromagnetic radiation of said specific wavelength or said specific wavelength range, and a second light curing device with a plurality of LEDs for irradiating electromagnetic radiation of said specific wavelength or said specific wavelength range, said first light curing device, and said second light curing device being serially arranged after each other along a light train axis, said assembly comprising an actuator for displacing said first light curing device and said second light curing device with respect to each other such that the distance between said first light curing device and said second light curing device may be varied, said method further comprising determining a radial distance between said liner and said assembly, and displacing said first light curing device with respect to said second light curing device along said light train axis by means of said actuator as a function of said radial distance.

The distance between the first light curing device and the second light curing device may increase with the diameter of the liner/pipeline such that for a liner/pipeline with a relatively small diameter, the distance between the first light curing device and the second light curing device is smaller than for a liner/pipeline with a relatively large diameter.

An assembly with a plurality of light curing devices following each other is also known as a light train.

The individual light curing device of a light train may be a core constituting a structural element supporting a number of light sources distributed on a circle where each light source distributed around the core has a plurality of LEDs.

The core may be omitted, and the individual light curing device of a light train may consist of a single light source with a plurality of LEDs.

A light train with individual light curing devices consisting of single light sources may have a distance between them up to 0.3 m for small pipeline diameter, such as a diameter less than 300 mm. The distance may be less than 0.4 m for average diameter pipeline, such as a diameter between 300 mm and 600 mm. The distance may be less than 0.5 m for large diameter pipeline, such as a diameter greater than 600 mm.

A light train with individual light curing devices consisting of a core with four light sources around the core may have a distance between them up to 0.5 m for pipeline diameters between 500 mm-1000 mm. The distance may be up to 0.8 m for pipeline diameters between 1000 mm-1500 mm. The distance may be up to 0.8 m for pipeline diameters between 1000 mm-1500 mm. The distance may be up to 1.2 m for pipeline diameters between 1500 mm-2000 mm. The distance may be up to 1.5 m for pipeline diameters over 2000 mm.

According to a thirtieth aspect, the above mentioned objects and more are achieved by a light curing device for curing a liner of a pipeline, said liner including a resin which is curable by exposure to electromagnetic radiation of a specific wavelength or a specific wavelength range, said light curing device comprising:

an inlet end having a central inlet for leading a first fluid flow into said light curing device, and an outlet end having an outlet opposite said central inlet for leading said first fluid flow out of said light curing device, a pair of power supply wires for the supply of electrical power to said apparatus and extending from said inlet end of said housing, a plurality of LEDs for irradiating electromagnetic radiation of said specific wavelength or said specific wavelength range, said plurality of LEDs being connected through an electronic circuit to said pair of power supply wires, a transparent cylindrical outer cover for covering said plurality of LEDs for protection said plurality of LEDs against mechanical impact, a heat sink being in thermal conductive relationship with said plurality of LEDs such that heat dissipate from said plurality of LEDs to said heat sink, a second inlet adjacent said inlet end for leading a second fluid flow into said light curing device, and an atomizer nozzle adjacent said second inlet for atomizing said second fluid flow.

The second fluid flow may be a fluid flow of liquid such as water. The atomized liquid may be sprayed over the LEDs for example via a secondary inlet leading directly to the LEDs. In such a case the LEDs may be sealed with a sealer such as silicone. In general it is contemplated that the LEDs may be sealed by a sealed with a material such as silicone protecting the LEDs against liquid.

The light curing device may have a fan for blowing air from the surroundings into the light curing device. Such a fan may be combined with a supply of compressed air for driving the entrainment nozzle, i.e. in such a case the fan may blow air into the light curing device via one of the secondary inlets. The fan may be locally mounted.

According to a thirty-first aspect, the above mentioned objects and more are achieved by an assembly with a seal installation device comprising:

an elongated housing having a cylindrical wall extending between a first end and a second end of the housing, the cylindrical wall having a grid structure with a plurality of perforations for emitting electromagnetic radiation such as light from within the housing, the plurality of perforations consisting of perforations extending around the whole circumference of the cylindrical wall for emitting electromagnetic radiation substantially omnidirectional onto a pipeline during use of the assembly, and an inflatable, expandable and flexible bladder enclosing the grid structure of the cylindrical wall, the flexible bladder defining an inflated position and a deflated position, the flexible bladder having a cylindrical part extending between the first end of the cylindrical wall and the second end of the cylindrical wall and being capable of, when the flexible bladder defining the inflated position, to apply a pressure force onto the pipeline.

Substantially omnidirectional refers to the fact that the difference between the light intensity of the direction having the highest intensity, and the light intensity of the direction having the lowest intensity is less than 25%, such as less than 20% or less than 15%.

Light is to be understood as electromagnetic radiation within a certain range of the electromagnetic spectrum, i.e. a specific wavelength or a specific wavelength range as further explained above.

According to a thirty-second aspect, the above mentioned objects and more are achieved by an assembly wherein the seal installation device comprising:

an elongated housing having a cylindrical wall extending between a first end and a second end of the housing, the cylindrical wall having an opening located between the first end and the second end, and a first grid structure with a first plurality of perforations for emitting electromagnetic radiation from within the housing, the installation device further comprising a pivotable plate having a curved shape being located within the housing adjacent the opening, the pivotable plate defining a first edge which is hingedly attached to the cylindrical wall opposite the opening and a second edge opposite the first edge, the pivotable plate being pivotable between a first position in which the second edge is located at the cylindrical wall opposite the opening and a second position in which the second edge is located at the opening, the pivotable plate comprising a second grid structure with a second plurality of perforations for emitting electromagnetic radiation through the area of the housing occupied by the pivotable plate.

BRIEF DESCRIPTION OF THE DRAWINGS

FIG. 1A is a side view of an assembly for relining a junction between a branch pipeline and a main pipeline according to a first embodiment.

FIG. 2E is a side view of a seal installation device in a pipeline with a branch pipeline.

FIG. 2F is a close up of the seal installation device in FIG. 2E.

FIG. 2G is a close up of the seal installation device in FIG. 2E.

FIG. 3A is a side view of a seal installation device, an associated extension of the seal installation device and a light curing device located on the extension.

FIG. 3B is a rear view of a seal installation device, an associated extension of the seal installation device and a light curing device located on the extension.

FIG. 3C is a top view of a seal installation device, an associated extension of the seal installation device and a light curing device located on the extension.

FIG. 5A is a side cutout view of a seal installation device showing the pivotable plate.

FIG. 5B is a close-up side view of a seal installation device in which the pivotable plate is in the first position.

FIG. 5C is a close-up side view of a seal installation device in which the pivotable plate is in the second position.

FIG. 5D is a close-up side view of a seal installation device in which a light curing device is moved into the branch pipeline.

FIG. 5E is a close-up side view of a seal installation device in which a light curing device is moved out of the branch pipeline.

FIG. 5F is a side view of a seal installation device with a pivotable plate.

FIG. 5G is a side view of a seal installation device for a partliner.

FIG. 6A is a perspective view of a manipulator for rotating the seal installation device.

FIG. 6B is a close-up side view of a manipulator moving within the main pipeline and detecting the branch pipeline.

FIG. 6C is a perspective view of a manipulator having a camera for inspecting the branch pipeline.

FIG. 8A is a perspective view of a seal for sealing the junction between the main pipeline and the branch pipeline according to a first embodiment.

FIG. 8B is a perspective view showing the different layers of the tubular portion of the seal.

FIG. 8C is a perspective view showing the different layers of the brim portion of the seal.

FIG. 8D is a perspective view of a seal showing the curing of the brim portion using a light curing device.

FIG. 8E is a perspective view of a seal showing the curing of the tubular portion using a light curing device.

FIG. 8F is a perspective view of a seal showing the contraction of the tubular portion.

FIG. 9A is a perspective view of a seal for sealing the junction between the main pipeline and the branch pipeline according to a second embodiment.

FIG. 9B is a perspective view showing the different layers of the tubular portion of the seal.

FIG. 9C is a perspective view showing the different layers of the brim portion of the seal.

FIG. 9D is a perspective view of a seal showing the curing of the brim portion using a light curing device.

FIG. 10A is a cutout view and an associated close-up view of a light curing device showing the heat sinks.

FIG. 10B is a top view of a light curing device.

FIG. 10C is a top cutout view of a light curing device showing the flow paths within the device.

FIG. 15A is a perspective view of a gelling station and a seal installation device.

FIG. 15B is a cut-out view of a seal installation device including a seal.

FIG. 15C is a cut-out view of a seal installation device including a seal and a stopper.

FIG. 15D is a cut-out view of a seal installation device and gelling station in operation.

DETAILED DESCRIPTION OF THE DRAWINGS

Figure 1B:
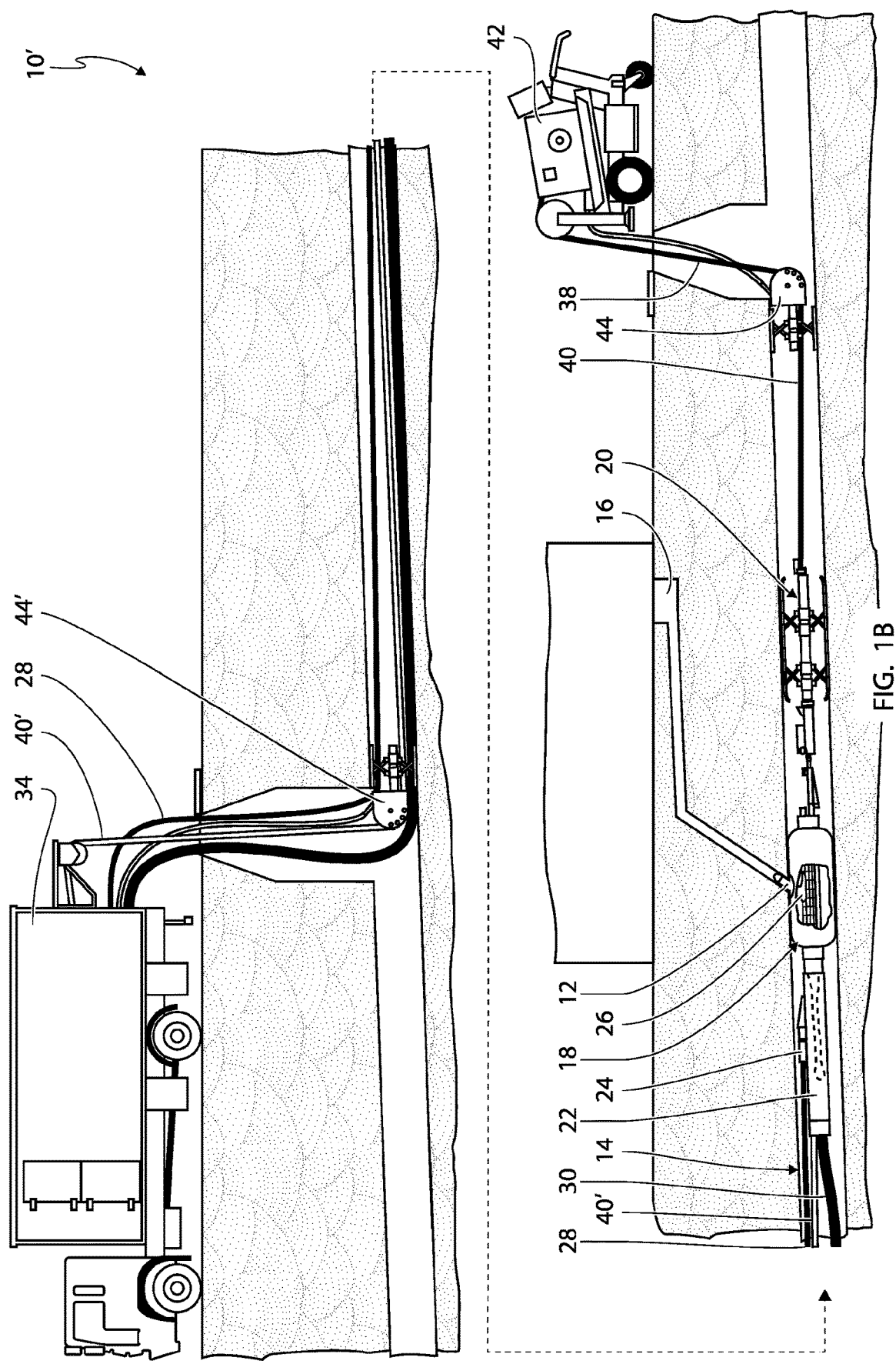
FIG. 1B is a side view of an assembly for relining a junction between a branch pipeline and a main pipeline according to a second embodiment.

FIG. 1A is a side view of an assembly 10 for relining a junction 12 between a main pipeline 14 and a branch pipeline 16 according to a first embodiment. The assembly 10 comprises a seal installation device 18 which is inserted into the main pipeline 14 and moved to a location juxtaposing the junction 12 between the main pipeline 14 and the branch pipeline 16.

The seal installation device 18 is attached at one end to a manipulator 20 which is used for rotating and aligning the seal installation device 18 relative to the junction 12. On the opposite end of the seal installation device 22 is attached an extension tube for accommodating a light curing device 24 and part of the seal 26 to be installed at the junction 12.

The light curing device 24 is connected to a polymeric sheathing tube 28 which is used for powering, cooling and conveying the light curing device 24. The end of the extension tube 22 facing away from the seal installation device 18 is fluidly connected to a pressurized gas supply 30 and a steel wire 32. Pressurized gas is also supplied to the polymeric sheathing tube 28. The pressurized gas supply 30, which also includes communication cables, and the steel wire 32 and the polymeric sheathing tube are all led to a truck 34 which is located outside the main pipeline, 14, in the present case above ground. A pulley 36 is used for directing the wire 32 through a manhole 38. The manhole 38, which runs vertically, is used for accessing the main pipeline 14 running horizontally below ground.

The truck 34 includes a compressor for supplying pressurized gas to the compressed gas supply 30 and a winch for pulling the wire 32. Further, the truck also includes the power supply, cooling air supply and control wires for the light curing device 24 which are all included in the sheathing tube 28. On the opposite side, a cable for powering and controlling the seal installation device 18 and the manipulator 20 is connected to the end of the manipulator 20 opposite the seal installation device 18. The cable 40 is also used for pulling the seal installation device 18 and the manipulator 20, similar to the wire 32 on the opposite end. The cable 40 is led up to a compact winching vehicle 42 via a pulley assembly 44. The compact winching vehicle 42 includes a winch for pulling the cable 40 and a power and control unit for providing power and controlling the seal installation device 18 and the manipulator 20. The compact winching vehicle 42 is preferably battery powered. The pulley assembly 44 is clamped in the main pipeline 14 and serves as a gentle way of changing the direction of the cable in order for the cable to be directed up through the opposite manhole 38' to the compact winching vehicle 42.

FIG. 1B is a side view of an assembly 10' for relining a junction 12 between a main pipeline 14 and a branch pipeline 16 according to a second embodiment. The present embodiment is an alternative to the previous embodiment with the difference that the steel wire is omitted and instead a cable 40' is used similar to the opposite side. Consequently, a further pulley assembly 44' is used for guiding the cable 40' at the right angle bend between the manhole 38 and the main pipeline 14.

Figure 2A:
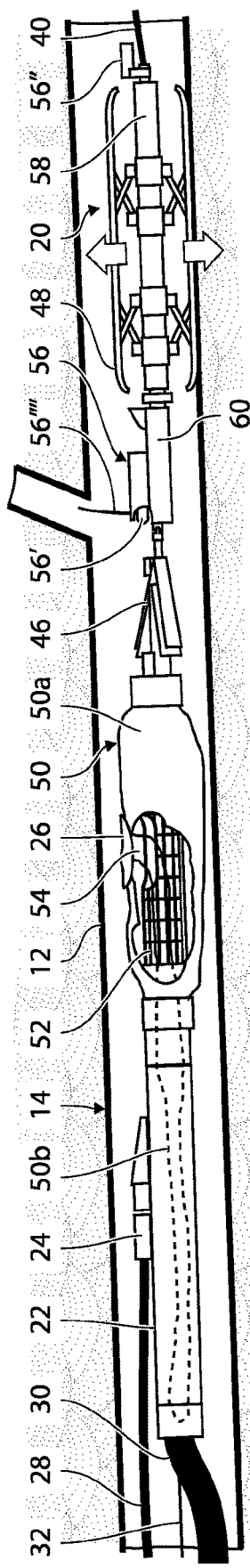
FIG. 2A is a side view of a seal installation device when being introduced into the main pipeline.

FIG. 2A is a side view of a seal installation device 18 when being introduced into the main pipeline 14. Both the seal installation device 18 and the manipulator 20 are typically introduced into the main pipeline 14 via one of the manholes 38.

Thereafter, a gripping mechanism 46 of the manipulator 20 grips the seal installation device 18 such that both the manipulator 20 and the seal installation device 18 are fixated in relation to each other.

The manipulator 20 comprises expansion members 48 circumferentially disposed about the central axis of the manipulator 20. These expansion members 48 are expanded in the circumferential direction and clamp the manipulator 20 and thereby also the seal installation device 18 in the rotational direction. The expansion members 48 have wheels and allow the manipulator 20 and the seal installation device 18 to move in the longitudinal direction. The location of the junction 12 is detected by the camera 56' and the antenna 56'''.

The seal installation device comprises the seal 26 as previously described. The seal 26, comprising a brim portion and a tubular portion, is accommodated juxtaposed an expandable bladder 50 of the seal installation device. The bladder 50, which in the present view is non-expanded, is typically made of a durable polymeric material and comprises a cylindrical part 50a and a tubular part 50b. The cylindrical part 50a of the bladder encloses a housing 52 of the seal installation device 18 having an open structure such as a grid structure and an opening 54. The tubular part 50b of the bladder 50 is inverted into the opening 54 and extends though the housing 52 and optionally into the extension hose 22. The seal 26 is placed at the opening 54 such that the brim portion contacts the cylindrical part 50a of the bladder and the tubular portion is inverted into the likewise inverted tubular part 50b of the bladder 50. The tubular portion of the seal 26b thus extending into the opening 54 in the housing 52.

Figure 2B:
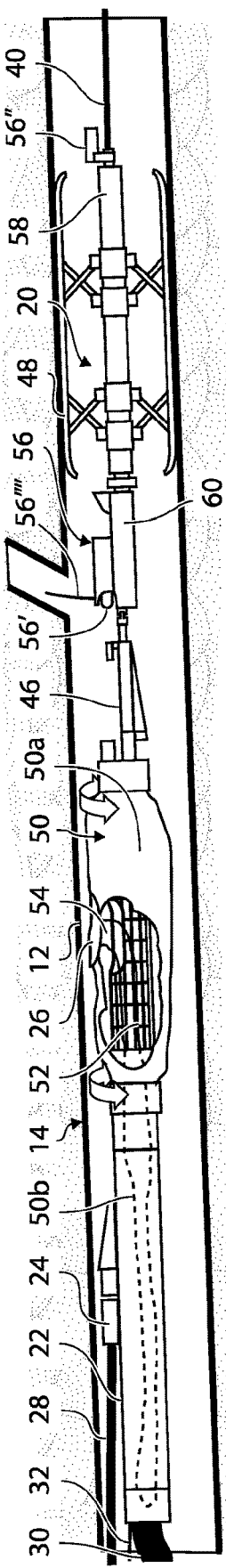
FIG. 2B is a side view of a seal installation device when rotated by the manipulator within the main pipeline.

FIG. 2B is a side view of a seal installation device 18 when rotated by the manipulator within the main pipeline 14. Since there is no way of ensuring that the seal installation device 18 does not rotate when moved through the main pipeline 14, the opening 54 may be misaligned with the branch pipeline 16. This cannot be easily corrected using the winching units, and instead the misalignment is determined using a camera 56' on the manipulator 20. The manipulator 20 comprises a outer elongated frame 58 which is comprising the expansion members 48 and which thus is fixed in the rotational direction, and an inner elongated frame 60 which is comprising the gripping mechanism 46 and which is rotatable in relation the to the outer elongated frame 58 in order to be able to rotate the seal installation device 18 as shown by the arrows in order to align the opening 54 with the branch pipeline 16.

Figure 2C:
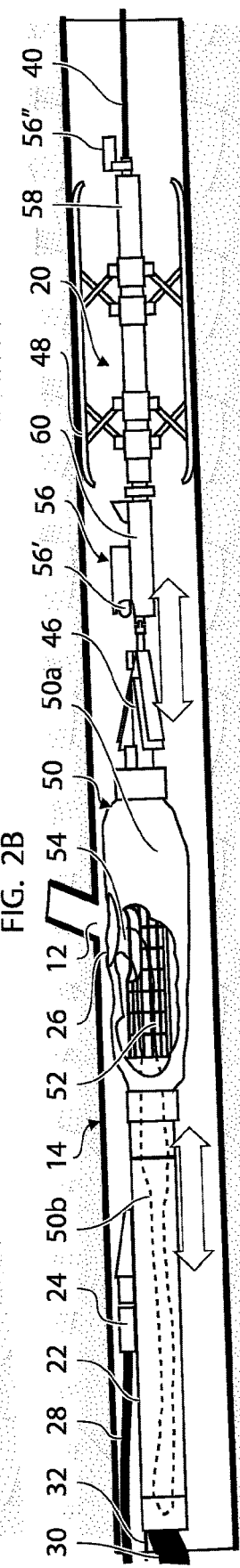
FIG. 2C is a side view of a seal installation device when moved in the longitudinal direction within the main pipeline.

FIG. 2C is a side view of a seal installation device 18 when moved in the longitudinal direction within the main pipeline 14. The seal installation device 18 is moved within the pipeline 14 by using the winching units in the truck and in the winching vehicle, pulling the relevant cable or wire and thereby causing the seal installation device 18 and the manipulator 20 to move in either direction as shown by the arrow. The seal installation device 18 and the manipulator 20 are held substantially centered in the main pipeline 14 due to the expansion members. The seal installation device 18 is thereby moved to the correct longitudinal position in which the opening 54 is longitudinally aligned with the junction 12 between the main pipeline 14 and the branch pipeline 16. The distance between the seal 26 and antenna/camera 56' has been predetermined, thereby the distance to move the installation device is known.

Figure 2D:
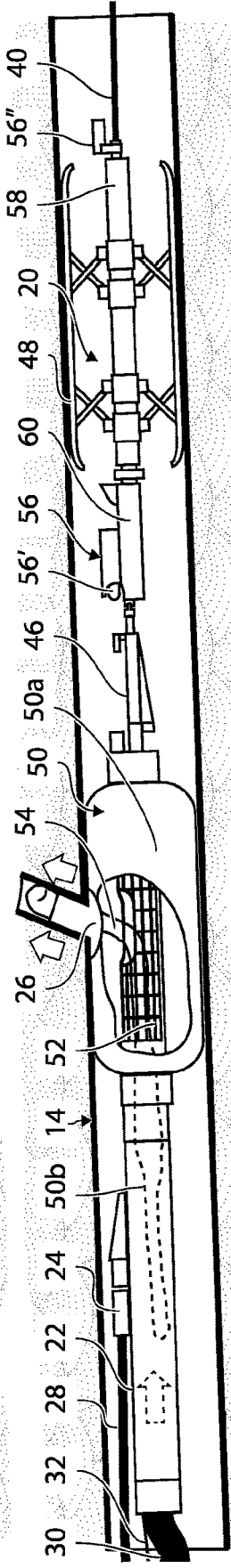
FIG. 2D is a side view of a seal installation device when the bladder inverts the seal into the branch pipeline and presses it against the junction.

FIG. 2D is a side view of a seal installation device 18 when the bladder inverts the seal 26 into the branch pipeline 16 and presses it against the junction 12. By applying pressurized gas from the gas supply tube 30 as shown by the hatched arrow, the tubular part 50b of the bladder is inverted out though the opening 54, the cylindrical part 50a of the bladder is expanded towards the inner surface of the main pipeline 14, and the seal 26 is pressed by the bladder 50 against the junction 12, as shown by the arrows.

FIG. 2E is a side view of a seal installation device in a pipeline with a branch pipeline. In FIG. 2e the seal is a sleeve/liner 29 to be placed around the circumference of the main pipe, and with a branch sleeve going up in the branch so that damage to both the main pipe adjacent the pipe branch may be repaired, i.e. the sleeve/liner is T-shaped.

In order to place the T-shaped liner at the junction, the seal installation device is provided with the bladder similar to explained above, and the liner is placed on the outside of the bladder so that when the bladder is inflated the liner comes into contact with the main pipe. In FIG. 2e part of both the bladder and the liner are cut away so that the grid can be seen.

The liner may be of glass fiber material or felt material. Epoxy may be placed on the outside of the liner so that there is a layer of epoxy between the liner and the pipe surface.

FIG. 2F is a close up of the seal installation device in FIG. 2E in a cross section (the cross section is in a plane parallel to the center axis of the seal installation device). FIG. 2F shows the area around a first end edge of the T-shaped sleeve.

FIG. 2G is a close up of the seal installation device in FIG. 2E showing the area around a second end edge (opposite the first end edge). A gasket 27 is placed around the outer perimeter of the liner at the first end edge as well as outside the liner at the other end edge of the liner. Alternatively, the gasket may be in continuation of the end edges so that the bladder presses on the gasket directly instead of the liner being between the gasket and the bladder.

The gasket is to prevent/reduce liquid flowing into the liner between the liner and the surface of the pipe. The gasket may of rubber material or of a hydrophile material having affinity for liquid such as water. The gasket may also be an epoxy.

A gasket may also be placed at the edge of the branch sleeve (not shown in close up).

FIG. 3A is a side view of a seal installation device 18, an associated extension 22 of the seal installation device 18 and a light curing device 24 located on the extension 22. When not in use, the light curing device 24 is located in a garage 62 which forms a small bulge of the extension 22 at the top of the extension 22 in order not to interfere with the tubular part 50b of the bladder. The polymeric tube 28 for powering, cooling and controlling the light curing device 24 is introduced into the garage 62 through a pressure tight entry 64 which will allow the polymeric tube 28 to enter the extension 22 and push the light curing device 24 into the seal installation device 18 for curing the seal 26. The polymeric tube 28 is driven by a drive mechanism 66 as well located at the top of the extension 22 but outside the garage 62 FIG. 3B is a rear view of a seal installation device 18, an associated extension 22 of the seal installation device 18 and a light curing device 24 located on the extension 22.

FIG. 3C is a top view of a seal installation device 18, an associated extension 22 of the seal installation device 18 and a light curing device 24 located on the extension 22. The drive mechanism 66 comprises a first pair of rollers 68 and a second pair of rollers 70 which provide traction for the movement of the polymeric tube 28. Each roller of each pair rollers is opposing each other and defines a concave inner surface contacting the polymeric tube 28. The first pair of rollers 68 and a second pair of rollers 70 are optionally interconnected by cogwheels in order to obtain a synchronized movement of the polymeric tube first pair of rollers 68 and a second pair of rollers 70.

Figure 4:
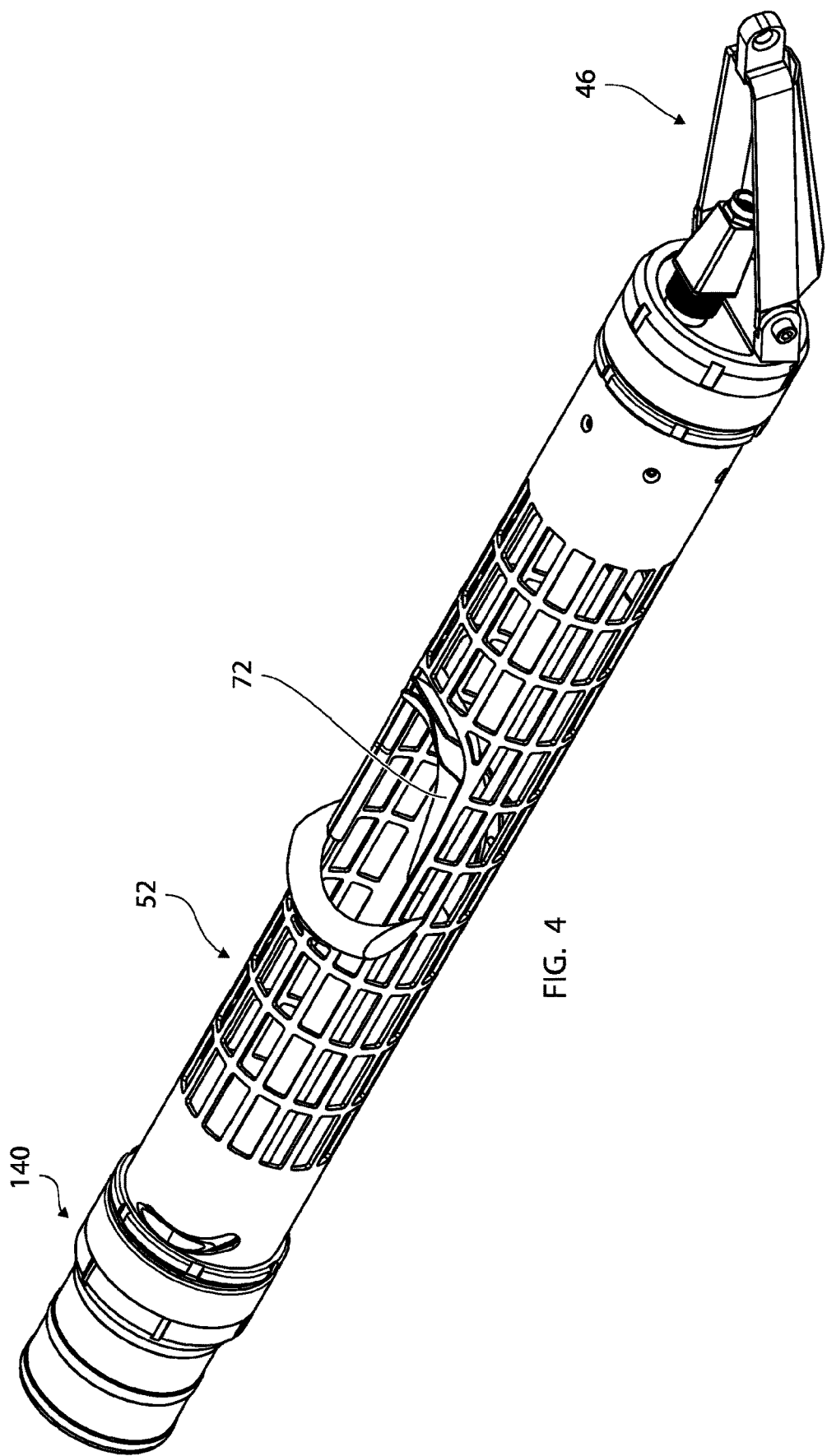
FIG. 4 is a perspective view of a seal installation device without the bladder.

FIG. 4 is a perspective view of a seal installation device 18 without the bladder. The housing 52 of the seal installation device 18 defines a grid structure for allowing the light of the light curing device 24 to illuminate the seal 26.

FIG. 5A is a side cutout view of a seal installation device 18 showing the pivotable plate 72. The pivotable plate 72 has a slightly curved shape or "spoon" shape and is at one end hingedly connected to the seal installation device 18 opposite the opening 54 via a hinge 74. The opposite end of the pivotable plate 72 is free. The pivotable plate 72 is further slidably connected to a linear actuator 76 which allows the pivotable plate 72 to pivot between a substantially horizontal orientation and a substantially vertical orientation. The linear actuator 76 is located opposite the opening 54.

FIG. 5B is a close-up side view of a seal installation device 18 in which the pivotable plate 72 is in the horizontal position. When the linear actuator 76 is pulled back, the pivotable plate 72 forms a substantially flat surface opposite the opening 54 between the hinge 74 and the actuator 76. In this way the light curing device 24 may pass through the seal installation device 18 as shown by the arrow from the location of the hinge 74 to the location of the linear actuator 76 between the opening 54 and the pivotable plate 72 as indicated by the arrow. In this way the complete brim portion 26a of the seal 26 may be cured.

FIG. 5C is a close-up side view of a seal installation device 18 in which the pivotable plate 72 is in the vertical position. By moving the linear actuator 76 towards the hinge 74, the pivotable plate 72 is pivoted such that the end opposite of the hinge 74 is located adjacent the opening 54, thereby blocking the access straight through the seal installation device 18 as shown by the arrows.

FIG. 5D is a close-up side view of a seal installation device 18 in which a light curing device 24 is moved into the branch pipeline 16. When inserted into the seal installation device 18, the light curing device 24 will be directed by the pivotable plate 72 through the opening 54 and into the branch pipeline 16 as shown by the arrow.

FIG. 5E is a close-up side view of a seal installation device 18 in which a light curing device 24 is moved out of the branch pipeline 16. In order to cure the tubular portion 26b of the seal 26, the light curing device 24 is lit up and pulled back through the tubular portion 26b of the seal 26 as shown by the arrow. In this way, the seal 26 is firmly cured towards the junction 12 due to the contraction of the tubular portion 26b during curing.

FIG. 5F is a side view of a seal installation device with a pivotable plate.

The seal installation device shown in FIG. 5f may be used in a case where a liner is to be placed around the circumference of the main pipeline, and where the liner has a seal to be inserted into the branch. Such a situation is illustrated in FIG. 2e. In that case the seal installation device is to allow for an illumination for 360°. This is achieved by providing a grid all around the cylindrical wall, i.e. as opposed to FIG. 5a the grid continues along the bottom of the tool. Additionally, the pivotable plate is provided with a grid. Thus, electromagnetic radiation may be emitted out through the bottom and the pivotable plate as well for curing the liner all the way around the main pipe.

FIG. 5G is a side view of a seal installation device for a part-liner for repairing localized damage.

The seal installation device shown in FIG. 5f does not have the pivotable plate, and there is no opening in the seal installation device for direction a light curing device into a branch pipe. Instead the grid extends with perforations for 360°. FIG. 6A is a perspective view of the manipulator 20 for rotating the seal installation device 18. In the present view, the wheels 48' of the expansion members 48 are shown, as well as the number of expansion members 48 which typically will be 3 or 4 in order to be able to center the manipulator 20 in the main pipeline 14. The outer elongated frame 58 is connected to the inner elongated frame 60 by a set of cogwheels which is rotatable by a motor within the inner elongated frame 60.

The inner elongated frame comprises the camera housing 56 which may include an antenna 56'''', a front view camera 56' and a rear view camera 56''. The outer and inner elongated frames 58, 60 may be separable for easy cleaning and maintenance.

FIG. 6B is a close-up side view of a manipulator 20 moving within the main pipeline 14 and detecting the branch pipeline 16. The antenna 56''' may be used for the purpose of accurately detecting the position of the branch pipeline 16. The antenna 56''' has a length such that when the antenna 56''' is located within the main pipeline 14, it is bent, indicating that the branch pipeline 16 is not yet reached.

FIG. 6C is a perspective view of a manipulator 20 having a camera 56' for inspecting the junction 12 between the main pipeline and the branch pipeline. When the antenna 56''' reaches the branch pipeline 16 by moving the seal installation device and the manipulator if required both in rotational and longitudinal directions, the antenna 56''' swings from the bent position to the upright position. Thus it is detected that the branch pipeline 16 is at the location of the antenna 56'''. The camera 56 may be swung outwards in order to visually detect the precise location of the antenna in the branch pipeline 16, and place it accurate at the junction centerline against the branch pipeline wall. As the distance between the antenna/camera and the opening of the seal installation device is known, the positioning of the seal at the junction may be made very accurate by moving the setup the known distance in the longitudinal direction from the first manhole towards the second manhole.

Figure 7A:
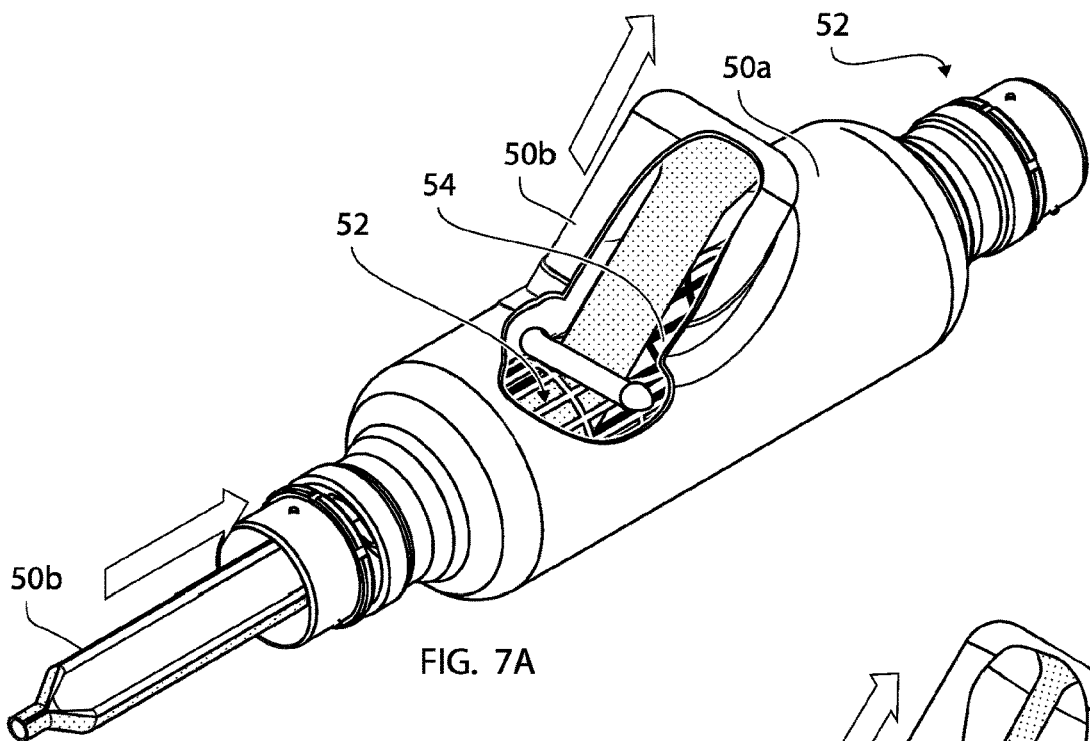
FIG. 7A is a seal installation device in which the flexible bladder is in a deflated and partially inverted position.

FIG. 7A is a seal installation device 18 in which the flexible bladder is in a deflated and partially inverted position. In the present view it is clearly illustrated that the tubular part 50b of the bladder 50 is inverted through the opening 54 of the seal installation device 18 and extends out of one end of the seal installation device 18, being the end which is connected to the extension (not shown). When the seal installation device 18 is pressurized during the placement of the seal, the pressure will cause the cylindrical part 50a of the bladder 50 to inflate and the tubular part 50b of the bladder 50 to invert back as shown by the arrows.

Figure 7B:
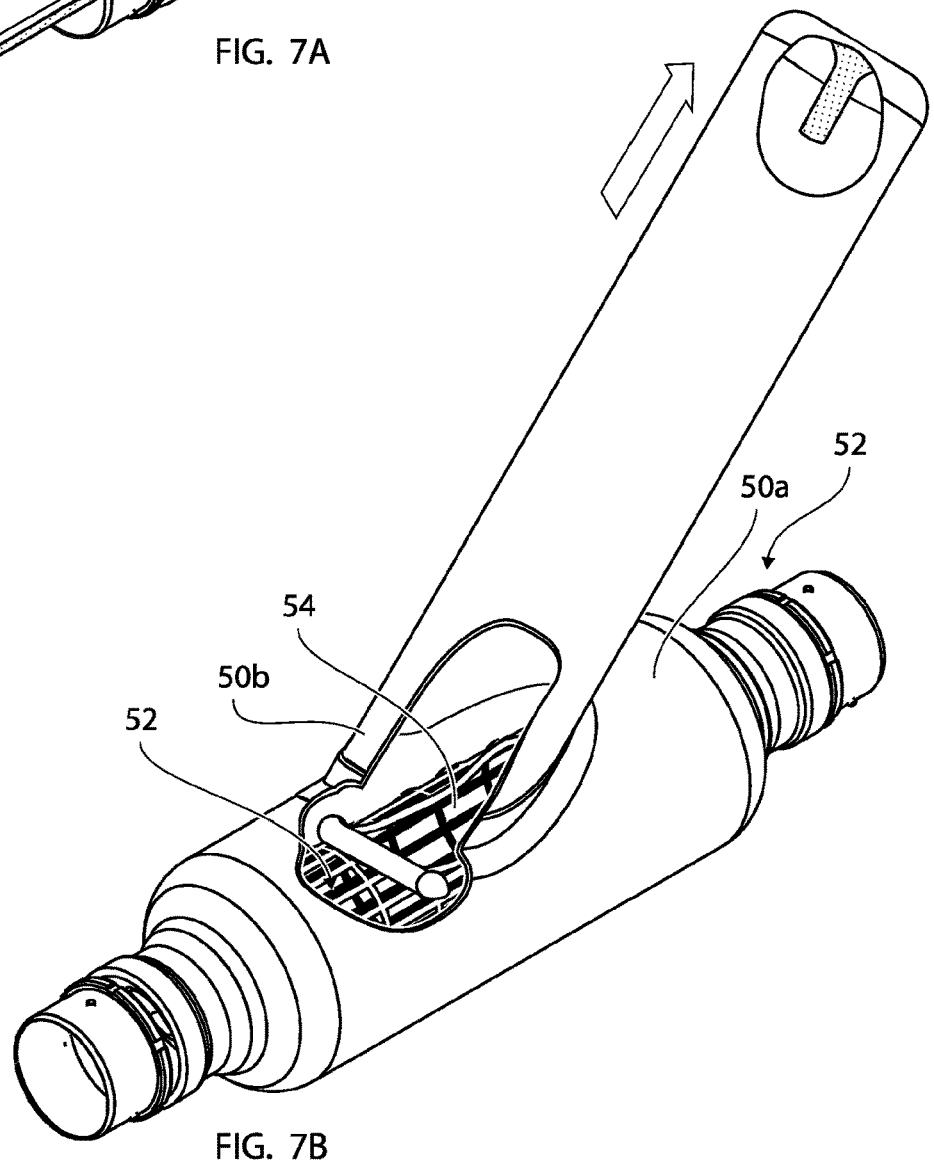
FIG. 7B is a seal installation device in which the flexible bladder is in an expanded position.

FIG. 7B is a seal installation device in which the flexible bladder is in an expanded position. The tubular part 50b of the bladder 50 has reassumed its expanded and inflated position for being able to apply a pressure on the tubular part of the seal. The bladder is made of a durable and transparent/translucent material.

FIG. 8A is a perspective view of a seal 26' for sealing the junction between the main pipeline and the branch pipeline according to a first embodiment. The seal 26' comprise a brim portion 26a' and a tubular portion 26b'. The brim portion 26a' is covered by an adhesive 78 such as epoxy paste in order to seal against the inner surface of the main pipeline.

Suitable fibre materials include glass, polyamide, polyester, polyolefin (polypropylene PP or polyethylene PE), polyacrylonitil (PAN), polysulfon. Also polyaramin, carbon fibre and cellulose may be used. Suitable adhesives are epoxy, polyurethane, vinylester and polyester. The material may be woven, non woven, knitted or warp knitted.

FIG. 8B is a perspective view showing the different layers of the tubular portion 26b' of the seal 26'. The layers comprise an inner coating 80 and an outer nonwoven felt 82. The fibers, being of the types listed above, are oriented to promote during curing a longitudinal contraction whereas maintaining the outer circumference during curing of the seal 26'.

FIG. 8C is a perspective view showing the different layers of the brim portion 26a' of the seal 26'. The layers are all adhered together and are divided into two main layers, an outer and an inner, which each in turn comprises several sublayers. The main layers have perpendicular machine directions. From the outside, i.e. the surface of the brim portion 26a' which is adapted for facing the inner surface of the main pipeline, the outer layers are: one fleece layer 84, one CSM layer 86, one CD rowing 90° layer 88, one CSM layer 90, one MD reinforced 0° layer 92, whereas the inner layers are: one MD reinforced 0° layer 92', one CSM layer 90', one CD rowing 90° layer 88', one CSM layer 86', one fleece layer 84'.

The above layers are oriented such that the reinforcement directions of the layers are such that the main layers do not expand or contract during curing. In the present case, both the upper and lower layers comprise fiber directions extending both in the longitudinal direction as well as in the circumferential direction in order to minimize contraction during curing.

In this way the stress applied to the epoxy adhesive will be minimized and the risk of voids substantially eliminated. The layers may be adhered, nailed, sewed, flame bonded or woven. The brim portion may optionally have a coating and different layers and material are feasible in order to achieve a direction dependent movement of the brim portion, such as combinations of glass and felt layers and/or other similar fibre types. The coating may be thermoplastic, polyethylene or PVC. Also polyamide and thermoplastic urethane are usable.

FIG. 8D is a perspective view of a seal showing the curing of the brim portion 26a' of the seal 26' using a light curing device 24 moving as indicated by the arrow and illuminating the brim portion 26a'. It is shown how the light curing device is first curing the brim portion 26a' of the seal 26'. In this way the epoxy adhesive adheres to the inner wall of the main pipeline while the brim portion 26a' retains its position without deforming or contracting, as such contraction would induce stress and possibly voids in the adhesive joint.

FIG. 8E is a perspective view of a seal showing the curing of the tubular portion 26b' of the seal 26' using a light curing device 24. The curing starts by illuminating tubular portion 26b' at its far end.

FIG. 8F is a perspective view of a seal 26' showing the contraction of the tubular portion 26b'. By curing the tubular portion 26b' from the far end in a direction towards the brim portion 26a', the tubular portion 26b' tends to contract away from the brim portion 26a', thus pulling the brim portion 26a' towards the junction thereby obtaining a firm fixation.

FIG. 9A is a perspective view of a seal 26" for sealing the junction between the main pipeline and the branch pipeline according to a second embodiment. The seal 26" comprises similar to the previous embodiment a brim portion 26a" and a tubular portion 26b". The brim portion 26a" does not comprise any adhesive and instead a sealing ring 94 is used in order to seal against the inner surface of the main pipeline. The sealing ring may be made of e.g. rubber such as foamed rubber, EPDM, natural rubber, nitril rubber or silicone rubber. It may also be based on water expanding materials based on e.g. chloroprene or bentonite. The sealing ring is typically O shaped, however, other shapes are feasible e.g. D, H, U etc.

FIG. 9B is a perspective view showing the different layers of the tubular portion 26b" of the seal 26". The layers comprise, similar to the previous embodiment an inner coating 80' and an outer nonwoven felt 82'. The fibers are oriented to promote during curing a longitudinal contraction whereas maintaining the outer circumference during curing of the seal 26".

FIG. 9C is a perspective view showing the different layers of the brim portion 26a" of the seal 26". The layers are all adhered together and are divided into two main layers, an outer and an inner, which each in turn comprises several sublayers. The inner layers are, similar to the previous embodiment, the outer different. From the outside, i.e. the surface of the brim portion 26a", which is adapted for facing the inner surface of the main pipeline, the outer layers are an outer coating 80' and an inner nonwoven felt 82' similar to the tubular portion 26b". The coating may be thermoplastic, polyethylene or PVC. Also polyamide and thermoplastic urethane are usable. The inner layers are however similar to the brim of the previous embodiment, namely: one MD reinforced 0° layer 92", one CSM layer 90", one CD rowing 90° layer 88", one CSM layer 86", one PV layer 84".

The inner layer is oriented such that the reinforcement directions of the layers are such that the inner layer does not expand or contract during curing, whereas the outer layer will contract due to its composition. In this way a stress is applied in the brim portion 26a" as the outer layer has a tendency to contract during curing and the inner layer maintains a minimized contraction during curing.

FIG. 9D is a perspective view of a seal 26" showing the curing of the brim portion 26a" using a light curing device 24. As the outer layer contracts during curing, the brim portion 26a" will be subjected to an internal stress which as shown by the arrows causes the curvature of the brim portion 26a" to increase which in turn will cause the brim portion 26" to apply a force towards the inner surface of the main pipeline. This will allow the sealing ring 94 to apply a permanent sealing pressure onto the inner surface of the main pipeline, thus ensuring that the seal 26" remains fluid tight after curing.

FIG. 10A is a cutout view and an associated close-up view of a light curing device 24 showing the heat sinks within the light curing device 24. The view is along the axis of the light curing device 24. The light curing device 24 comprises an outer cover 96 being of a transparent or translucent material, typically glass, however, also feasible is a rigid polymeric material. The cover 96 encloses the LED light sources 98 which are thus protected from mechanical impacts. The LED light sources 98 provide the light necessary for curing, typically being a blue light.

In order to provide cooling for the LED light sources 98, the interior of the light curing device 24 comprises an outer passage 100 and an inner passage 102 which are placed in a coaxial relationship. The passages 100 102 comprise heat sinks which are thermally connected to the LED light sources 98 for removing the heat generated by them. An air flow is caused to pass through the passages 100 102 in order to transport the heat from the heat sinks 100 102 in the passages to the outside. The heat sink comprises thin metal walls allowing good thermal contact with the passing cooling air, preferably using printing technologies in order to obtain very thin walls.

FIG. 10B is a top view of a light curing device 24. The air enters the light curing device 24 at the centrally located air entry 104 and leaves the light curing device 24 at the same end at the exit 106.

FIG. 10C is a top cutout view of a light curing device 24 showing the flow paths within the device. The air entry 104 is connected to the polymeric sheathing tube (not shown) which delivers cooling air to the light curing device 24. The air entry is connected to the inner passage 102 which extends through the interior of the light curing device 24 to the opposite end of the light curing device 24 where the flow is led outwards and reversed in a reversing chamber before being led into the outer passage 100. The outer passage 100 extends outside and separates in relation to the inner passage 102 from the flow reversing chamber to the air exit 106 at which the air is simply led to the outside. The air has thereby absorbed the excessive heat generated by the LED light sources 98.

Figure 10D:
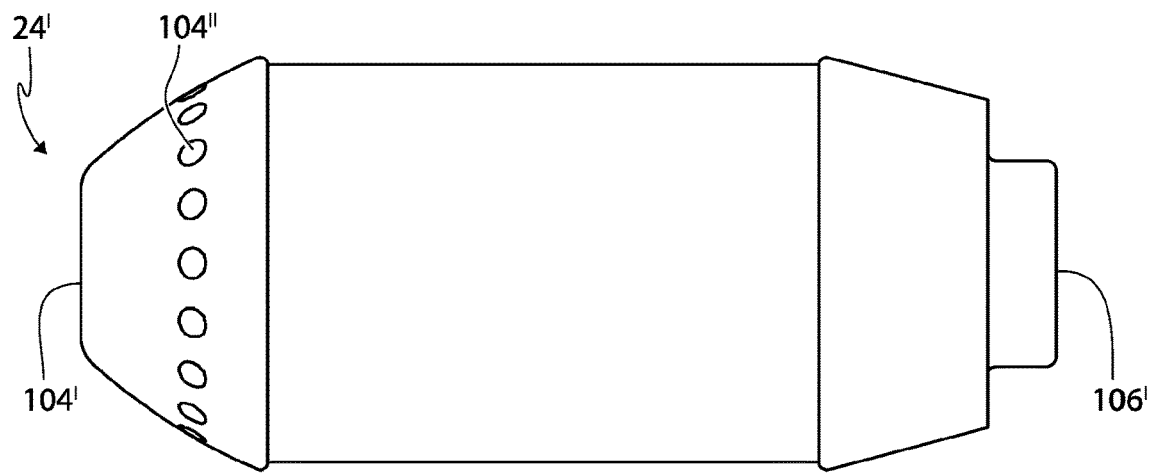
FIG. 10D is a top view of an alternative embodiment of a light curing device having two inlets and a common outlet.

FIG. 10D is a top view of an alternative embodiment of a light curing device 24' having two inlets 104' 104" and a common outlet 106'. The air enters the light curing device 24' at any of the two inlets 104' 104", whereby the central inlet 104' is connected to an air compressor or similar pressure source and the secondary inlets 104" receives air from the surroundings. All air leaves the light curing device 24' at the common outlet 106'. All other features are similar to the previous embodiment of the light curing device described above.

Figure 10E:
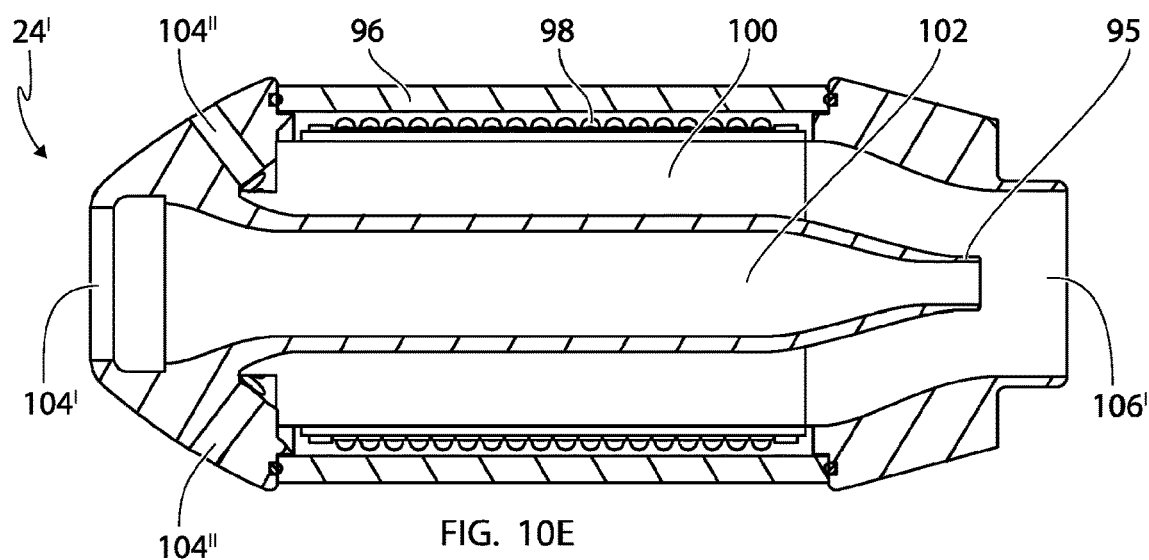
FIG. 10E is a top cutout view of the alternative embodiment of a light curing device.

FIG. 10E is a top cutout view of the alternative embodiment of a light curing device 24'. The central inlet 104' is connected to the inner passage 102 whereas the secondary inlets 104" are connected to the outer passage 100. The inner and outer passages 102 100 are preferably provided with heat sinks (not shown) similar to the previous embodiment. Near the common outlet 106', the inner passage 102 defines a nozzle 95 constituting the minimum flow area of the inner passage 102.

Figure 10F:
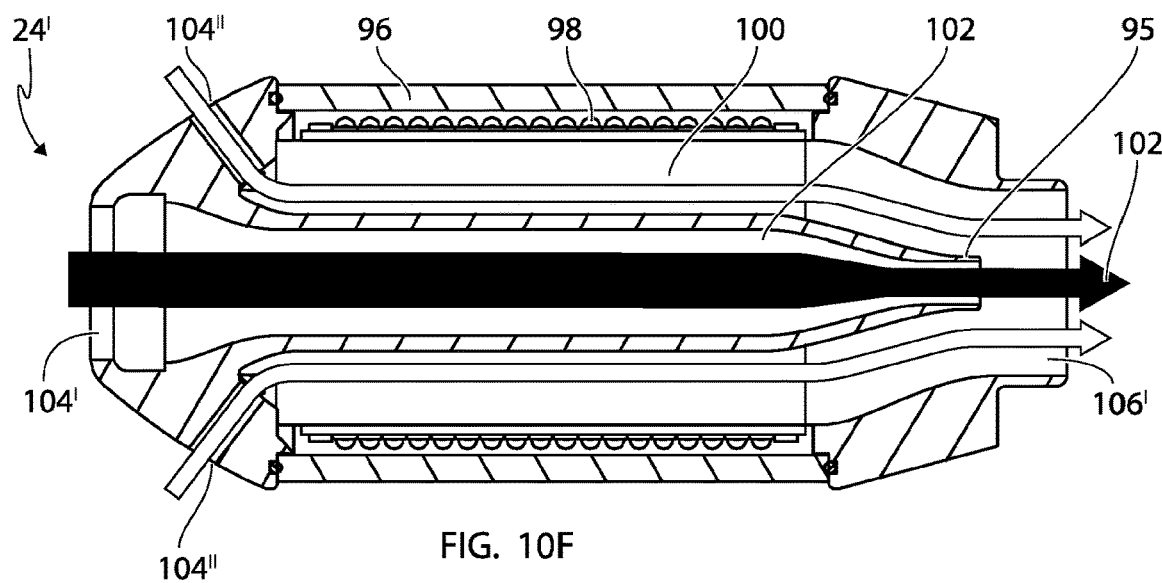
FIG. 10F is a top cutout view of the alternative embodiment of a light curing device showing the flow paths within the device.

FIG. 10F is a top cutout view of the alternative embodiment of a light curing device 24' showing the flow paths within the device. The inner passage 102 is as described above connected to an air pressure source (not shown) which causes a stream of air to flow through the inner passage 102 from the central inlet 104' to the common outlet 106' as shown by the filled arrow. A flow jet will thereby be established by the nozzle 95 towards the common outlet 106'. The flow jet causes entrainment of air through the outlet passage 100 due to the ejector effect. Thus, air will be sucked in through the secondary inlets 104" and pass thought the outer passage 100 and leave the light curing device 24' through the common outlet 106', as indicated by the non-filled arrows. The ejector effect allows much more air to pass thought the light curing device 24' compared to connecting both passages to the air pressure source. As all of the air passing through the inner passage 102 and the outer passage 100 contributes to cooling the LEDs, the total cooling effect will be larger.

As an alternative/supplement to sucking air into one or more of the secondary inlets, water (or another liquid) may be supplied to the light curing device via a hose. The liquid may enter the light curing device at one or more of the secondary inlets and be atomized by an atomizer nozzle at one or more of the secondary inlets. Such a supply of liquid and subsequent atomizing by an atomizer nozzle may also be provided in any of the following examples of light curing devices with secondary inlets.

Figure 10G:
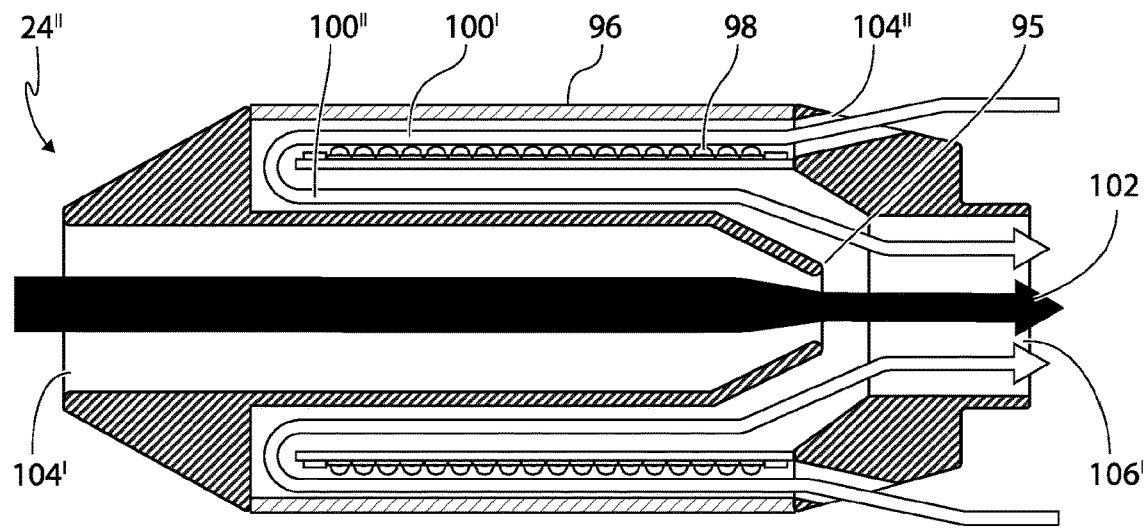
FIG. 10G is an alternate embodiment of the light curing device in which as stream of air is led above the LEDs.

FIG. 10G is an alternate embodiment of the light curing device 24" in which as stream of air is led above the LEDs 98. The present embodiment is similar to the previous embodiment except that the secondary inlets 104 are located between the cover 96 and the LEDs 98 and adjacent the exit 106'. Air will be sucked in through the secondary inlet 104", pass thought a primary outer passage 100' above the LEDs 98. Thereafter the stream will turn and pass through a secondary outer passage 100" in the opposite direction below the LEDs 98 and finally leave the light curing device 24" through the common outlet 106', as indicated by the non-filled arrows. In this way, both the top and the bottom of the LEDs will be cooled. The ejector effect is used similar to the previous embodiment and illustrated by the filled arrow allowing much more air to pass thought the light curing device 24" compared to connecting both passages to the air pressure source.

Figure 10H:
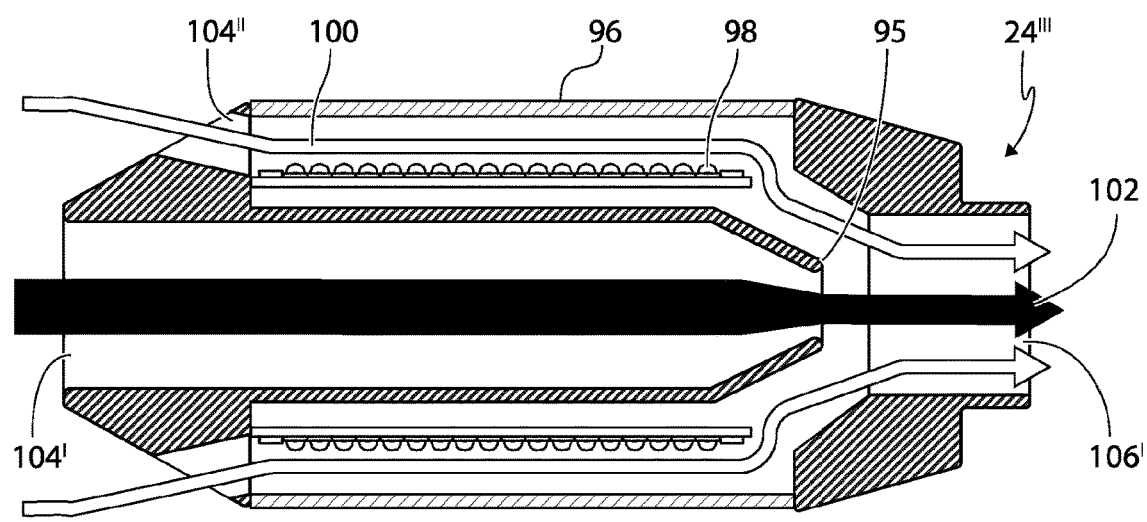
FIG. 10H is an alternate embodiment of the light curing device in which the outer passage pass above the LEDs.

FIG. 10H is an alternate embodiment of the light curing device 24''' in which the outer passage 100 pass above the LEDs 98. The present embodiment is similar to the previous embodiment except that the secondary inlet 104" is located adjacent the central inlet 104' and the outer passage 100 does not pass below the LEDs 98. Air will be sucked in through the secondary inlets 104", pass thought the outer passage 100 above the LEDs 98. Thereafter the stream will leave the light curing device 24' through the common outlet 106', as indicated by the non-filled arrows. The ejector effect is used similar to the previous embodiment and illustrated by the filled arrow allowing much more air to pass thought the light curing device 24''' compared to connecting both passages to the air pressure source.

Figure 10I:
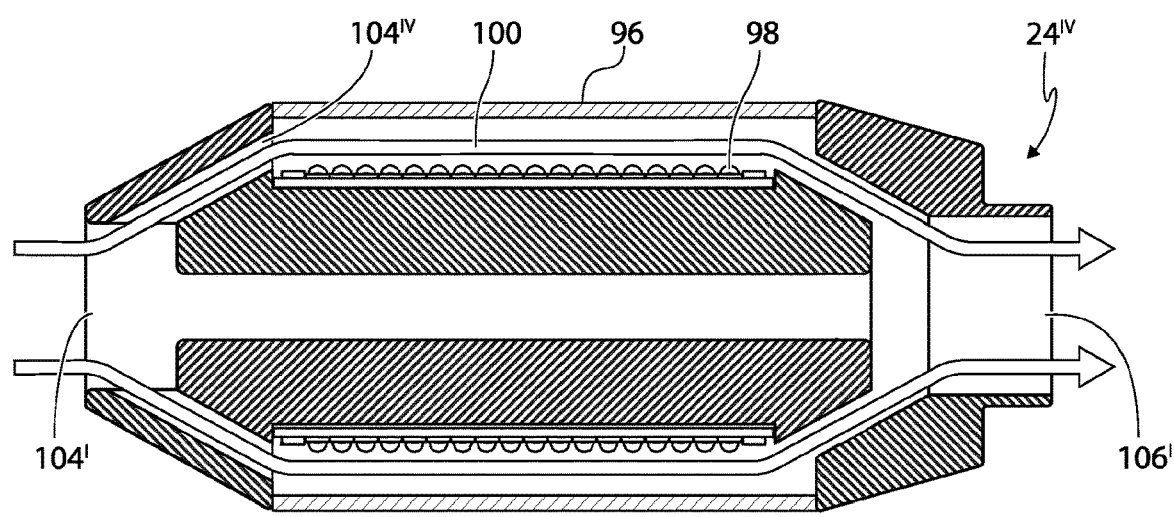
FIG. 10I is an alternate embodiment of the light curing device in which the outer passage pass above the LEDs.

FIG. 10I shows an alternate embodiment of the light curing device $24^{IV}$ (FIG. 10I is a cross section which is parallel to the center axis going through the central inlet 104' and the common outlet 106').

In the present embodiment, the secondary passage $104^{IV}$ fluidly connects the central inlet with the outer passage so that during operation of the light curing device, the air flow is led from the central inlet 104' to the outer passage via the secondary passage $104^{IV}$.

The central inlet 104' is at an inlet end of the light curing device $24^{IV}$, and it is connected to an air pressure source (not shown) which causes a stream of air to flow into the central inlet 104'. The common outlet 106' is at an outlet end of the light curing device $24^{IV}$. The secondary passage is closer to the inlet end than the outlet end.

At the other end of the outer passage (opposite the secondary passage) is a third passage, which leads the air flow from the outer passage to the common outlet.

The LEDs are in thermal contact with a thermal conductive material constituting a heat sink (the solid shown as hatched areas with a different hatching than the cover 96), i.e. the LEDs may be mounted on a PCB (printed circuit board), which may have a surface abutting or in proximity to the heat sink.

The light curing device has an exit heat-transfer region at the third passage (proximate the outlet end) such that the air flow passes through the exit heat transfer region on the way from the outer passage to the common outlet.

A heat-transfer region is to be understood as a part of the light curing device where the air flow through the device comes in contact with a surface of the heat sink. For example, in FIG. 10I, the heat sink forms part of the wall of the third passage $104n''$.

The light curing device may have an entry heat-transfer region at the secondary passage (proximate the inlet end) such that the air flow passes through the entry heat-transfer region on the way from the central inlet to the outer passage.

The heat sink may comprise fins such that the air flow passes through the fins on the way from the central inlet to the outer passage. For example, the fins may be located in the exit heat-transfer region (outside the central passage).

Similarly, fins may extend from the heat sink such that the air passes through the fins on the way from the outer passage to the common outlet. The fins may extend radially or angularly.

It is contemplated that the heat transfer from the heat sink to the air flow may be greater at the exit heat transfer region than at the entry heat transfer region, i.e. such that the air flow is not heated (or heated to a less degree) at the entry heat transfer region before it flows over the LEDs in the outer passage. This can be achieved by making the surface area of the heat sink greater at the exit heat transfer region than at the entry heat transfer region. Or by having more fins in the exit heat transfer region than at the entry heat transfer region.

Figure 10J:
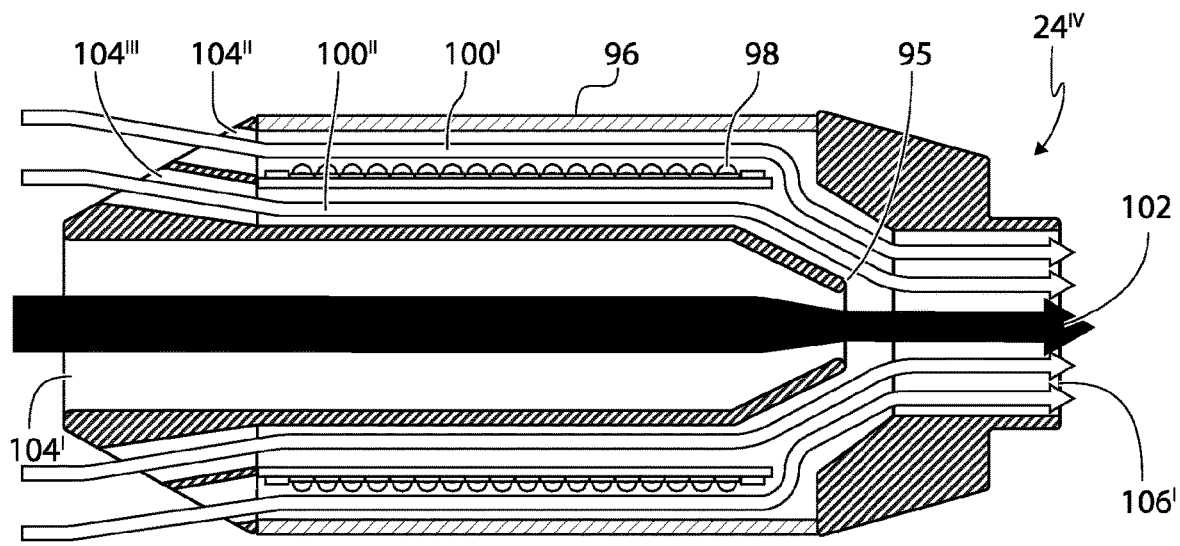
FIG. 10J is an alternate embodiment of the light curing device in which the outer passage pass above & below the LEDs 98.

FIG. 10J is an alternate embodiment of the light curing device $24^{IV}$ in which the outer passage 100 pass above and below the LEDs 98. The present embodiment is similar to the previous embodiment except that the outer passage 100 does pass both above and below the LEDs 98. Air will be sucked in through the secondary inlets 104" and 104''' and pass thought the outer passage 100 both above the LEDs 98 and below the LEDs 98 in a primary outer passage 100' and a secondary outer passage 100" constituting two parallel streams. Thereafter the parallel streams of air will leave the light curing device 24' through the common outlet 106', as indicated by the non-filled arrows. The ejector effect is used similar to the previous embodiment and illustrated by the filled arrow allowing much more air to pass thought the light curing device $24^{IV}$ compared to connecting both passages to the air pressure source.

Figure 10K:
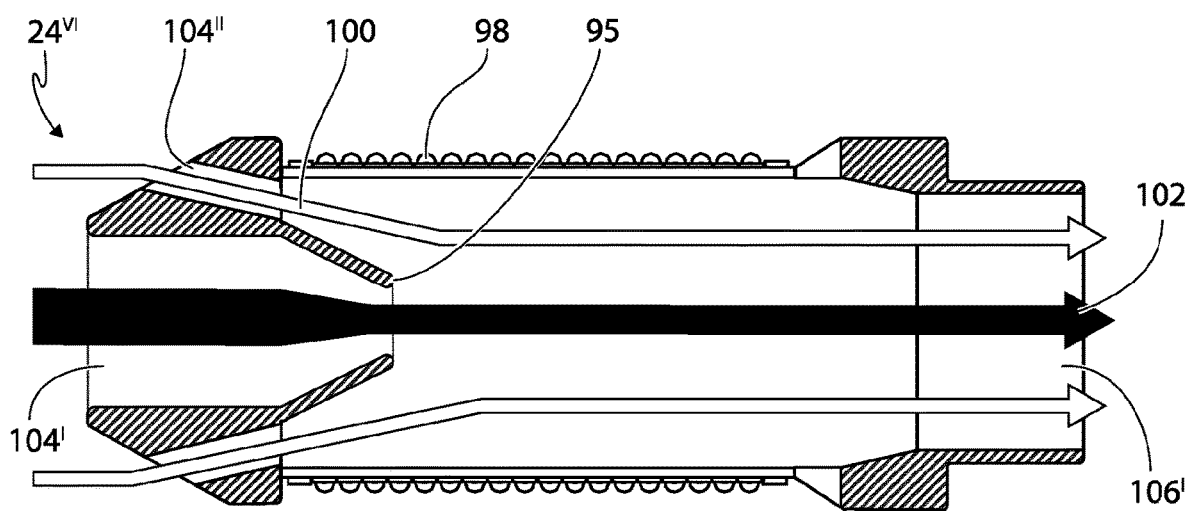
FIG. 10K is an alternate embodiment of the light curing device in which the nozzle is located near the central inlet.

FIG. 10K is an alternate embodiment of the light curing device $24^V$ in which the nozzle 95 is located near the central inlet 104' and the secondary inlet 104" is located. In the present embodiment, the outer passage and the inner passage 102 essentially form a common passage for a stream of air for cooling the LEDs 98, whereby the central inlet 104' is connected to high pressured air and the secondary inlet 104 entrains air from the surroundings using the ejector effect. The ejector effect is used similar to the previous embodiment and illustrated by the filled arrow allowing much more air to pass thought the light curing device $24^{IV}$ compared to connecting both passages to the air pressure source.

As a supplement to a nozzle in the beginning of the light curing device, an additional nozzle for entrainment may be provided at the end of the light curing device, i.e. a path may lead compressed fluid to the end where it goes into the additional nozzle such that air from outside may be entrained via secondary inlets.

Figure 10L:
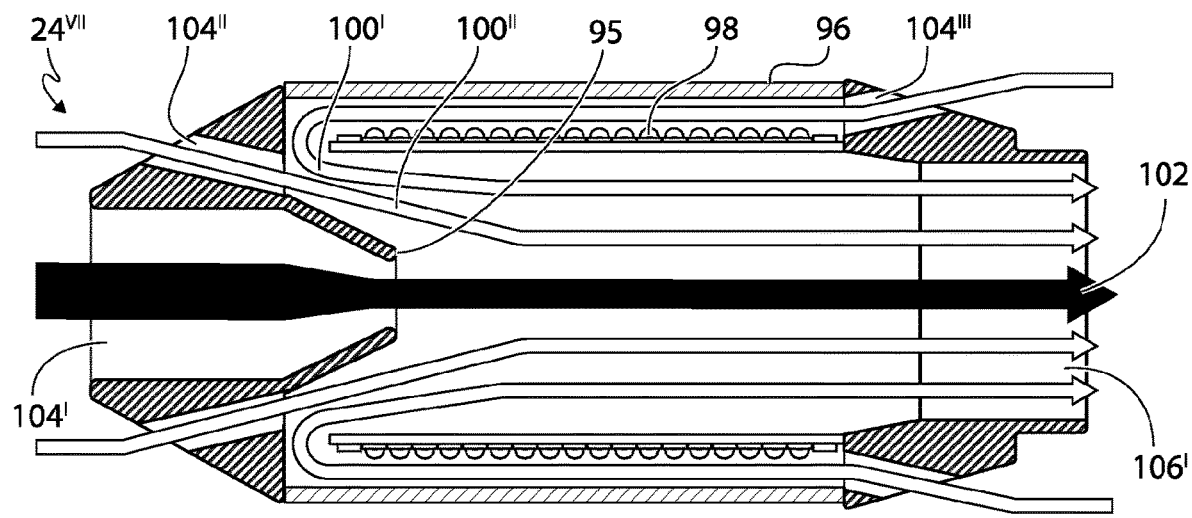
FIG. 10L is an alternate embodiment of the light curing device having two secondary inlets.

FIG. 10L is an alternate embodiment of the light curing device $24^{VI}$ similar to the previous embodiment, however, there exist two secondary inlets 104" 104'" located at the central inlet 104' and the common outlet 106', respectively. The outer passage 100 extending from one of the secondary inlets 104'" is passing outside the LEDs 98 whereas the other secondary inlet 104" is passing below the LEDs 98 and form a common passage with the inner passage 102. The secondary inlets 104" 104'" entrains air from the surroundings using the ejector effect.

Figure 10M:
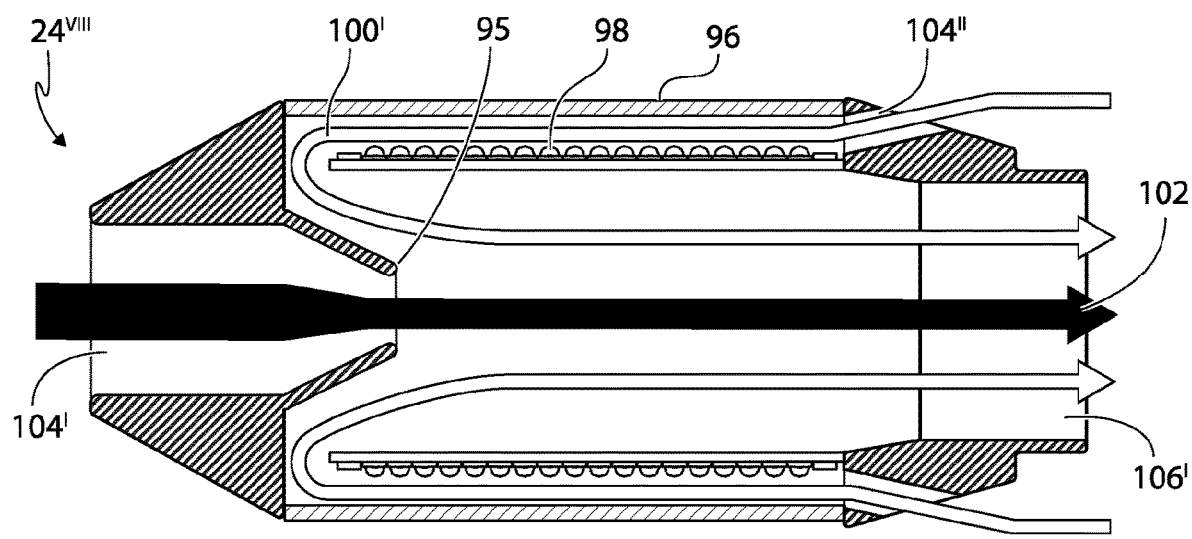
FIG. 10M is an alternate embodiment of the light curing device having only a secondary inlet at the common outlet.

FIG. 10M is an alternate embodiment of the light curing device $24^{VII}$ similar to the previous embodiment, however, there is only a secondary inlet at the common outlet 106' and the secondary inlet at the central inlet 104' is closed.

Figure 10N:
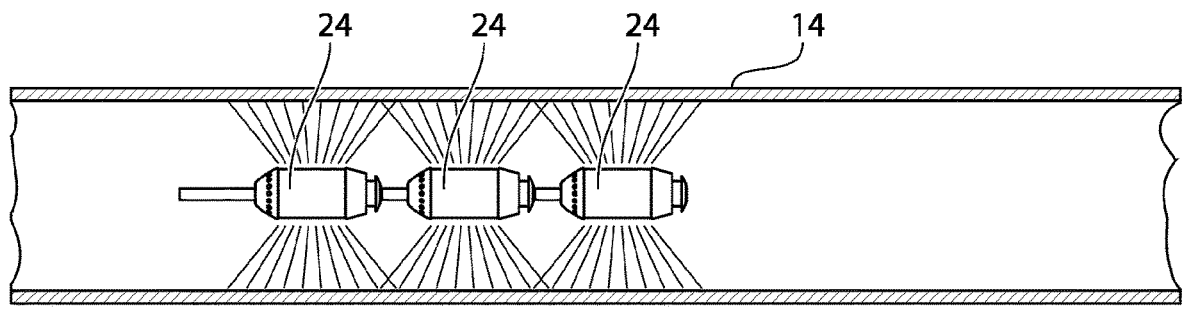
FIG. 10N is a set of coupled light curing devices 24 in a pipeline 14 having a small diameter.

FIG. 10N is a set of coupled light curing devices 24 in a pipeline 14 having a small diameter. The distance between the individual light curing devices 24 are set to a small distance enabling an even distribution of light inside the pipeline.

Figure 10O:
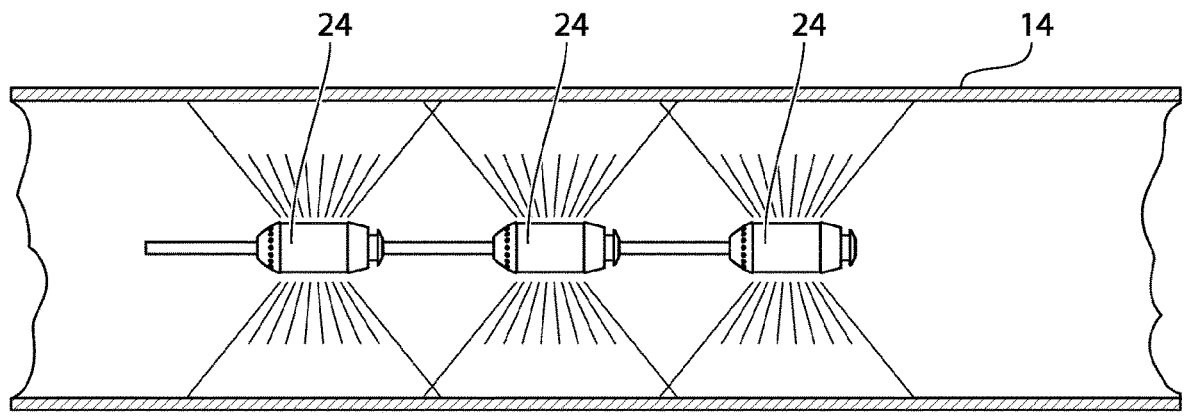
FIG. 10O is a set of coupled light curing devices 24 in a pipeline 14 having a medium diameter.

FIG. 10O is a set of coupled light curing devices 24 in a pipeline 14 having a medium diameter. The distance between the individual light curing devices 24 are set to a standard distance enabling an even distribution of light inside the pipeline.

Figure 10P:
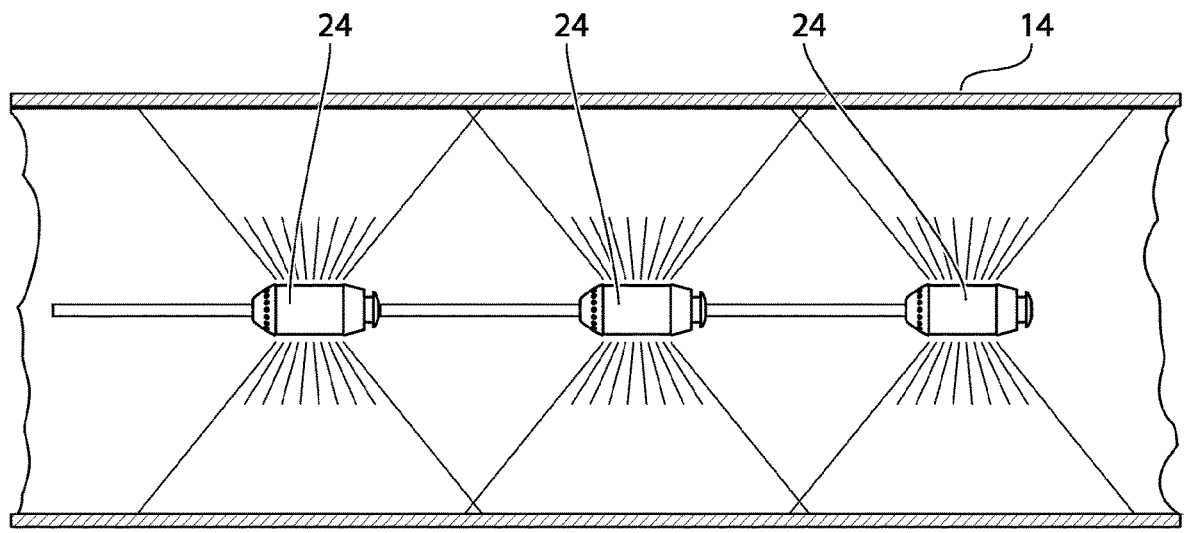
FIG. 10P is a set of coupled light curing devices 24 in a pipeline 14 having a large diameter.

FIG. 10P is a set of coupled light curing devices 24 in a pipeline 14 having a large diameter. The distance between the individual light curing devices 24 are set to a large distance enabling an even distribution of light inside the pipeline.

Figure 11A:
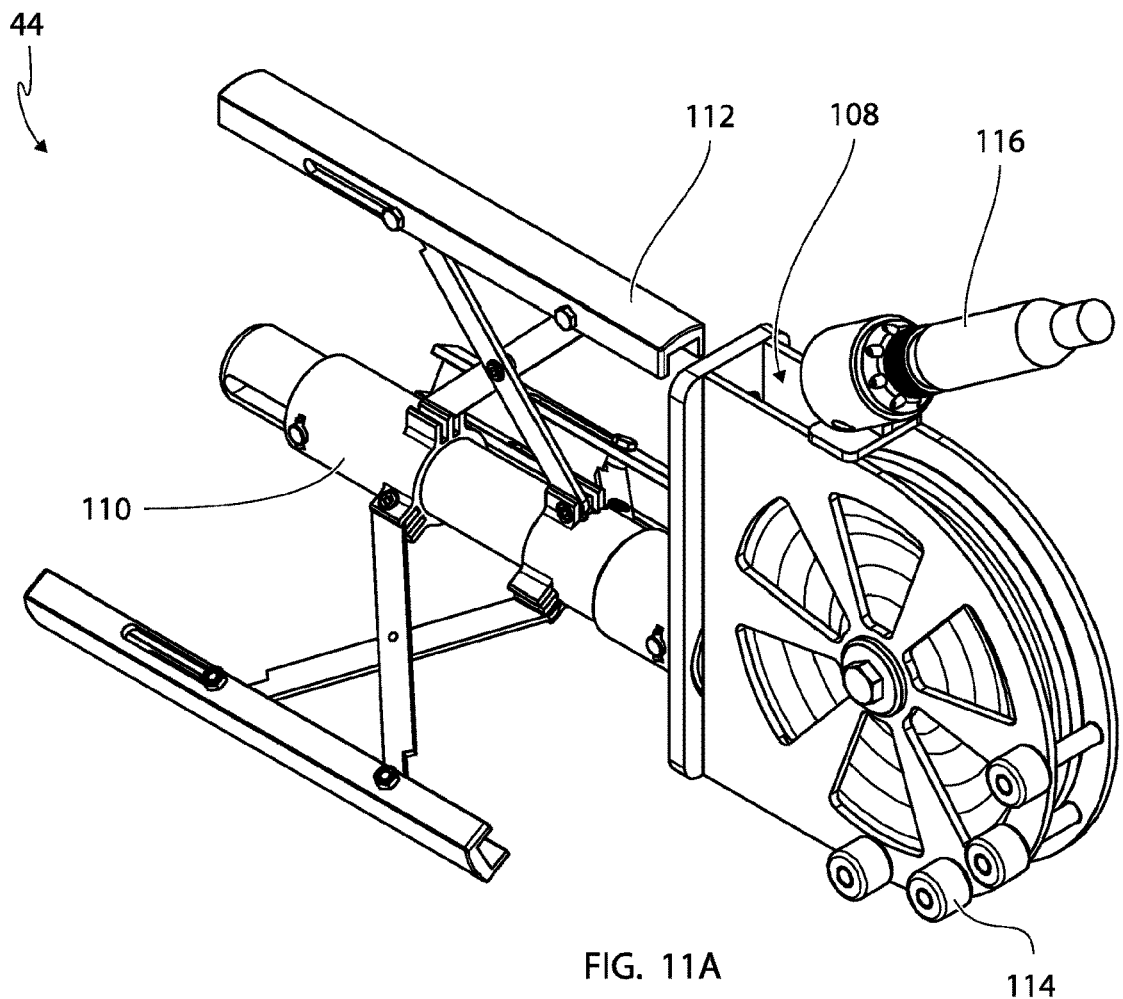
FIG. 11A is a perspective view of a pulley assembly.

FIG. 11A is a perspective view of a pulley assembly including a cable. The pulley assembly is used for changing the direction of the cable without any damage to the cable, i.e. when passing the cable from the manhole to the main pipeline.

The pulley assembly comprises a pulley 108 for accommodating a cable. The pulley 108 is connected to a frame 110 which comprises fasteners 112 for fastening the pulley at the junction between a main pipeline and a manhole. The pulley assembly comprises removable pins 114 in order to prevent the cable from slipping out of the pulley 108. Further, the pulley assembly comprises a connector 116 for being able to connect a control wire for controlling the fasteners 112.

Preferably, the cable for controlling and pulling the seal installation device is guided via the pulley 108. In an advantageous embodiment, the cables are mounted on the pulley 108 before the pulley assembly is introduced into the manhole.

Figure 11B:
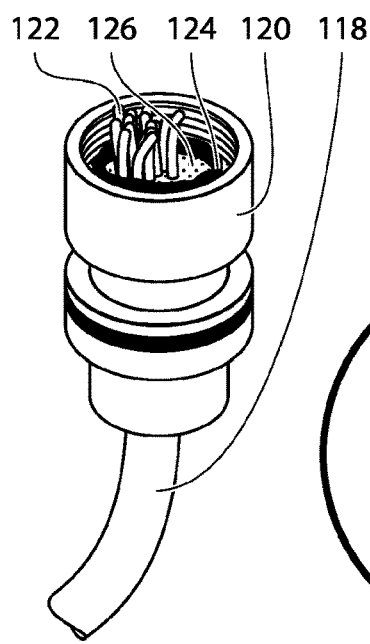
FIG. 11B is a perspective view of plug associated with a cable.

FIG. 11B is a perspective view of plug 120 associated with a cable 118. The cable 118 may be used together with the pulley assembly and seal installation device described above. The cable comprises an outer polymeric coating and beneath the coating a Kevlar sheath 124 with load bearing capabilities. The Kevlar sheath 124 allows the seal installation device to be pulled into the main pipeline using the cable 118. The Kevlar sheath 124 also protects the underling wires 122. The wires 122 provide power and communication between the user interface on the ground and the seal installation device/manipulator inside the main pipeline. The Kevlar sheath 124 is connected to the plug 120 by an epoxy joint 126 within the plug 120 allowing the Kevlar to cross link with the epoxy and form a very firm bond.

Figure 11C:
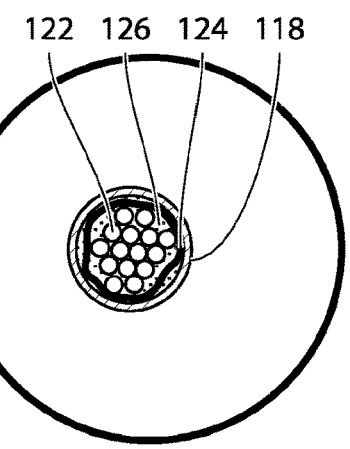
FIG. 11C is a cutout view of a cable.

FIG. 11C is a cutout view of a cable 118 showing the Kevlar sheath 124 enclosing the wires 122.

Figure 11D:
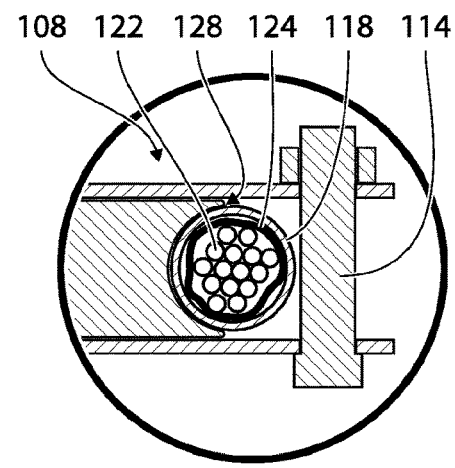
FIG. 11D is a cutout view of a cable in a pulley assembly.

FIG. 11D is a cutout view of a cable in a pulley 108. In order to prevent the cable 118 from slipping out of the pulley 108, the pulley comprises the above mentioned pins 114 and additionally a channel 128 in the pulley wheel for accommodating the cable 118.

Figure 12A:
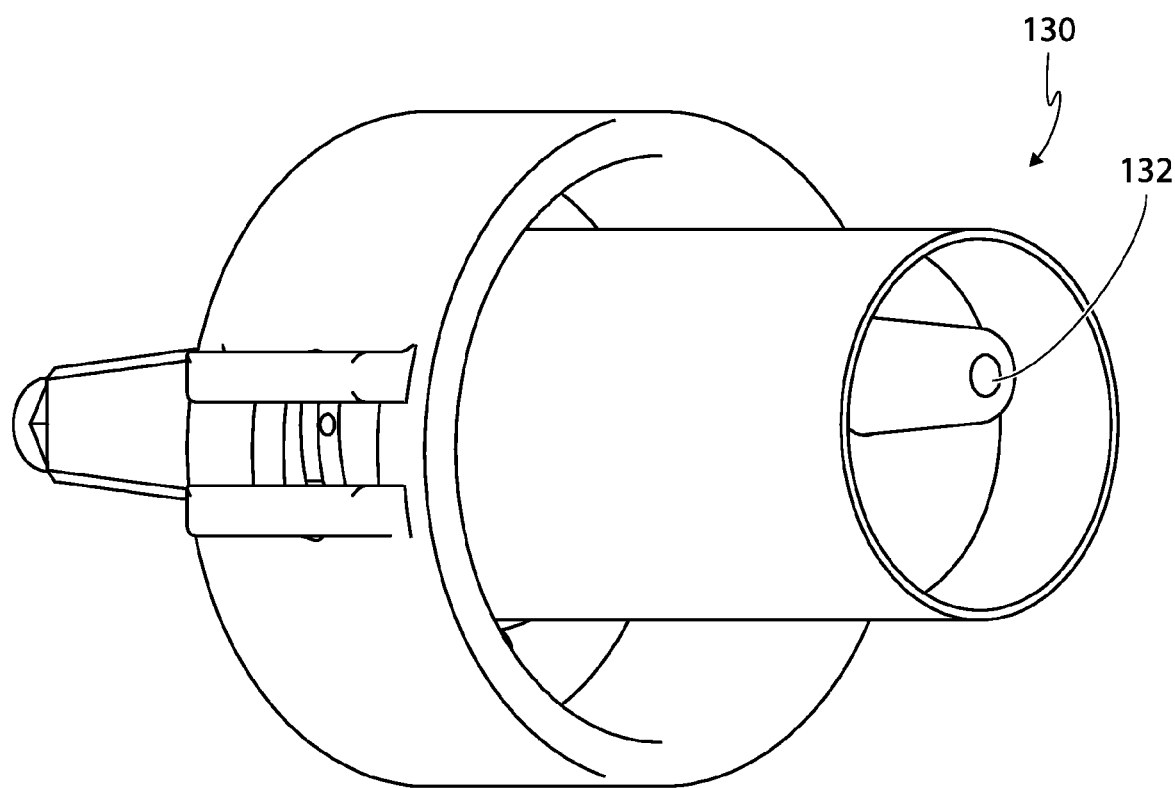
FIG. 12A is a rear perspective view of a coupling part.

FIG. 12A is a rear perspective view of an overpressure valve 130. The overpressure valve 130 is typically positioned at the end of the extension of the seal installation device and is used for relieving the seal installation device from excessive pressure during the light curing as the cooling air gas used for cooling the LED light sources is released into the seal installation device, and optionally for supplying air to the seal installation device during the expansion of the bladder. The overpressure valve 130 is electrically controlled and comprises one or more pressure sensors which are typically located in the garage of the light curing device (not shown) buy may also be located on the side of the overpressure valve 130 which is connected to the extension and facing the seal installation device. However, the pressure sensor may also be located in the bladder or at the light curing device in order for the overpressure valve 130 to react quicker to pressure fluctuations. The reference numeral 132 denotes the valve cone which is motor driven and movable in an axial direction through a hole in a plate in order to adjust the aperture between the hole and the cone. The air is evacuated through the aperture between the cone and the hole.

Figure 12B:
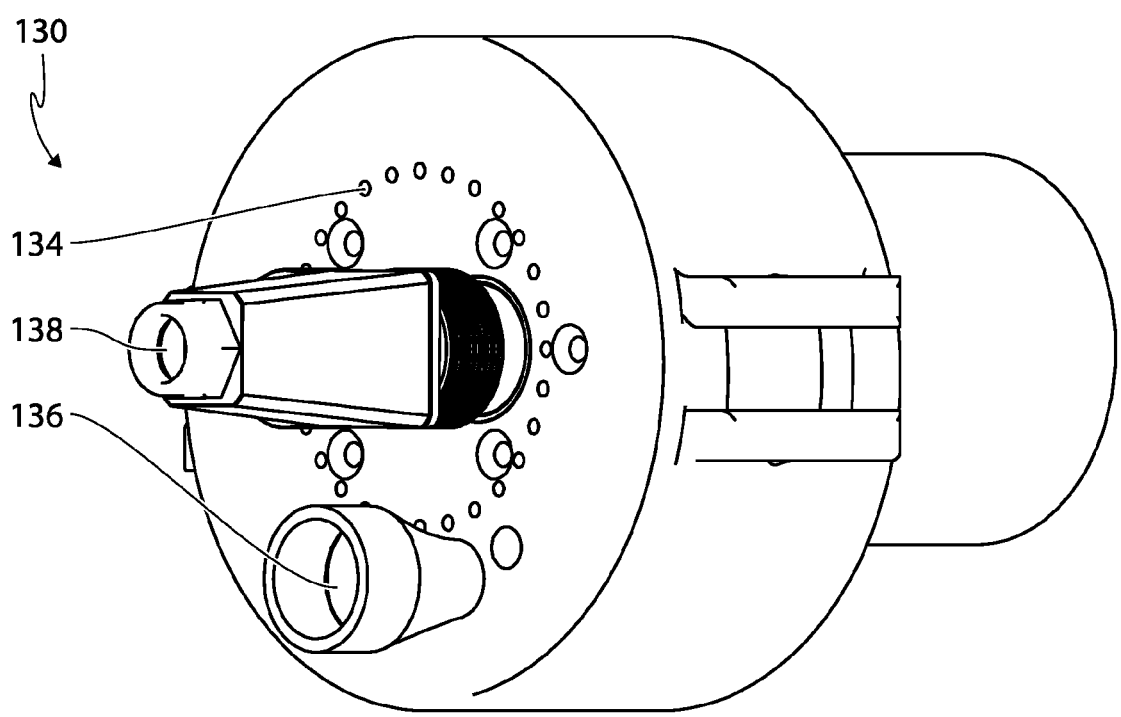
FIG. 12B is a front perspective view of a coupling part.
Figure 13A:
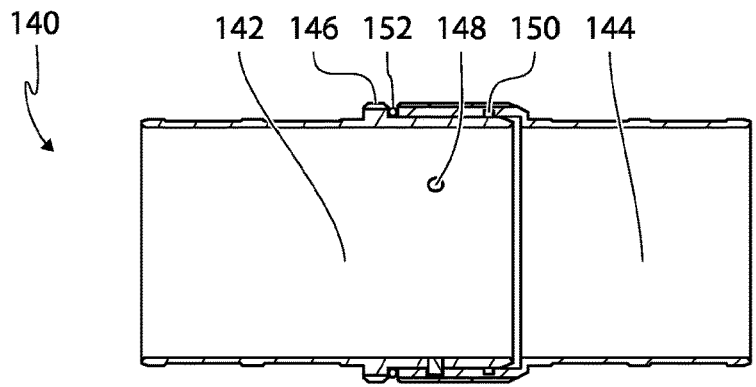
FIG. 13A is a side cutout view of a coupling part coupled to a seal installation device.
Figure 13B:
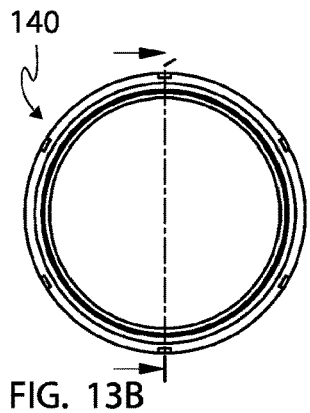
FIG. 13B is a front view of a coupling part coupled to a seal installation device.
Figure 13C:
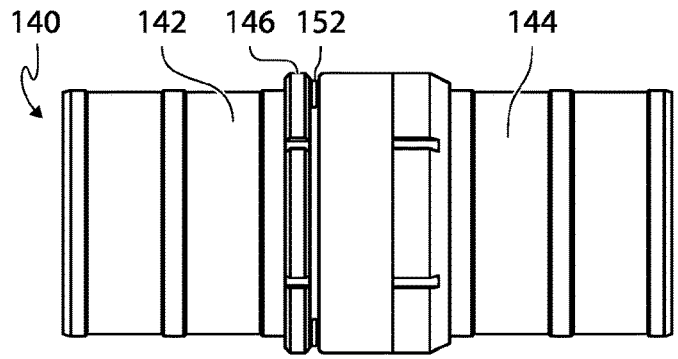
FIG. 13C is a side view of a coupling part.
Figure 13D:
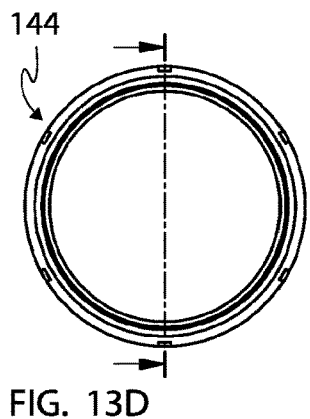
FIG. 13D is a front view of a second part of the coupling part.
Figure 13E:
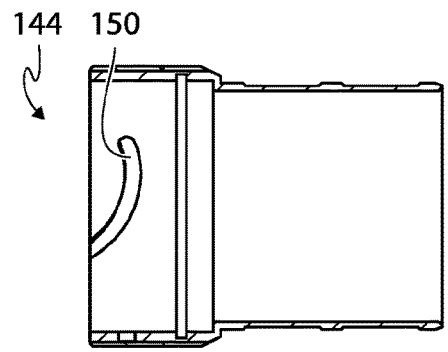
FIG. 13E is a side cutout view of a second part of the coupling part.
Figure 13F:
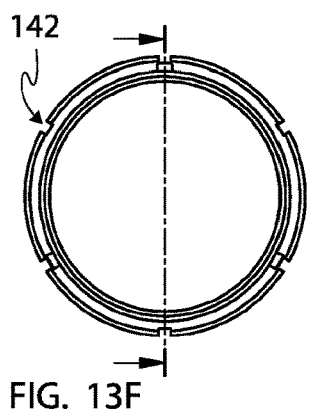
FIG. 13F is a front view of a first part of the coupling part.
Figure 13G:
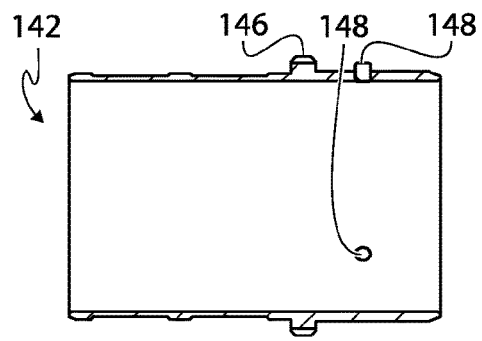
FIG. 13G is a side cutout view of a first part of the coupling part.
Figure 13H:
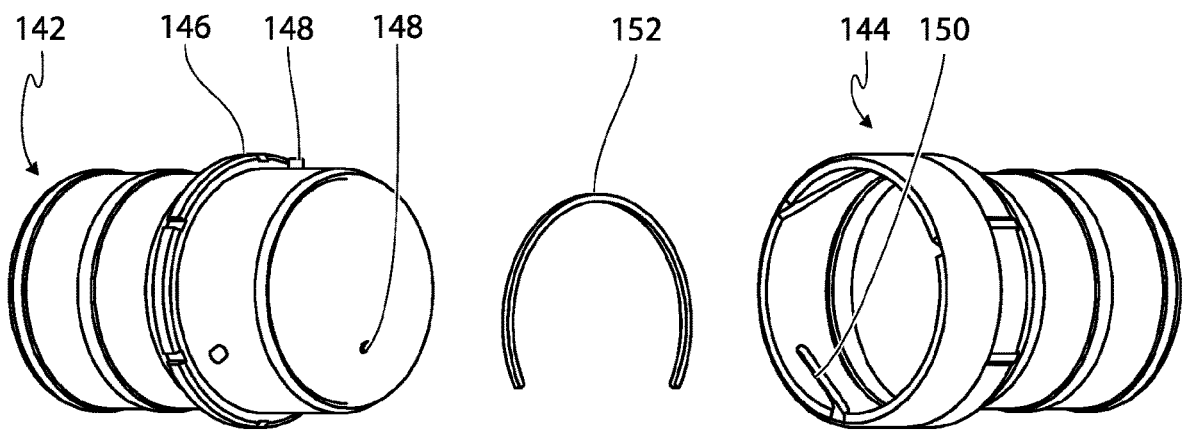
FIG. 13H is a perspective view of a coupling part and locking ring.
Figure 13I:
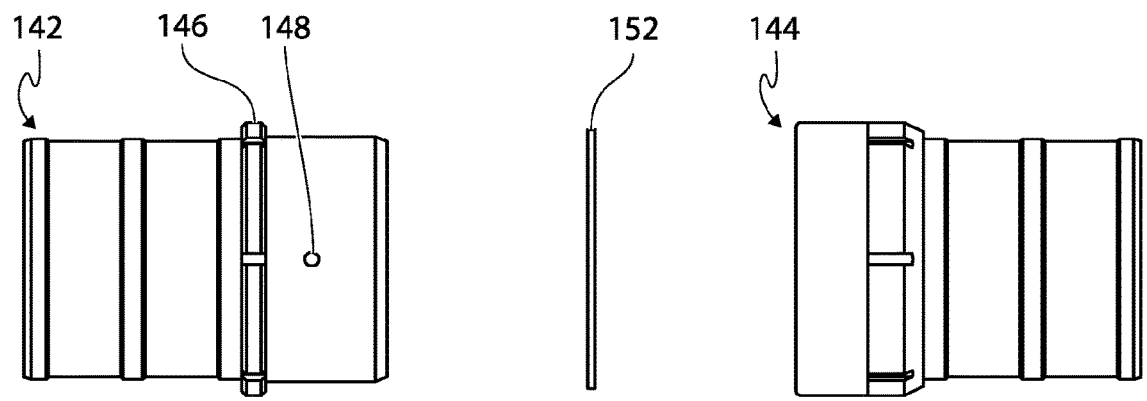
FIG. 13I is a side view of a coupling part and locking ring.

FIG. 12B is a front perspective view of an overpressure valve 130. The overpressure valve 130 is typically clamped to the extension of the seal installation device, however, other fastening means may be used. The overpressure valve 130 comprises a gas outlet 134 for releasing air from the seal installation device, a gas inlet 136 for receiving air from a compressor, and a control cable inlet 138 for controlling the overpressure valve 130. The overpressure valve 130 is configured such that it releases air through the gas outlet 134 when the pressure inside the seal installation device increases beyond a set pressure. The set pressure should be sufficient for maintaining the bladder in an expanded position but considerably less than the expected rupture pressure of the bladder.

FIG. 13A-I are various views of a coupling part 140. The coupling part 140 is used e.g. for coupling the extension of the seal installation device to the seal installation device proper. The coupling part 140 comprises a first part 142 which may form part of the seal installation device and a second part 144 which may form part of the extension. The first part 142 comprises a circumferential bulge 146 and a pin 148 whereas the second part 144 comprises an arc shaped slot. When connected, the second part 144 covers part of the first part 142.

The first part 142 and the second part 144 are interconnected by causing the pin 148 to enter the arc shaped slot 150, turning the parts 142 144 in relation to each other until the pin reaches the end of the slot. Thereafter the locking ring 152 is applied. The locking ring 152 is inserted between the bulge 146 of the first part and the second part in order to prevent the first and second parts from being separated by rotation without first removing the locking ring 152.

Figure 14:
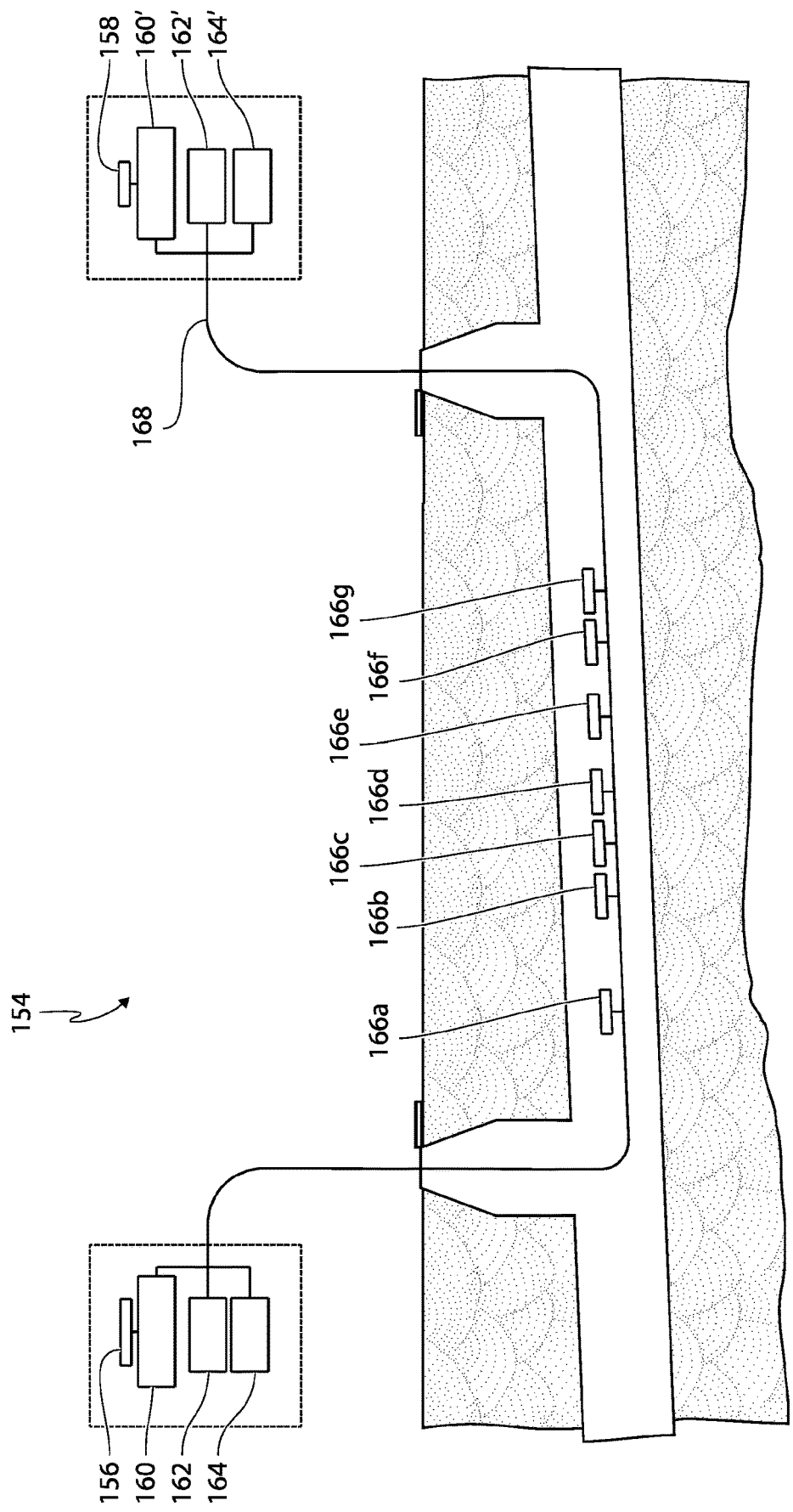
FIG. 14 is a side view of a bus system.

FIG. 14 is a side view of a bus system 154. The bus system 154 is established between a master 156 located at one end of the main pipeline, e.g. at a first manhole, and a slave 158 located at the opposite end of the main pipeline, e.g. at a second manhole. Normally, the master 156 is located in the truck and the slave 158 in the separate electrical powered winching vehicle, however, various setups are feasible including the use of two electrical powered winching vehicle of which one is master and the other is slave.

Each of the master 156 and the slave 158 comprises a separate CAN bus 160 160', separate 48V power supplies 162 162' and separate 24V power supplies 164, 164'. The bus 154 further comprises nodes 166a-g which constitute parts of the seal installation system which are requiring power and/or control. The nodes 166 may be e.g. the light curing device including the drive system, the pulley assembly, the seal installation device and the manipulator. The nodes are interconnected by the cable 168 which also interconnects the master 156 and the slave 158 for providing redundancy and ability to control the installation from both locations.

FIG. 15A is a perspective view of a gelling station 170 and a seal installation device 18. The gelling station 170 is used for gelling the brim portion of the seal in order for the epoxy adhesive coating to be more easily and securely applied before the seal installation device 18 enters the main pipeline and the seal is applied at the junction between the main pipeline and the branch pipeline. The epoxy coating adheres the brim portion to the main pipeline at the junction. The seal installation device 18 is fastened to a holder 172 of the gelling station 170. The holder 172 of the gelling station 170 grips the seal installation device 18 at the gripping mechanism 46. The gelling station 170 further comprises a led panel 174 which is rotationally mounted via a movable arm 176 to a motor 178 of the gelling station 170. The motor 178 is located adjacent the holder 172 and the movable arm 176 has an L shape allowing the led panel 174 to rotate about the seal installation device 18 as shown by the arrow, maintaining a constant distance to the seal installation device 18.

FIG. 15B is a cut-out view of a seal installation device 18 including a seal 26. The seal 26 has been placed on the bladder 50 of the seal installation device 18 and where the tubular portion 26b has been inverted into the opening 54 of the seal installation device 18. The brim portion 26a rests on the bladder 50. The seal 26 has been impregnated by a suitable curable resin.

FIG. 15C is a cut-out view of a seal installation device 18 including a seal 26 and a stopper 180. The stopper 180 is applied on top of the opening 54 for covering the tubular portion 26a of the seal. In this way, no light will reach the tubular portion 26a of the seal which is thus protected from the light of the LED panel 174. The tubular portion 26a should not be gelled, since it must be very flexible in order to invert properly, and gelling the tubular portion 26b would have no purpose since no epoxy coating will be applied.

FIG. 15D is a cut-out view of a seal installation device 18 and gelling station 170 in operation. In order to achieve a proper gelling of the brim portion 26a, it must be irradiated by a predefined amount of light sufficient for achieving a partial curing of the resin in the brim portion 26a for allowing the brim portion 26a to remain substantially flexible while establishing a semi-solid gel-like surface for applying the epoxy coating. It is evident that the amount of light irradiated is crucial since too much light will yield a full curing of the resin causing the brim portion 26a to be hardened. The LED panel 174 is set to a constant intensity and the motor 170 is adjusted to perform a rotational movement of the LED panel 174 over the brim part 26b of the seal for irradiating the complete brim portion 26a evenly corresponding to the predefined amount of light for yielding a proper gelling of the brim portion 26a. The LED panel 174 is preferably emitting a blue curing light of a known intensity. After the gelling is completed, the epoxy coating is applied and the installation is the seal may start.

The above described embodiments describe specific realizations according to the present invention showing specific features, however, it is apparent to the skillful individual that the above described embodiments may be modified, combined or aggregated to form numerous further embodiments.

It now follows a list of the reference numerals used in the figures and description:

10. Assembly
12. Junction
14. Main pipeline
16. Branch pipeline
18. Seal installation device
20. Manipulator
22. Extension tube
24. Light curing device
26. Seal
28. Polymeric tube
30. Gas supply tube
32. Steel wire
34. Truck
36. Pulley
38. Manhole
40. Cable
42. Vehicle
44. Pulley assembly
46. Gripping mechanism
48. Expansion member/Wheels
50. Bladder
52. Housing
54. Opening
56. Camera
58. Outer elongated frame
60. Inner elongated frame
62. Garage
64. Entry
66. Drive mechanism
68. First pair of rollers
70. Second pair of rollers
72. Pivotable plate
74. Hinge
76. Linear actuator
78. Adhesive
80. Coating
82. Felt
84. PV
86. CSM
88. CD rowing
90. CSM
92. MD rowing
94. Sealing ring
96. Cover
98. LED
100. Outer passage (heat sink)
102. Inner passage (heat sink)

-continued

104. Entry
106. Exit
108. Pulley
110. Frame
112. Fasteners
114. Pins
116. Connector
118. Cable
120. Plug
122. Wires
124. Kevlar sheath
126. Epoxy
128. Channel
130. Overpressure valve
132. Valve cone
134. Gas outlet
136. Gas inlet
138. Control cable inlet
140. Connector
142. First part
144. Second part
146. Bulge
148. Pin
150. Arc shaped slot
152. Locking ring
154. Bus system
156. Master
158. Slave
160. CAN bus
162. 24 V DC
164. 12 V DC
166a-g. Nodes
168. Cable
170. Gelling station
172. Holder
174. LED panel
176. Arm
178. motor
180. Stopper Points Now follows a set of points which constitute aspects of the present invention which may be considered independently patentable and as such the following sets form basis for possible future sets of claims:

First set of points characterizing the invention:

1. A seal for being installed onto a junction between a branch pipeline and a main pipeline, said seal comprising a tubular portion defining a longitudinal direction between a first opening and a second opening, and a brim portion attached to said tubular portion at said first opening and extending radially outwardly from said tubular portion defining a straight axial direction and a curved peripheral direction and comprising an outer layer for facing said main pipeline and an inner layer attached to said outer layer for facing away from said main pipeline, said seal being made to minimize contraction of said brim portion in said axial direction and of said first and second openings of said tubular portion during curing whereas allowing contraction of said outer layer of said brim portion in said peripheral direction and/or said tubular portion in said longitudinal direction during curing.

2. The seal according to point 1, wherein said outer layer and said inner layer have fibers which are oriented in different directions, preferably random directions and/or perpendicular directions.

3. The seal according to any of the preceding points, wherein said outer layer of said brim portion comprises a resin impregnated layer for facing said main pipeline, and/or, said inner layer comprises a resin impregnated layer for facing away from said main pipeline, said resin impregnated layer preferably being made of fleece, such as PET, PP, PE, glass or most preferably PAN.

4. The seal according to any of the preceding points, wherein said outer layer and/or said inner layer comprises one or more sublayers of CSM.

5. The seal according to any of the preceding points, wherein said tubular portion comprises a felt material.

6. The seal according to any of the preceding points, wherein said brim portion and said tubular portion are impregnated by a light curable resin.

7. The seal according to any of the preceding points, wherein said outer layer of said brim portion is stitched and/or adhered onto said inner layer of said brim portion, preferably at edges of said layers, and/or, said brim portion and said tubular portion are stitched and/or adhered together.

8. The seal according to any of the preceding points, wherein said brim portion is provided with a sealing ring for facing said main pipeline, said sealing ring preferably comprising one or more of a rubber ring, more preferably a hollow rubber ring, and optionally including a metal wire or rigid plastic filament and optionally being hydrophilic and/or a paste, optionally being hydrophilic.

9. The seal according to point 8, wherein said outer layer comprise fibers predominantly directed in random direction and said inner layer comprises fibers predominantly directed in said circumferential direction.

10. The seal according to any of the preceding points, wherein said brim portion is provided with a sealant layer, preferably an adhesive such as epoxy, for facing said main pipeline.

11. The seal according to point 10, wherein said epoxy layer extends on said brim portion outwardly from said first opening covering only a part of said brim portion between said first opening and an outer periphery of said brim portion, such as between 50% and 90% of said axial and peripheral direction between said first opening and said outer periphery of said brim portion.

12. The seal according to any of the points 10-11, wherein said outer layer and said inner layer comprise fibers predominantly directed and substantially equally distributed in said axial direction and said peripheral direction, respectively.

13. A method of installing a seal onto a junction between a branch pipeline and a main pipeline, said method comprising the following steps:

providing seal comprising a tubular portion defining a longitudinal direction between a first opening and a second opening, and a brim portion attached to said tubular portion at said first opening and extending radially outwardly from said tubular portion defining a straight axial direction and a curved peripheral direction and comprising an outer layer for facing said main pipeline and an inner layer attached to said outer layer for facing away from said main pipeline, said seal being made to minimize contraction of said brim portion in said axial direction and of said first and second openings of said tubular portion during curing whereas allowing contraction of said outer layer of said brim portion in said peripheral direction and/or said tubular portion in said longitudinal direction during curing, positioning said seal onto said junction between said branch pipeline and said main pipeline such that said brim part is located in and contacting said main pipeline about said junction and said tubular part extends into and contacting said branch pipeline, and curing said brim portion and subsequently curing said tubular part, thereby introducing a contraction force between said first and second openings of said tubular part and/or between said brim portion and said main pipeline.

14. The method according to point 13, wherein said tubular part is cured in a direction from said second opening towards said first opening.

15. The method according to point 13 or 14, further comprising the step of gelling said outer layer of said brim portion of said seal preferably by exposing said outer layer of said brim portion to radiation and thereafter applying an adhesive to said outer layer of said brim portion before said seal is positioned onto said junction.

16. A gelling station comprising a holder for holding a seal installation device including a seal, said gelling station comprising a light source rotationally mounted to said holder via an arm and a motor for allowing said light source to rotate partially about said seal installation device at constant distance to a brim portion of said seal when mounted to said holder.

17. A method of gelling a brim portion of a seal on a seal installation device, said gelling station comprising a holder for holding said seal installation device and a light source mounted to said holder via an arm and a motor, said method comprising the step of rotating said light source partially about said seal installation device at constant distance to said brim portion of said seal while irradiating said brim portion of said seal.

Second set of points characterizing the invention:

1. A seal installation device for installing a seal onto a junction between a branch pipeline and a main pipeline, said seal installation device comprising:
   an elongated housing having a cylindrical wall extending between a first end and a second end of said housing, said cylindrical wall defining a grid structure and an opening located between said first end and said second end,
   a pivotable plate having a curved shape being located within said housing adjacent said opening, said pivotable plate defining a first edge which is hingedly attached to said cylindrical wall opposite said opening and a second edge opposite said first edge, said pivotable plate being pivotable between a first position in which said second edge is located at said cylindrical wall opposite said opening and a second position in which said second edge is located at said opening, and
   an inflatable, expandable and flexible bladder enclosing said grid structure of said cylindrical wall, said flexible bladder defining an inflated position and a deflated position, said flexible bladder having a first cylindrical part extending between said first end of said cylindrical wall and said second end of said cylindrical wall and, when said flexible bladder defining said inflated position, being capable of applying a pressure force onto said main pipeline, and a second cylindrical part extending from said first cylindrical part at said opening and, when said flexible bladder defining said inflated position, being capable of applying a pressure force onto said branch pipeline and, when said flexible bladder defining said deflated position, to be stored in an inverted shape within said grid structure.

2. The seal installation device according to point 1, wherein said flexible bladder is light transparent or light translucent, preferably for UV light and/or visible light.

3. The seal installation device according to any of the preceding points, wherein said cylindrical wall of said elongated housing defines a circumferential direction and a longitudinal direction, said cylindrical wall comprises a first circumferential protrusion, the first circumferential protrusion defining a pin, the seal installation device further comprising a coupling part comprising a second circumferential protrusion, for being fitted adjacent the first circumferential protrusion, and an arc shaped slot extending from a start point on the first end and/or at the second end along the radial direction and along the longitudinal direction to an extreme point adjacent the second circumferential protrusion, and further to an end point being located between the start point and the extreme point in the longitudinal direction, the pin being capable of being guided by the arc shaped slot from the start point via the extreme point to the end point, the seal installation device further comprising a locking ring capable of being inserted between the first circumferential protrusion and the second circumferential protrusion for securing the coupling part and the elongated housing in a fixed position relative to each other when the pin is located at the end point.

4. The seal installation device according to any of the preceding points, wherein said flexible bladder is made of silicone.

5. The seal installation device according to any of the preceding points, wherein said first end of said elongated housing is provided with a protective tubing for protecting said second cylindrical part of said bladder when in said deflated position.

6. The seal installation device according to any of the preceding points, wherein said pivotable plate is connected to a sliding profile extending in and slideable in a longitudinal direction of said housing.

7. The seal installation device according to point 6, wherein said sliding profile is driven by a mandrel in turn driven by a motor, optionally via a gear.

8. The seal installation device according to any of the preceding point, wherein said first end and/or said second end comprises a connector, said connector comprising a gas supply vent for supplying pressurization gas to said bladder, a motorized controllable pressure relief valve for relieving said flexible bladder of excessive pressurized gas and a data cable for allowing data communication through said connector.

9. The seal installation device according to any of the preceding points, wherein said seal installation device comprises an extension at said first end in form of a flexible hose, said hose optionally being adapted for accommodating a light curing device.

10. A method of installing a seal onto a junction between a branch pipeline and a main pipeline, said method comprising providing a seal installation device comprising:
   an elongated housing having a cylindrical wall and extending between a first end and a second end of said housing, said cylindrical wall defining a grid structure and defining an opening through said cylindrical wall located between said first end and said second end,
   a pivotable plate having a curved shape and being located within said housing adjacent said opening, said pivotable plate defining a first edge which is hingedly attached to said cylindrical wall opposite said opening and a second edge opposite said first edge, and
   an inflatable, expandable and flexible bladder enclosing said grid structure of said cylindrical wall, said flexible bladder having a first cylindrical part extending between said first end of said cylindrical wall and said second end of said cylindrical wall, and a second cylindrical part extending from said first cylindrical part at said opening, said flexible bladder defining a deflated position and said second cylindrical part is stored in an inverted shape within said grid structure, said method further comprising the steps of:
causing said flexible bladder to assume an inflated position in which said first cylindrical part applies a pressure force onto said main pipeline and said second cylindrical part applies a pressure force onto said branch pipeline,
pivoting said movable plate to assume a first position in which said second edge is located at said cylindrical wall opposite said opening,
inserting a light curing device into said seal installation device and light curing said main pipeline,
pivoting said pivotable plate to assume a second position in which said second edge is located at said opening, and
inserting a light curing device into said seal installation device and light curing said branch pipeline, 11. The method according to point 10, wherein said flexible bladder is expanded by using pressurized gas, preferably air or steam.

12. The method according to any of the points 10-11, wherein said method further comprising the initial step of positioning said seal installation device adjacent said junction such that said opening of said housing is facing said branch pipeline.

13. The method according to any of the points 10-12, wherein said branch pipeline is cured in a direction from a position distant from said junction towards said junction.

14. A connector for use in a seal installation device including a flexible bladder, said connector comprising a gas supply vent for supplying pressurization gas to said bladder, a motorized controllable pressure relief valve for relieving said flexible bladder of excessive pressurized gas and a data cable for allowing data communication through said connector.

15. A method of supplying compressed gas to a flexible bladder of a seal installation device by using a connector comprising a gas supply vent for supplying pressurization gas to said bladder, a motorized controllable pressure relief valve for relieving said flexible bladder of excessive pressurized gas and a data cable for allowing data communication with and through said connector, said method comprising the steps of:
receiving pressurized gas by said gas supply vent for causing said flexible bladder to inflate, and
relieving said flexible bladder of excessive pressurized gas by using said motorized controllable pressure relief valve controlled by said data cable.

Third set of points characterizing the invention:

1. A light curing assembly including a light curing device and a drive mechanism for driving said light curing device through a pipeline, said drive mechanism being coupled to a seal installation device or to a tubing connected to a seal installation device said drive mechanism comprising:
a flexible polymeric sheathing tube connected at one end to said light curing device and defining a curved outer surface, said polymeric sheathing tube being capable of pushing and pulling said light curing device,
a first pair of rollers located on opposite sides of said sheathing tube, each roller of said first pair of rollers defining a concave peripheral surface contacting said curved outer surface of said sheathing tube and defining a curvature corresponding to said curved outer surface of said sheathing tube, said first pair of rollers being mutually interconnected, and
a second pair of rollers located on opposite sides of said sheathing tube and adjacent said first pair of rollers, each roller of said second pair of rollers defining a concave peripheral surface contacting said curved outer surface of said sheathing tube and defining a curvature corresponding to the outer surface of said sheathing tube, said second pair of rollers being mutually interconnected.

2. The light curing assembly according to point 1, wherein said first pair of rollers being mutually interconnected by means of a cog wheel and/or said second pair of rollers being mutually interconnected by means of a cog wheel.

3. The light curing assembly according to any of the preceding points, wherein said first pair of rollers being divided into one driving roller and one idle roller.

4. The light curing assembly according to point 3, wherein said idle roller of said first pair of rollers being spring loaded towards said driving roller of said first pair of rollers.

5. The light curing assembly according to any of the preceding points, wherein said second pair of rollers being divided into one driving roller and one idle roller.

6. The light curing assembly according to point 5, wherein said idle roller of said second pair of rollers being spring loaded towards said driving roller of said second pair of rollers.

7. The light curing assembly according to any of the preceding points, wherein said flexible and substantially non-elastic polymeric sheathing tube is made of PVC, PP, PE, or preferably PEX or any combinations of the above.

8. The light curing assembly according to any of the preceding points, wherein said flexible and substantially non-elastic polymeric sheathing tube includes electrical wiring for providing power to said light curing device and/or for providing data communication with said light curing device.

9. The light curing assembly according to any of the preceding points, wherein said flexible polymeric sheathing tube is capable of supplying compressed gas, preferably air, to said light curing device.

10. The light curing assembly according to any of the preceding points, wherein said first pair of rollers and said second pair of rollers are mutually interconnected by a cog wheel for ensuring a synchronized rotation of said rollers.

11. The light curing assembly according to any of the preceding points, wherein said first pair of rollers and/or said second pair of rollers being driven by an electrical motor, optionally via a gear box.

12. The light curing assembly according to any of the preceding points, wherein said concave peripheral surfaces of said first pair of rollers and/or said second pair of rollers being provided with a high friction surface, such as a raw metal surface, optionally coated by rubber.

13. The light curing assembly according to any of the preceding points, wherein said first pair of rollers and/or said second pair of rollers being driven by a dual direction drive.

14. A method of curing a pipeline by using a light curing assembly, said light curing assembly including a light curing device and a drive mechanism, said drive mechanism being coupled to a seal installation device or to a tubing connected to a seal installation device, said drive mechanism comprising:
a flexible polymeric sheathing tube connected at one end to said light curing device and defining a curved outer surface,
a first pair of rollers located on opposite sides of said sheathing tube, each roller of said first pair of rollers defining a concave peripheral surface contacting said curved outer surface of said sheathing tube and defining a curvature corresponding to said curved outer surface of said sheathing tube, said first pair of rollers being mutually interconnected, and a second pair of rollers located on opposite sides of said sheathing tube and adjacent said first pair of rollers, each roller of said second pair of rollers defining a concave peripheral surface contacting said curved outer surface of said sheathing tube and defining a curvature corresponding to the outer surface of said sheathing tube, said second pair of rollers being mutually interconnected, said method further comprising the step of pushing said light curing device into said pipeline by rotating said rollers in a first direction and pulling said light curing device back from said pipeline by rotating said rollers in a second direction being opposite said first direction.

15. The method according to point 14, further comprising any of the features according to any of the points 1-13.

Fourth set of points characterizing the invention:

1. A manipulator for positioning and rotating a seal installation device within a main pipeline for aligning said seal installation device with a branch pipeline, said manipulator comprising:
   a outer elongated frame defining a longitudinal direction and extending between a first end and an opposite second end, said outer elongated frame comprising wheels circumferentially disposed about said outer elongated frame for contacting said main pipeline and defining a rotational axis being perpendicular to said longitudinal direction for allowing said manipulator to move in said longitudinal direction within said pipeline, and
   an inner elongated frame defining a front end and an opposite rear end, said front end comprising a gripping mechanism for gripping said seal installation device, said inner elongated frame defines a smaller diameter than said outer elongated frame and said inner elongated frame and said outer elongated frame defining a mutually overlapping section.

2. The manipulator according to point 1, wherein said outer elongated frame is capable of defining a contracted position in which said wheels defines a first periphery about said outer elongated frame, and an expanded position in which said wheels defines a second periphery about said outer elongated frame, said first periphery being smaller than said second periphery.

3. The manipulator according to point 2, wherein said outer elongated frame comprises a plurality of skids, said skids comprising said wheels, said plurality of skids preferably being between 3 and 5 skids, such as 4, said skids being capable of assuming said contracted position and said expanded position.

4. The manipulator according to any of the preceding points, wherein said outer elongated frame comprises a camera at said second end and/or said inner elongated frame comprise a camera at said rear end.

5. The manipulator according to any of the preceding points, wherein said manipulator further comprises a first wire connected to said second end and/or said rear end for moving said manipulator within said main pipeline.

6. The manipulator according to any of the preceding points, further comprising a second wire connected to said seal installation device for moving said manipulator within said main pipeline.

7. The manipulator according to any of the preceding points, wherein said inner elongated frame comprises a camera at said front end.

8. The manipulator according to point 7, wherein said camera being pivotable.

9. The manipulator according to point 8, wherein said camera being pivotable along two axles being perpendicular to said longitudinal direction.

10. The manipulator according to any of the points 7-9, wherein said camera comprises a spring for detecting said branch pipeline.

11. The manipulator according to any of the preceding points, wherein said inner elongated frame being located within said outer elongated frame, said front end extending beyond said first end and said rear end extending beyond said second end.

12. The manipulator according to any of the preceding points, wherein said manipulator is driven by an electrical motor.

13. The manipulator according to any of the preceding points, wherein said outer and said inner elongated frame preferably being interconnected by a set of cogwheels within said mutual overlapping section of said frames.

14. The manipulator according to any of the preceding points, wherein said inner elongated frame comprises a flexible antenna extending in a radial direction for accurately detecting the position of said branch pipeline, said flexible antenna preferably constituting a spring.

15. A method of positioning and rotating a seal installation device, said method comprising providing a manipulator comprising:
   a outer elongated frame defining a longitudinal direction and extending between a first end and an opposite second end, said outer elongated frame comprising wheels circumferentially disposed about said cylindrical housing and defining a rotational axis being perpendicular to said longitudinal direction, and
   an inner elongated frame defining a front end and an opposite rear end, said front end comprising a gripping mechanism for gripping said seal installation device, said inner elongated frame defines a smaller diameter than said outer elongated frame and said inner elongated frame and said outer elongated frame defining a mutually overlapping section, said method comprising the steps of:
   gripping said seal installation device using said gripping mechanism,
   causing said wheels to contact said main pipeline,
   moving said manipulator in said longitudinal direction within said pipeline, and
   rotating said inner elongated frame relative to said outer elongated frame causing said seal installation device to be aligned with a branch pipeline.

Fifth set of points characterizing the invention:

1. An assembly for installing a lining tube in a pipeline using a seal installation device, said pipeline extending between a first end and a second end, said assembly comprising:
   a first motorized winching vehicle for being positioned at said first end of said pipeline and comprising a first control unit and a first winching unit controlled by said first control unit, said first winching unit including a first cable connectable to a first end of said seal installation device, and
   a second motorized winching vehicle for being positioned at said second end of said pipeline and comprising a second control unit and a second winching unit controlled by said second control unit, said second winching unit including a second cable connectable to a second end of said seal installation device, said first control unit and said second control unit establishing mutual communication for synchronizing said first winching unit and said second winching unit.

2. The assembly according to point 1, wherein said first cable is communicating with and powering said seal installation device, whereas said second cable constituting a pulling cable such as a steel wire, and said first control unit and said second control unit establishing mutual communication via wireless communication or via a separate communication wire.

3. The assembly according to point 1, wherein both said first cable and said second cable being capable of communicating with and powering said seal installation device, said first control unit and said second control unit establishing mutual communication via said first cable, said seal installation device and said second cable.

4. The assembly according to any of the preceding points, wherein said first cable and/or said second cable comprises a pair of data communication wires for establishing data communication between said first control unit and said second control unit using a digital communication protocol, and wherein said first cable and/or said second cable comprises a at least two and preferably three power transmission wires.

5. The assembly according to any of the preceding points, wherein said first cable and/or said second cable comprises an outer polymeric sheath and at least one sheath of a load transmitting material, such as Kevlar sheath, and wherein said sheath preferably is fixated to a plug housing by a cross-linked adhesive joint, such as an epoxy joint.

6. The assembly according to any of the preceding points, wherein said first motorized winching vehicle constitutes an electrically powered vehicle, preferably a battery powered vehicle and/or said second motorized winching vehicle constitutes a truck, and/or said winching units being driven by servo motors.

7. The assembly according to any of the preceding points, wherein said first cable and/or said second cable establishes data communication with and/or provides power to said seal installation device, such as a pressure relief valve, a pressure sensor, a driving motor for a light curing device, a position sensor, a velocity sensor, an operating motor for said seal installation device, a rotation motor for said seal installation device or a clamping motor for clamping said seal installation device.

8. The assembly according to any of the preceding points, wherein said first motorized winching vehicle and/or said second motorized winching vehicle comprises a user interface.

9. The assembly according to any of the preceding points, further comprising a pulley assembly for protecting and redirecting said first cable and/or said second cable within said main pipeline, said pulley assembly comprising:
a rod shaped housing defining a first end and an opposite second end, said rod shaped housing including an actuator and a plurality of expanders, said expanders being operable by using said actuator between a contracted position in which said rod shaped housing defines a first outer periphery for allowing said pulley assembly to move within said main pipeline, and an expanded position in which said rod shaped housing defines a second outer periphery being larger than said first outer periphery for allowing said pulley assembly to be clamped within said main pipeline, and a pulley for accommodating said first cable and/or said second cable, said pulley being mounted at said first end of said housing, said pulley defining a circumferential groove for receiving said first cable and/or said second cable, said pulley further including locking pins for securing said first cable and/or said second cable to said pulley.

10. A method of installing a lining tube in a pipeline using a seal installation device, said pipeline extending between a first end and a second end, said assembly comprising:
a first motorized winching vehicle comprising a first control unit and a first winching unit controlled by said first control unit, said first winching unit including a first cable connectable to a first end of said seal installation device, and
a second motorized winching vehicle comprising a second control unit and a second winching unit controlled by said second control unit, said second winching unit including a second cable connectable to a second end of said seal installation device,
said method comprising the steps of:
positioning said first motorized winching vehicle at said first end of said pipeline,
positioning said second motorized winching vehicle at said second end of said pipeline,
connecting said first cable to said first end of said seal installation device,
connecting said second cable to said second end of said seal installation device, and
establishing mutual communication between said first control unit and said second control unit for synchronizing said first winching unit and said second winching unit.

11. A cable comprising an outer polymeric sheath encapsulating at least one Kevlar sheath, which in turn circumferentially encloses a bundle comprising at least one power line and at least one communication line, said cable defining an end comprising a plug housing, wherein said Kevlar sheath is fixated to said plug housing by a cross-linked adhesive joint, such as an epoxy joint.

12. A method of producing a cable by:
providing a bundle comprising at least one power line and at least one communication line,
circumferentially enclosing said bundle with at least one Kevlar sheath,
encapsulating said Kevlar sheath with an outer polymeric sheath, and
fixate said Kevlar sheath to a plug housing by an cross-linked adhesive joint, such as an epoxy joint, at a cable end.

13. A pulley assembly for protecting and redirecting a cable within a pipeline, said pulley assembly comprising:
a rod shaped housing defining a first end and an opposite second end, said rod shaped housing including an actuator and a plurality of expanders, said expanders being operable by using said actuator between a contracted position in which said rod shaped housing defines a first outer periphery for allowing said pulley assembly to move within said pipeline, and an expanded position in which said rod shaped housing defines a second outer periphery being larger than said first outer periphery for allowing said pulley assembly to be clamped within said pipeline, and
a pulley for accommodating said cable, said pulley being mounted at said first end of said housing, said pulley defining a circumferential groove for receiving said cable, said pulley further including locking pins for securing said cable to said pulley.

14. The assembly according to point 13, wherein said actuator comprises a scissor mechanism and/or said circumferential groove defines an circumferential indentation being deeper than the diameter of said cable.

15. A method of protecting and redirecting a cable within a pipeline by using a pulley assembly, said pulley assembly comprising:
- a rod shaped housing defining a first end and an opposite second end, said rod shaped housing including an actuator and a plurality of expanders, and
- a pulley for accommodating said cable, said pulley being mounted at said first end of said housing, said pulley defining a circumferential groove and locking pins, said method comprising the steps of:
- receiving said cable in said circumferential groove,
- securing said cable to said pulley by using said locking pins,
- introducing said pulley assembly into said pipeline in a contracted position in which said rod shaped housing defines a first outer periphery for allowing said pulley assembly to move within said pipeline, and
- clamping said rod shaped housing within said pipeline by operating said actuator for causing said expanders to assume said expanded position in which said rod shaped housing defines a second outer periphery being larger than said first outer periphery.

Sixth set of points characterizing the invention:

1. A light curing device for use in curing of pipelines, said light curing device comprising a housing defining:
- a transparent cylindrical outer cover defining a first end and an opposite second end,
- a first end piece covering said first end of said transparent cylindrical cover, said first end piece defining a cooling fluid inlet and a cooling fluid outlet,
- a second end piece covering said second end of said transparent cylindrical cover, said second end piece defining a fluid reversing chamber,
- an inner heat sink defining a central fluid passage extending from said cooling fluid inlet to said fluid reversing chamber,
- an outer heat sink coaxially enclosing said inner heat sink and defining an outer passage between said outer heat sink and said inner heat sink, said outer passage being separated from said inner passage and extending from said fluid reversing chamber to said cooling fluid inlet, and,
- a plurality of light sources located between said outer heat sink and said transparent outer cover.

2. The light curing device according to point 1, wherein said cooling fluid inlet is connected to a flexible polymeric sheathing tube defining a curved outer surface and being capable of supplying cooling fluid to said cooling fluid inlet.

3. The light curing device according to point 2, wherein said polymeric sheathing tube has a sufficient rigidity for being capable of pushing and pulling said light curing device.

4. The light curing device according to any of the points 2-3, wherein said light curing device further includes a drive mechanism for driving said housing through a pipeline, said drive mechanism being coupled to a seal installation device or to a tubing connected to said seal installation device, said drive mechanism comprising:
- a first pair of rollers located on opposite sides of said sheathing tube, each roller of said first pair of rollers defining a concave peripheral surface contacting said curved outer surface of said sheathing tube and defining a curvature corresponding to said curved outer surface of said sheathing tube, said first pair of rollers being mutually interconnected, and
- a second pair of rollers located on opposite sides of said sheathing tube and adjacent said first pair of rollers, each roller of said second pair of rollers defining a concave peripheral surface contacting said curved outer surface of said sheathing tube and defining a curvature corresponding to the outer surface of said sheathing tube, said second pair of rollers being mutually interconnected.

5. The light curing device according to any of the points 2-4, wherein said polymeric sheathing tube includes electrical power wirings for providing electrical power to said light sources.

6. The light curing device according to any of the points 2-5, wherein said polymeric sheathing tube includes communication wirings for providing communication with said light sources or other devices associated with said light curing device such as a temperature sensor or a pressure sensor.

7. The light curing device according to any of the preceding points, wherein said light sources are located on said outer heat sink.

8. The light curing device according to any of the preceding points, wherein said cooling fluid inlet is centrally located on said first end piece, whereas said cooling fluid outlet is located off centre or circumferentially about said fluid inlet on said first end piece.

9. The light curing device according to any of the preceding points, wherein said light sources emit light primarily within the visual spectrum, such as blue light.

10. The light curing device according to any of the preceding points, wherein said light sources constituting LEDs, LECs, and/or OLEDs.

11. The light curing device according to any of the preceding points, wherein said inner heat sink and/or said outer heat sink is manufactured using metal printing technologies.

12. The light curing device according to any of the preceding points, wherein said inner heat sink and/or said outer heat sink is made of aluminum.

13. The light curing device according to any of the preceding points, wherein said cooling fluid is compressed air.

14. The light curing device according to any of the preceding points, wherein said inner heat sink and/or said outer heat sink comprises a heat pipe or a Peltier element, and/or said light curing device is provided with additional cooling via a stream of air between said outer cover and said light sources.

15. An method of cooling a light curing device, said light curing device comprising a housing defining:
- a transparent cylindrical outer cover defining a first end and an opposite second end,
- a first end piece covering said first end of said transparent cylindrical cover, said first end piece defining a cooling fluid inlet and a cooling fluid outlet,
- a second end piece covering said second end of said transparent cylindrical cover, said second end piece defining a fluid reversing chamber,
- an inner heat sink defining a central fluid passage extending from said cooling fluid inlet to said fluid reversing chamber,
- an outer heat sink coaxially enclosing said inner heat sink and defining an outer passage between said outer heat sink and said inner heat sink, said outer passage being separated from said inner passage and extending from said fluid reversing chamber to said cooling fluid inlet, and,
- a plurality of light sources located between said outer heat sink and said transparent outer cover, said method comprising the step of causing a cooling fluid to pass through said housing from said cooling fluid inlet to said cooling fluid outlet via said central fluid passage, said fluid reversing chamber and said outer fluid passage.

Seventh set of points characterizing the invention:

1. An apparatus for curing a liner of a pipeline, said liner including a resin which is curable by exposure to electromagnetic radiation of a specific wavelength or a specific wavelength range, said apparatus comprising:

a housing defining opposite first and second ends, an outer wall of a substantially cylindrical configuration, and an inner wall defining a substantially unobstructed through-going passage extending longitudinally through said housing between said first and second ends, a pair of power supply wires for the supply of electrical power to said apparatus and extending from said first end of said housing, a plurality of LED's irradiating electromagnetic radiation of said specific wavelength or said specific wavelength range, said plurality of LED's being positioned and substantially evenly distributed at said outer wall of said housing, said plurality of LED's being connected through an electronic circuit to said pair of power supply wires, and said plurality of LED's being connected in thermal conductive relationship to heat dissipating elements freely exposed at said inner wall of said housing in said through-going passage of said housing for allowing a stream of cooling fluid to pass through said passage for dissipating heat from said heat dissipating elements and cooling said LED's, characterized in that said housing defines an innermost wall dividing said substantially unobstructed through-going passage into an inner passage centrally located within said substantially unobstructed through-going passage and extending substantially between said first and second ends, and, an outer passage defined between said inner wall and said innermost wall and coaxially enclosing said inner passage.

2. The apparatus according to point 1, wherein said housing defines a centrally located inlet for receiving pressurized gas, said inlet being in fluid communication with said inner passage at said first end.

3. The apparatus according to point 2, wherein said housing is closed at said second end and said through-going passage defines a flow reversing chamber at said second end for establishing fluid communication between said first passage and said second passage.

4. The apparatus according to point 3, wherein said housing defines an outlet at said first end, said outlet being in fluid communication with said outer passage and is preferably located off center or circumferentially about said housing.

5. The apparatus according to point 2, wherein said housing defines an outlet at said second end, said outlet being in fluid communication with said outer passage and said inner passage at said second end, said housing preferably defining a secondary inlet located off center or circumferentially about said housing at said first end and in fluid communication with said outer passage.

6. The apparatus according to point 5, wherein said innermost wall defines a nozzle adjacent said outlet or adjacent said inlet, said nozzle defining a minimum flow area of said inner passage for establishing a jet from said inner passage towards said outlet.

7. The apparatus according to any of the previous points, wherein said apparatus further comprising an outer cover extending between said opposite first and second end, enclosing said outer wall and establishing an outermost passage in fluid communication with said outer passage and/or forming part of said outer passage.

8. The apparatus according to any of the points 2-7, wherein said cooling fluid inlet is connected to a flexible polymeric sheathing tube defining a curved outer surface and being capable of supplying cooling fluid to said cooling fluid inlet, said polymeric sheathing tube preferably having a sufficient rigidity for being capable of pushing and pulling said apparatus, said polymeric sheathing tube preferably includes communication wirings for providing communication with said LED's or other devices associated with said apparatus such as a temperature sensor or a pressure sensor.

9. The apparatus according to point 8, wherein said apparatus further includes a drive mechanism for driving said housing through a pipeline, said drive mechanism being coupled to a seal installation device or to a tubing connected to said seal installation device, said drive mechanism comprising:

a first pair of rollers located on opposite sides of said sheathing tube, each roller of said first pair of rollers defining a concave peripheral surface contacting said curved outer surface of said sheathing tube and defining a curvature corresponding to said curved outer surface of said sheathing tube, said first pair of rollers being mutually interconnected, and a second pair of rollers located on opposite sides of said sheathing tube and adjacent said first pair of rollers, each roller of said second pair of rollers defining a concave peripheral surface contacting said curved outer surface of said sheathing tube and defining a curvature corresponding to the outer surface of said sheathing tube, said second pair of rollers being mutually interconnected.

10. The apparatus according to any of the preceding points, wherein said plurality of LED's being connected in thermal conductive relationship to further heat dissipating elements freely exposed at said innermost wall of said housing in said inner passage of said housing for allowing a stream of cooling fluid to pass through said inner passage for dissipating heat from said additional heat dissipating elements and cooling said LED's.

11. The apparatus according to any of the preceding points, wherein said outer wall of said housing being composed of a set of curved or planar surface elements, each of said curved or planar surface elements extending longitudinally between said first and said second ends of said housing, said surface elements being of identical configuration, preferably said plurality of LED's being arranged at said curved or planar surface elements for allowing irradiation of said electromagnetic radiation radially from said curved or planar surface elements, more preferably each of said curved or planar surface elements constituting an outer surface component of a housing element, said housing element comprising a finned heat dissipation element arranged opposite to said curved or planar surface element.

12. The apparatus according to any of the preceding points, further comprising first and second end housing components protruding beyond said outer wall of said housing and serving to prevent physical contact between said outer wall of said housing and said liner.

13. The apparatus according to any of the preceding points, further comprising co-operating first and second connectors provided at said first and second ends, respectively, for allowing said apparatus to be connected to an identical apparatus for providing an assembly of apparatuses comprising a number of apparatuses such as 2-12, e.g. 3-8, such as 4-6 individual apparatuses, preferably, said first and second connectors when joint together providing a cardanic linking or a ball-and-socket joint between any two apparatuses of said assembly.

14. An apparatus for curing a liner of a pipeline, said apparatus comprising a housing defining:
   a first end
   a second end
   an inner heat sink defining an inner passage extending from an inlet at said first end to an outlet at said second end, said inner passage defines a nozzle adjacent said outlet, said nozzle defining a minimum flow area of said inner passage for establishing a jet from said inner passage towards said outlet,
   an outer heat sink coaxially enclosing said inner heat sink and defining an outer passage separated from said inner passage and extending from an inlet at said first end to an outlet at said second end, and
      a plurality of light sources located on said outer heat sink opposite said outer passage.

15. A method of curing a liner of a pipeline, said liner including a resin, which is curable by exposure to electromagnetic radiation of a specific wavelength or a wavelength range, said method comprising:
   providing an apparatus according to any of the preceding points,
   said method further comprising moving said apparatus within said liner while supplying a stream of cooling fluid through said inner passage and/or said outer passage and supplying electrical power to said LED's through said pair of power supply wires for irradiating electromagnetic radiation of said specific wavelength or said specific wavelength range onto said liner for causing said resin to cure, and
   adjusting the velocity of movement of said apparatus through said liner so as to cause a complete curing of said resin.

Eight set of points characterizing the invention:

1. A light curing device for curing a liner of a pipeline, said liner including a resin which is curable by exposure to electromagnetic radiation of a specific wavelength or a specific wavelength range, said light curing device comprising:
   an inlet end having a central inlet for leading an air flow into said light curing device, and an outlet end having a common outlet opposite said central inlet for leading said air flow out of said light curing device,
   a pair of power supply wires for the supply of electrical power to said apparatus and extending from said inlet end of said housing,
   a plurality of LEDs for irradiating electromagnetic radiation of said specific wavelength or said specific wavelength range, said plurality of LEDs being connected through an electronic circuit to said pair of power supply wires,
   a transparent cylindrical outer cover for covering said plurality of LEDs for protection said plurality of LEDs against mechanical impact,
   an outer passage between said plurality of LEDs and said transparent cylindrical outer cover for allowing a air flow to pass through said outer passage for dissipating heat from said heat dissipating elements and cooling said LEDs,
   said outer passage being in fluid communication with said central inlet via a secondary passage, and said outer passage being in fluid communication with said common outlet inlet via a third passage for providing said air flow between said central inlet and said common outlet,
   said light curing device further comprising a heat sink being in thermal conductive relationship with said plurality of LEDs such that heat dissipate from said plurality of LEDs to said heat sink,
   said heat sink defining an exit heat transfer region at said third passage such that heat dissipate from said heat sink to said air flow after said air flow having passed said plurality of LEDs.

2. The light curing device according to point 1, said heat sink defining an entry heat transfer region at said secondary passage such that heat dissipate from said heat sink to said air flow before said air flow passing said plurality of LEDs.

3. The light curing device according to point 1, said heat sink consisting of a single heat transfer region constituted by said exit heat transfer region.

4. The light curing device according to any of points 1-3, said exit heat transfer region comprising fins.

5. The light curing device according to any of points 2 or 4, said entry heat transfer region comprising fins.

6. The light curing device according to any of points 1 or 3, said heat sink having fins exclusively at exit heat transfer region.

7. The light curing device according to any of points 1-6, said exit heat transfer region being defined such that the heat transfer from said heat sink to said air flow being greater at said exit heat transfer region than at said entry heat transfer region.

Ninth set of points characterizing the invention:

1. A light curing device for curing a liner of a pipeline, said liner including a resin which is curable by exposure to electromagnetic radiation of a specific wavelength or a specific wavelength range, said light curing device comprising:
   an inlet end having a central inlet for leading a first fluid flow into said light curing device, and an outlet end having an outlet opposite said central inlet for leading said first fluid flow out of said light curing device,
   a pair of power supply wires for the supply of electrical power to said apparatus and extending from said inlet end of said housing,
   a plurality of LEDs for irradiating electromagnetic radiation of said specific wavelength or said specific wavelength range, said plurality of LEDs being connected through an electronic circuit to said pair of power supply wires,
   a transparent cylindrical outer cover for covering said plurality of LEDs for protection said plurality of LEDs against mechanical impact,
   a heat sink being in thermal conductive relationship with said plurality of LEDs such that heat dissipate from said plurality of LEDs to said heat sink,
   a second inlet adjacent said inlet end for leading a second fluid flow into said light curing device, and an atomizer nozzle adjacent said second inlet for atomizing said second fluid flow.

Tenth set of points characterizing the invention:

1. An assembly with a seal installation device comprising:
   an elongated housing having a cylindrical wall extending between a first end and a second end of the housing, the cylindrical wall having a grid structure with a plurality of perforations for emitting electromagnetic radiation such as light from within the housing, the plurality of perforations consisting of perforations extending around the whole circumference of the cylindrical wall for emitting electromagnetic radiation substantially omnidirectional onto a pipeline during use of the assembly, and an inflatable, expandable and flexible bladder enclosing the grid structure of the cylindrical wall, the flexible bladder defining an inflated position and a deflated position, the flexible bladder having a cylindrical part extending between the first end of the cylindrical wall and the second end of the cylindrical wall and being capable of, when the flexible bladder defining the inflated position, to apply a pressure force onto the pipeline.

Eleventh set of points characterizing the invention:

1. An assembly wherein the seal installation device comprising:
an elongated housing having a cylindrical wall extending between a first end and a second end of the housing, the cylindrical wall having an opening located between the first end and the second end, and a first grid structure with a first plurality of perforations for emitting electromagnetic radiation from within the housing,
the installation device further comprising a pivotable plate having a curved shape being located within the housing adjacent the opening, the pivotable plate defining a first edge which is hingedly attached to the cylindrical wall opposite the opening and a second edge opposite the first edge, the pivotable plate being pivotable between a first position in which the second edge is located at the cylindrical wall opposite the opening and a second position in which the second edge is located at the opening,
the pivotable plate comprising a second grid structure with a second plurality of perforations for emitting electromagnetic radiation through the area of the housing occupied by the pivotable plate.

The invention claimed is:

1. A kit comprising:
a liner installation device, comprising:
an elongate housing having opposed ends, an exterior wall, an internal longitudinal channel, a lateral opening formed in the exterior intermediate the ends and communicating with the channel, and further comprising:
a guide element situated within the channel and movable between ramped and unramped relationships with the opening;
a flexible, inflatable and deflatable bladder within which the housing is at least partially receivable, and comprising:
a main portion having opposed ends; and
a lateral portion that branches from the main portion at a position intermediate the ends of the main portion; and
a flexible liner within which the bladder is at least partially receivable, and comprising:
a tubular portion having opposed and open ends; and
a brim portion that projects outwardly from the periphery of the tubular portion at one of its ends.

2. A system comprising:
the kit of claim 1, in which the bladder is at least partially received within the liner, and in which the housing is at least partially received within the bladder such that the main portion extends within the channel on both sides of the opening and such that the lateral portion is situated in face-to-face relationship with the opening.

3. The system of claim 2 further comprising:
an underground main pipeline within which the housing is received; and
an underground branch pipeline that joins the main pipeline and faces the opening in the housing.

4. The system of claim 3 in which the tubular portion of the liner extends within the branch pipeline.

5. The kit of claim 1 further comprising:
a light curing device positionable within the housing, the light curing device comprising a plurality of light emitting diodes configured to emit light within a given frequency range.

6. The kit of claim 5 in which the flexible liner is impregnated with a resin configured to cure in response to light at the frequency range.

7. The kit of claim 5 further comprising:
a flexible tube containing separate delivery pathways for power and fluid coolant, the tube attached to one end of the light-curing device.

8. The kit of claim 1 further comprising:
a manipulator for the installation device, comprising:
a peripherally wheeled first frame internally engageable with the walls of a pipeline; and
a second frame supported by the first frame and rotatable relative to the first frame.

9. The kit of claim 8 further comprising:
a sensor attached to the second frame and configured to detect when the opening faces an open passageway.

10. The kit of claim 9 in which the sensor comprises a camera.

11. The kit of claim 9 in which the sensor comprises a contact sensor.

12. A method of using the kit of claim 1 comprising:
installing at least a portion of the bladder within the liner;
thereafter positioning the installation device within a main pipeline such that the opening faces a branch pipeline; and
thereafter inflating the bladder.

13. The method of claim 12 further comprising:
after inflating the bladder, moving the guide element to its ramped relationship with the opening; and
thereafter moving a light-curing device along the guide element until it projects at least partially through the opening.

14. The method of claim 13 further comprising causing the light curing device to irradiate the liner.

15. The kit of claim 1 in which the exterior wall is a perforated structure.

16. A kit comprising:
a curable seal; and
an installation device, comprising:
a housing having:
a first end;
a second end;
an outer wall extending between the first end and the second end, the outer wall defining a perforated structure and an opening disposed between the first end and the second end; and
a guide element defining a first edge attached to the outer wall opposite the opening and a second edge opposite the first edge;
in which the guide element is pivotable between a first position in which the second edge is located at the outer wall and a second position in which the second edge is located at the opening; and
a bladder including the grid structure, the bladder having inflated and deflated positions, the bladder comprising:
a first part extending between two ends; and
a second part extending from the first part intermediate the ends of the first part;
wherein the second part is receivable in an inverted shape within the outer wall when the bladder is deflated;

in which the installation device is receivable within at least a portion of the curable seal.

17. The kit of claim 16, wherein the curable seal comprises:
an elongate tubular portion having opposed open ends; and
a brim portion outwardly projecting from and attached to the tubular portion at one of its ends.

18. The kit of claim 17 in which the brim portion is configured to envelop at least a portion of the first part of the bladder.

19. The kit of claim 17 in which the seal is configured to minimize contraction of the brim portion in the axial direction and of the first and second openings of the tubular portion during curing, while allowing contraction of the outer layer of the brim portion in the peripheral direction and the tubular portion in the longitudinal direction during curing.

20. The kit of claim 16, further comprising:
a light-emitting device;
a flexible, elongate sheathing attached to the light-emitting device, the sheathing being both pushable and pullable longitudinally; and
a drive system configured to push and pull the sheathing longitudinally.

21. The kit of claim 20 in which the drive system comprises:
at least one first pair of rollers located on opposite sides of the sheathing.

22. The kit of claim 16, further comprising:
a peripherally wheeled outer frame;
an inner frame supported by the outer frame and rotatable relative to the outer frame; and
a gripper mechanism supported by the inner frame.

23. The kit of claim 22 further comprising a camera positioned on the inner frame.

24. The kit of claim 22 further comprising a contact sensor positioned on the inner frame.

25. A method of using the kit of claim 16, comprising:
moving the assembly within a main pipeline to a junction with a branch pipeline;
thereafter positioning the installation device such that the opening is in face-to-face relationship with the branch pipeline;
thereafter, inflating the bladder; and
thereafter, irradiating the seal to cure the resin.

26. The method according to claim 25, further comprising:
exposing an outer layer of a brim portion of the seal to radiation; and
thereafter, applying an adhesive to the outer layer of the brim portion.

27. A kit comprising:
a liner installation device, comprising:
an elongate housing having opposed ends, an exterior perforated wall and an internal longitudinal channel;
a flexible, inflatable and deflatable bladder within which the housing is at least partially receivable, and comprising:
a main portion having opposed ends; and
a flexible liner within which the bladder is at least partially receivable;
a light-emitting device receivable within the housing;
a flexible, elongate sheathing attached to the light-emitting device, the sheathing being both pushable and pullable longitudinally; and
a drive system configured to push and pull the sheathing longitudinally;
wherein the light-emitting device is configured to move longitudinally relative to the housing in response to the drive system pushing or pulling the sheathing.

28. A system comprising:
the kit of claim 27, in which:
the bladder is at least partially received within the liner;
the housing is at least partially received within the bladder such that the main portion extends within the channel; and
the light-emitting device is received within the housing.

29. The kit of claim 27 in which:
the elongate housing further comprises:
an opening in the exterior perforated wall disposed between its opposed ends; and
a guide element situated within the channel and movable between ramped and unramped relationships with the opening; and
the bladder further comprises:
a lateral portion that branches from the main portion at a position intermediate the ends of the main portion;
in which the lateral portion is in face-to-face relationship with the opening when the housing is received within the bladder.

30. A method for using the kit of claim 27 comprising:
installing at least a portion of the bladder within the liner;
thereafter positioning the installation device within a main pipeline such that the liner is adjacent an area to be lined;
thereafter inflating the bladder;
thereafter moving the light-emitting device within the housing; and
causing the light-emitting device to irradiate the liner.

31. The method of claim 30 in which the area to be lined is a branch pipeline.

* * * * *

UNITED STATES PATENT AND TRADEMARK OFFICE
CERTIFICATE OF CORRECTION

PATENT NO. : 11,131,418 B2  
APPLICATION NO. : 16/476418  
DATED : September 28, 2021  
INVENTOR(S) : Rasmussen et al.

It is certified that error appears in the above-identified patent and that said Letters Patent is hereby corrected as shown below:

In the Specification

Column 3, Line 38, please delete "vehicle" and substitute therefore "vehicles".
Column 7, Line 38, after the word "pipeline" please insert --.--.
Column 7, Line 53, please delete "," and substitute therefore ".".
Column 9, Line 1, please delete the third occurrence of "the" and substitute therefore "be".
Column 10, Line 39, please delete "introduces" and substitute therefore "introduced".
Column 12, Line 46, please delete "or" and substitute therefore "of".
Column 14, Line 21, please delete the first occurrence of "a" and substitute therefore "an".
Column 15, Line 1, please delete "defines" and substitute therefore "define".
Column 15, Line 59, please delete "precis" and substitute therefore "precise".
Column 21, Line 5, please delete "sheet" and substitute therefore "sheath".
Column 29, Line 2, after the word "it" please insert --is--.
Column 31, Line 67, please delete "," and substitute therefore ".".
Column 32, Line 47, after the word "protection" please insert --of--.
Column 32, Line 57, please delete "inlet".
Column 34, Line 29, please delete "sealed" and substitute therefore "sealer".
Column 36, Line 54, please delete "as" and substitute therefore "a".
Column 37, Line 51, please delete "22" and substitute therefore "18".
Column 37, Line 52, after the word "tube" please insert --22--.
Column 39, Line 38, please delete "though" and substitute therefore "through".
Column 40, Line 6, after the word "may" please insert --be--.
Column 42, Line 30, please delete "comprise" and substitute therefore "comprises".
Column 45, Line 19, please delete "thought" and substitute therefore "through".
Column 45, Line 23, please delete "thought" and substitute therefore "through".
Column 45, Line 38, please delete "as" and substitute therefore "a".
Column 45, Line 43, please delete "thought" and substitute therefore "through".
Column 45, Line 51, please delete "thought" and substitute therefore "through".
Column 45, Line 60, please delete "thought" and substitute therefore "through".
Column 45, Line 65, please delete "thought" and substitute therefore "through".

Signed and Sealed this  
Ninth Day of November, 2021

Drew Hirshfeld  
*Performing the Functions and Duties of the  
Under Secretary of Commerce for Intellectual Property and  
Director of the United States Patent and Trademark Office*

CERTIFICATE OF CORRECTION (continued)
U.S. Pat. No. 11,131,418 B2

Column 46, Line 33, please delete "104n" and substitute therefore "$104^{IV}$".
Column 46, Line 62, please delete "thought" and substitute therefore "through".
Column 47, Line 2, please delete "thought" and substitute therefore "through".
Column 47, Line 11, please delete "104" and substitute therefore "104'''".
Column 47, Line 15, please delete "thought" and substitute therefore "through".
Column 48, Line 36, please delete "buy" and substitute therefore "but".
Column 49, Line 45, please delete "led" and substitute therefore "LED".
Column 49, Line 49, please delete "led" and substitute therefore "LED".
Column 49, Line 62, please delete "26a" and substitute therefore "26b".
Column 49, Line 63, please delete "26a" and substitute therefore "26b".
Column 49, Line 64, please delete "26a" and substitute therefore "26b".
Column 50, Line 13, please delete "26b" and substitute therefore "26a".
Column 50, Line 19, please delete "is" and substitute therefore "of".
Column 57, Line 22, please delete the first occurrence of "a" and substitute therefore "an".
Column 58, Line 28, please delete the first occurrence of "a" and substitute therefore "an".
Column 60, Line 43, please delete "an" and substitute therefore "a".
Column 60, Line 66, please delete "an" and substitute therefore "a".
Column 62, Line 47, please delete "An" and substitute therefore "A".
Column 65, Line 61, please delete "a".